US010375928B2

(12) United States Patent
Yajima et al.

(10) Patent No.: US 10,375,928 B2
(45) Date of Patent: Aug. 13, 2019

(54) LIVESTOCK MANAGEMENT SYSTEM AND MANAGEMENT METHOD FOR LIVESTOCK

(71) Applicant: Sony Corporation, Tokyo (JP)

(72) Inventors: Masakazu Yajima, Kanagawa (JP); Hideo Niikura, Tokyo (JP); Hidenori Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/759,016

(22) PCT Filed: Aug. 8, 2016

(86) PCT No.: PCT/JP2016/003650
§ 371 (c)(1),
(2) Date: Mar. 9, 2018

(87) PCT Pub. No.: WO2017/046997
PCT Pub. Date: Mar. 23, 2017

(65) Prior Publication Data
US 2018/0295809 A1 Oct. 18, 2018

(30) Foreign Application Priority Data
Sep. 16, 2015 (JP) ................................ 2015-182564

(51) Int. Cl.
*A01K 11/00* (2006.01)
*H04B 17/318* (2015.01)

(52) U.S. Cl.
CPC .......... *A01K 11/008* (2013.01); *A01K 11/001* (2013.01); *A01K 11/004* (2013.01); *H04B 17/318* (2015.01)

(58) Field of Classification Search
None
See application file for complete search history.

(56) References Cited

U.S. PATENT DOCUMENTS

| | | | | |
|---|---|---|---|---|
| 7,843,327 | B1 * | 11/2010 | DiMartino ......... | G08B 13/1409 340/505 |
| 2013/0316753 | A1 * | 11/2013 | Van Dijk ............ | A01K 11/006 455/517 |
| 2016/0198680 | A1 * | 7/2016 | Mobley ................ | A01K 29/005 340/573.3 |

FOREIGN PATENT DOCUMENTS

| | | | |
|---|---|---|---|
| JP | 2003-235382 | A | 8/2003 |
| JP | 2004-095967 | A | 3/2004 |
| JP | 2008-073005 | A | 4/2008 |

OTHER PUBLICATIONS

Written Opinion and English translation thereof dated Oct. 25, 2016 in connection with International Application No. PCT/JP2016/003650.

(Continued)

*Primary Examiner* — Leon Viet Q Nguyen
(74) *Attorney, Agent, or Firm* — Wolf, Greenfield & Sacks, P.C.

(57) ABSTRACT

[Object] A livestock management system according to an embodiment of the present technology includes a stay determination unit.
The stay determination unit determines, on the basis of data regarding a plurality of individual identification signals transmitted from a transmission apparatus that is attached to a livestock animal and transmits the individual identification signal made corresponding to the livestock animal, whether or not the livestock animal is staying within a target region corresponding to the individual identification signal.

11 Claims, 36 Drawing Sheets

(56) References Cited

OTHER PUBLICATIONS

International Preliminary Report on Patentability and English translation thereof dated Mar. 29, 2018 in connection with International Application No. PCT/JP2016/003650.
No Author Listed, Kyushu University, Fujitsu Ltd., "Development of Wireless Vital Management System for Grazing Cattle with ICT", Jul. 13, 2012, pp. 1, 9 to 20, http://www.kiai.gr.jp/PDF/scope2012/6%20SCOPE.pdf [retrieved on Oct. 7, 2016].
Uchimura, M. et al., "Labor saving pasturage management system using the new IT equipments", Oita-Ken Norin Suisan Kenkyu Shido Center Chikusan Kenkyubu Heisei 21 Nendo Shiken Seiseki Hokokusho, Oct. 7, 2016 (Oct. 7, 2016), pp. 48-51, http://www.pref.oita.jp/uploaded/attachment/135309.pdf [retrieved on Oct. 7, 2016].
International Search Report and English translation thereof dated Oct. 25, 2016 in connection with International Application No. PCT/JP2016/003650.

* cited by examiner

| ID | Name | Description |
|---|---|---|
| 001 | Entrance of fence for cow group A | Group of cows that have good appetite and give lots of milk |
| 002 | Entrance of fence for cow group B | Group of cows that have good appetite and do not give milk |
| | ⋮ | |

FIG.5

| Cow ID | Registered cow group |
|---|---|
| Cow1000308 | Cow group A |
| Cow1000309 | Cow group B |
| Cow1000310 | Cow group A |
| Cow1000311 | Cow group B |
| Cow1000312 | Cow group A |
| Cow1000313 | Cow group A |
| Cow1000314 | Cow group A |
| Cow1000315 | Cow group B |
| Cow1000316 | Cow group A |
| Cow1000317 | Cow group B |
| Cow1000318 | Cow group A |
| Cow1000319 | Cow group B |
| ⋮ | |

FIG.6

Behavior history

Displaying cow's behavior history

Monitoring

| Cow's name | Registered cow group | Current cow group |
|---|---|---|
| Cow1000308 | Cow group A | Cow group A |
| Cow1000309 | Cow group B | Cow group B |
| Cow1000310 | Cow group A | Cow group A |
| Cow1000311 | Cow group B | Cow group B |
| Cow1000312 | Cow group A | Cow group A |
| Cow1000313 | Cow group A | Cow group B |
| Cow1000314 | Cow group A | Cow group A |
| Cow1000315 | Cow group B | Cow group B |
| Cow1000316 | Cow group A | Cow group A |
| Cow1000317 | Cow group B | Cow group B |
| Cow1000318 | Cow group A | Cow group A |
| Cow1000319 | Cow group B | Cow group B |

FIG.9

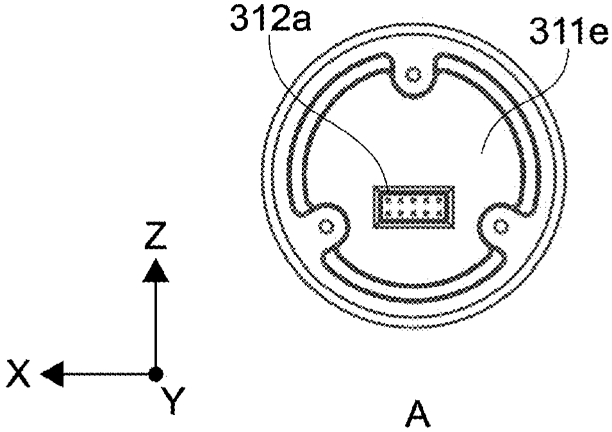
A
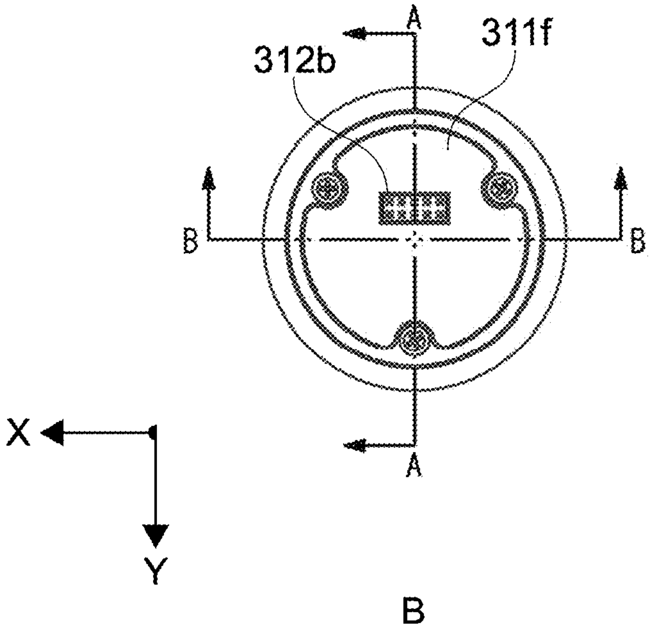
B
FIG.33

LIVESTOCK MANAGEMENT SYSTEM AND MANAGEMENT METHOD FOR LIVESTOCK

CROSS-REFERENCE TO RELATED APPLICATIONS

This application claims the benefit under 35 U.S.C. § 371 as a U.S. National Stage Entry of International Application No. PCT/JP2016/003650, filed in the Japanese Patent Office as a Receiving Office on Aug. 8, 2016, which claims priority to Japanese Patent Application Number JP2015-182564, filed in the Japanese Patent Office on Sep. 16, 2015, each of which is hereby incorporated by reference in its entirety.

TECHNICAL FIELD

The present technology relates to a livestock management system and a management method for livestock.

BACKGROUND ART

Livestock animals are raised in barn rooms partitioned within a barn and in a grazing region set by a fence or the like when they graze.

For example, Patent Literature 1 has disclosed a technology of performing grazing management by using a virtual fence instead of a physical fence.

However, respective livestock animals needs, in some cases, different types of rearing management in a manner that depends on months of age, sex, breeds, reproductive cycles, and the like. Therefore, in general, a plurality of livestock animals that need a similar type of rearing management are classified into the same group and managed in identical barn room and grazing region.

CITATION LIST

Patent Literature

Patent Literature 1: Japanese Patent Application Laid-open No. 2008-73005

DISCLOSURE OF INVENTION

Technical Problem

However, if a plurality of livestock animals are reared, livestock animals belonging to one group may be mixed into livestock animals of other groups, which makes suitable management difficult.

In view of the above-mentioned circumstances, it is an object of the present technology to provide a livestock management system and a management method for livestock by which livestock can be easily managed.

Solution to Problem

In order to accomplish the above-mentioned object, a livestock management system according to an embodiment of the present technology includes a stay determination unit.

The stay determination unit determines, on the basis of data regarding a plurality of individual identification signals transmitted from a transmission apparatus that is attached to a livestock animal and transmits the individual identification signal made corresponding to the livestock animal, whether or not the livestock animal is staying within a target region corresponding to the individual identification signal.

A management method for livestock according to another embodiment of the present technology includes the steps of:

receiving data regarding a plurality of individual identification signals transmitted from a transmission apparatus that is attached to a livestock animal and transmits the individual identification signal made corresponding to the livestock animal; and determining, on the basis of the data, whether or not the livestock animal is staying within a target region corresponding to the individual identification signal.

Advantageous Effects of Invention

As described above, in accordance with the present technology, to provide a livestock management system and a management method for livestock by which livestock can be easily managed.

It should be noted that the effects described here are not necessarily limitative and any effect described in the present disclosure may be provided.

BRIEF DESCRIPTION OF DRAWINGS

FIG. 5 A diagram showing a configuration example of a region attribute information database stored in an attribute information storage unit of the livestock management system shown in FIG. 4.

FIG. 6 A diagram showing a configuration example of a management target information database of a region stored in the attribute information storage unit of the livestock management system shown in FIG. 4.

FIG. 9 A table showing an example of results of stay determination and region determination displayed on the display unit.

FIG. 33 A is a plan view of the third unit casing and B is a bottom view of the third unit casing.

MODE(S) FOR CARRYING OUT THE INVENTION

Hereinafter, embodiments according to the present technology will be described with reference to the drawings.

First Embodiment: Stay Monitoring Processing

[Outline of Livestock Management System]

A livestock management system according to this embodiment is, for example, a system that can be utilized by an employee (user) of a stock-raising farmer or stock-raising facilities, and is configured to be capable of performing stay monitoring processing of monitoring a region in which a livestock animal is staying within the stock-raising facilities.

In the following description, staying in a certain region refers to the presence of a livestock animal within that region for a predetermined time or more. The predetermined time is not particularly limited, and is set to, for example, several minutes to several hours.

Figure 1:
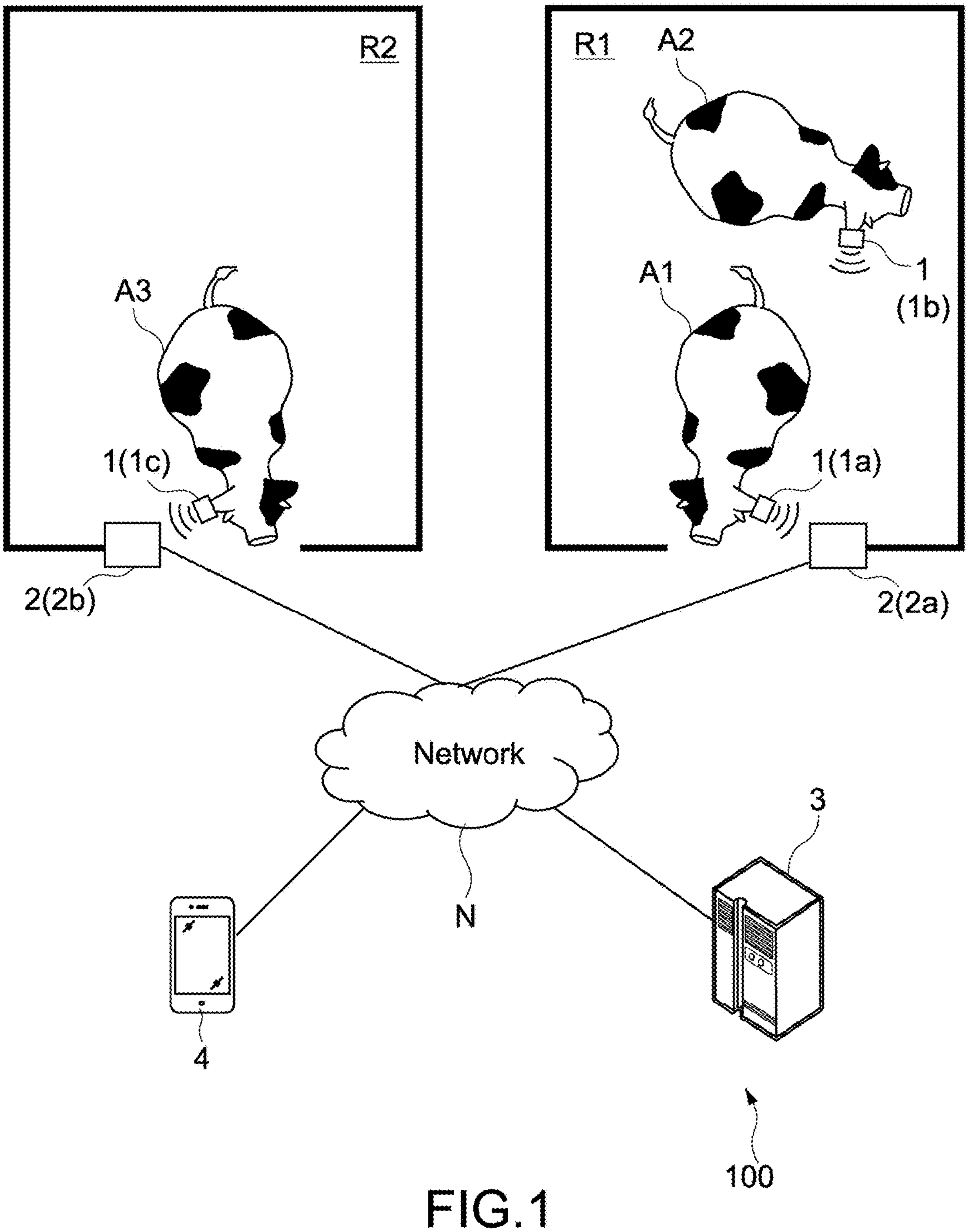
FIG. 1 A schematic diagram showing a schematic configuration of a livestock management system of a first embodiment of the present technology.

FIG. 1 is a schematic diagram showing a schematic configuration of a livestock management system of a first embodiment of the present technology.

As shown in the figure, a livestock management system 100 includes a plurality of transmission apparatuses 1 (transmission apparatuses 1*a*, 1*b*, 1*c*), a plurality of communication apparatuses 2 (communication apparatuses 2*a*, 2*b*), a server apparatus 3, and a terminal apparatus 4.

The plurality of transmission apparatuses 1*a*, 1*b*, 1*c* are attached to a plurality of livestock animals A1, A2, A3, respectively.

Examples of the livestock animals A1, A2, A3 can include beef cows, milk cows, pigs, horses, sheep, goats, and poultry that are industrial animals and dogs, cats, and rabbits that are pets. Hereinafter, cows will be taken as an example.

Regions R1, R2 shown in the figure are, for example, regions in which the livestock animals A1, A2, A3 can stay within the stock-raising facilities. For example, the regions R1, R2 are regions registered by the user in advance by using livestock management application software or the like to be described later. As a specific example of the region, a barn room, a pasture, a milking box parlor, and the like which are divided within a barn may be employed. The figure shows an example in which the livestock animals A1, A2 stay within the region R1 and the livestock animal A3 stays within the region R2.

A region of the "regions", which is a region in which a livestock animal can stay and which is a target of stay monitoring determination for the respective livestock animals A1, A2, A3, will be referred to as a "target region".

The transmission apparatus 1 is attached to a livestock animal and transmits an individual identification signal made corresponding to this livestock animal. It is assumed that the livestock animal means an individual livestock animal.

An individual identifier is an identifier with which the livestock animal can be identified. The individual identifier may be an individual identifier specific to the transmission apparatus 1. Alternatively, the individual identifier may be an individual identification number of the livestock animal to be described later or the like, which is an individual identifier with which the transmission apparatus 1 can be identified.

Further, the individual identification signal is a signal including the identifier and transmitted from the transmission apparatus 1. The individual identification signal may include information other than the identifier. For example, the individual identification signal may include information regarding a power generation amount, information regarding an attribute of the transmission apparatus 1, and information combining them, and the like, which will be described later.

The transmission apparatuses 1*a*, 1*b*, 1*c* can be configured as tags that can be attached to the livestock animals A1, A2, A3, respectively.

The transmission apparatuses 1 are, for example, attached to the ears of the livestock animals A1, A2, A3. However, the transmission apparatuses 1 are not limited to the ears and it may be attached to sites other than the ears, such as necks, backs, and legs. It should be noted that it is favorable to attach the transmission apparatuses 1 to the ears rather than the necks or legs for the purpose of lowering the possibility that the transmission apparatuses 1 may be detached due to behaviors of the livestock animals A1, A2, A3 to rub themselves against fences or the like or their collision with other livestock animals.

Further, in addition to the transmission apparatus 1, the livestock animals A1, A2, A3 may each wear an attachment tool in which information for identifying an individual, such as an individual identification number, is described, the attachment tool not including the function of communication or the like. Hereinafter, such an attachment tool attached to the ear will be referred to as an "ear-tag". The ear-tag includes a resin plate on which an individual identification number and a bar code thereof are printed as an example.

Further, the individual identification number set forth herein refers to, for example, a number given by a country, a livestock management association, or the like and universally used.

Note that, regarding the transmission apparatus 1, the individual identification number of the livestock animal, the individual identifier of the transmission apparatus 1, or the like is described on a surface of a casing to be described later and it may also have the function of the ear-tag.

The plurality of communication apparatuses 2 are apparatuses different from the transmission apparatus 1. Each of the communication apparatuses 2 receives an individual identification signal transmitted from the transmission apparatus 1, and further adds predetermined information to the received individual identification signal and transmits it to the server apparatus 3. That is, the communication apparatus 2 of this embodiment functions as a reception apparatus for an individual identification signal.

A network N can be, for example, the Internet, a local area network, or the like.

The communication apparatus 2 may be a dedicated communication apparatus as shown in FIG. 1 or may have a configuration similar to that of the transmission apparatus 1. Alternatively, it may be a portable information terminal different from the terminal apparatus 4. In the example shown in the figure, the communication apparatus 2 is mounted on a fence or the like arranged in the stock-raising facilities.

The plurality of communication apparatuses 2 may be positioned corresponding to the respective regions R1, R2 as shown in FIG. 1 in this embodiment.

The phrases, the communication apparatus 2 "is positioned in a target region", refer to the fact that the communication apparatus 2 is at a position within the target region or around the target region, which includes, for example, positions of the entrance of the target region, the vicinity of the fence (boundary) of the target region, the inside of the target region, and the like.

In this embodiment, the relationship between the communication apparatus 2 and the regions R1, R2 can have a plurality of patterns. For example, as shown in the figure, (i) there may be a plurality of regions and one communication apparatus 2 may correspond to each region (see FIG. 2). Alternatively, (ii) there may be a plurality of regions and a plurality of communication apparatuses 2 may correspond to each region (see FIG. 10). Alternatively, (iii) there may be only one region and one communication apparatus 2 may correspond to each region. Alternatively, (iv) there is only one region and a plurality of communication apparatuses 2 may correspond to each region.

The server apparatus 3 is a server apparatus in the network N. In this embodiment, the server apparatus 3 is an apparatus different from the transmission apparatus 1 and the communication apparatus 2, and is also an information processing apparatus that receives an individual identification signal transmitted from the communication apparatus 2. Predetermined information may be added to an individual identification signal, which is received by the server apparatus 3, by the communication apparatus 2. The server apparatus 3 may include one information processing apparatus or may include a plurality of information processing apparatuses.

The server apparatus 3 is capable of providing the terminal apparatus 4 with the livestock animal management service via the network N. For example, the server apparatus 3 installs the livestock management application software (hereinafter, abbreviated as livestock management app) and executes processing on the basis of this software.

The server apparatus 3 may provide the terminal apparatus 4 or the like with the livestock management app in the form of a web application or may deliver the livestock management app to the terminal apparatus 4 and cause the terminal apparatus 4 to install this app.

The terminal apparatus 4 is an information processing apparatus that is operated by a user who manages the plurality of livestock animals A1, A2, A3. The terminal apparatus 4 is configured to be capable of communicating with the server apparatus 3 in the network N. The terminal apparatus 4 includes, for example, a smartphone, a tablet terminal, a digital camera, a wearable device, a PC (Personal Computer), and the like.

Figure 2:
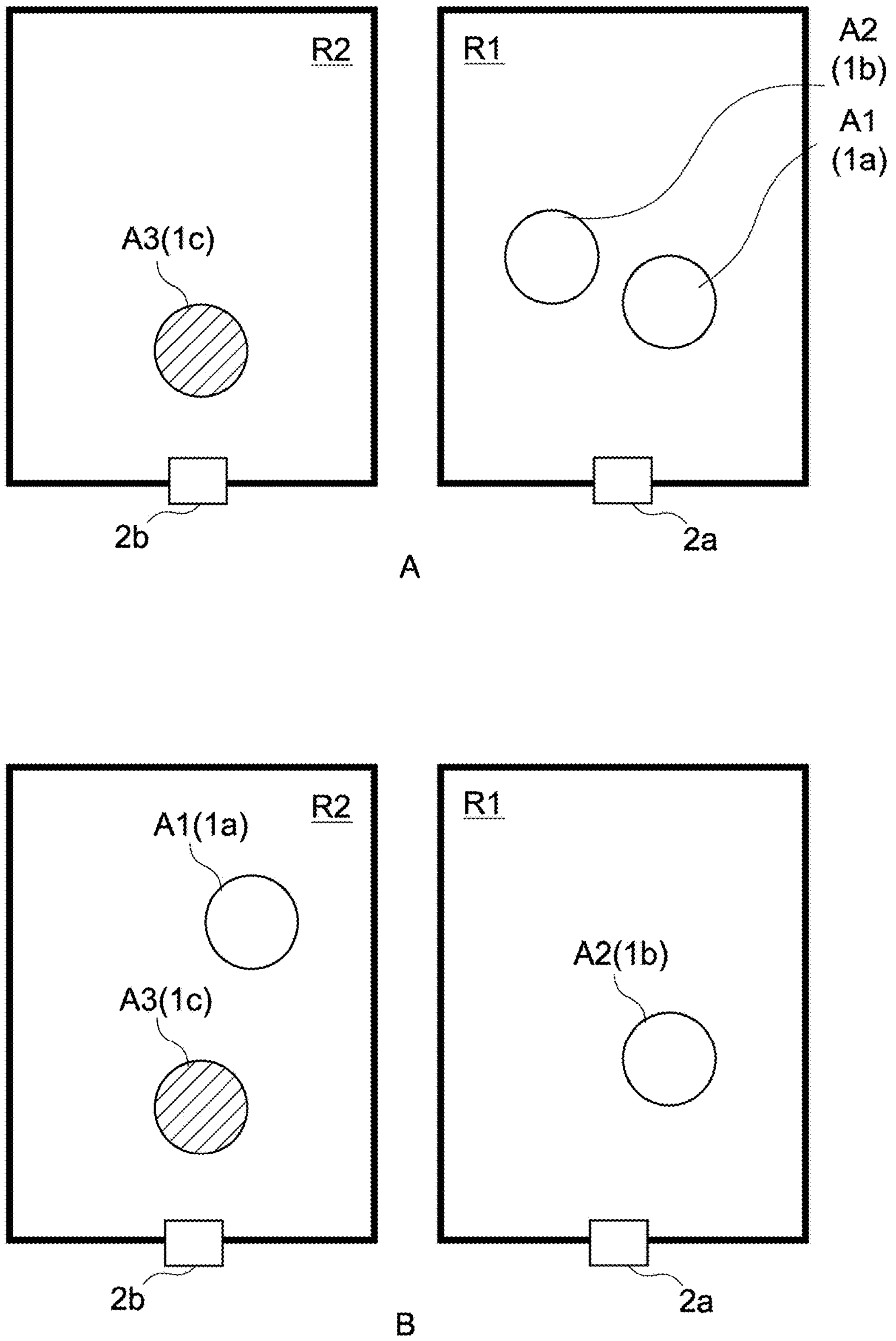
FIG. 2 A diagram schematically showing a relationship between each livestock animal and a region.

FIG. 2 is a diagram schematically showing a relationship between each livestock animal and a region. Note that it is assumed that the livestock animals A1, A2 shown by white circles belong to a cow group A that is a group of livestock animals and the livestock animal A3 shown by a circle with oblique lines belongs to a cow group B that is a group of livestock animals.

As shown in A of FIG. 2, for example, the livestock animals A1, A2, A3 belong to groups of the cow group A, the cow group A, and the cow group B, respectively. The cow group A is, for example, a group of cows that have good appetite and give lots of milk. The cow group B is, for example, a group of cows that have good appetite and do not give lots of milk.

On the other hand, the region R1 and the region R2 are different regions such as barns and pastures, and are divided with the fence and other structures. Alternatively, the regions R1, R2 may be virtual regions.

Normally, livestock animals of an identical group needs identical management, and hence stays within an identical region. Therefore, typically, each region and each group correspond in a one-to-one relationship, and the group name can be commonly used as the name of the region.

In A of FIG. 2, the livestock animals A1, A2 of the cow group A is staying in the region R1, and the livestock animal A3 of the cow group B is staying in the region R2. Therefore, the respective livestock animals A1, A2, A3 are staying in suitable regions.

On the other hand, in B of FIG. 2, the livestock animal A2 is staying in the region R1, and the livestock animals A3, A1 is staying in the region R2. In this case, the livestock animal A1 that should be originally managed in the region R1 is mixed in the region R2, and it is necessary to return it to the region R1 for suitably managing it.

In the example shown in FIGS. 1 and 2, the example of the three livestock animals is shown for the sake of description. However, a stock-raising farmer can manage several tens to several thousands of livestock animals or more. Further, also regarding the group of livestock animals, it is not limited to the example of the two groups, and a large number of groups can be managed. In such a case, it is difficult to grasp the livestock animal mixed in an unsuitable group.

In accordance with the livestock management system 100 of this embodiment, it is possible to monitor a region in which a livestock animal is staying, and to easily manage the livestock animal.

[Hardware Configuration of Livestock Management System]

Figure 3:
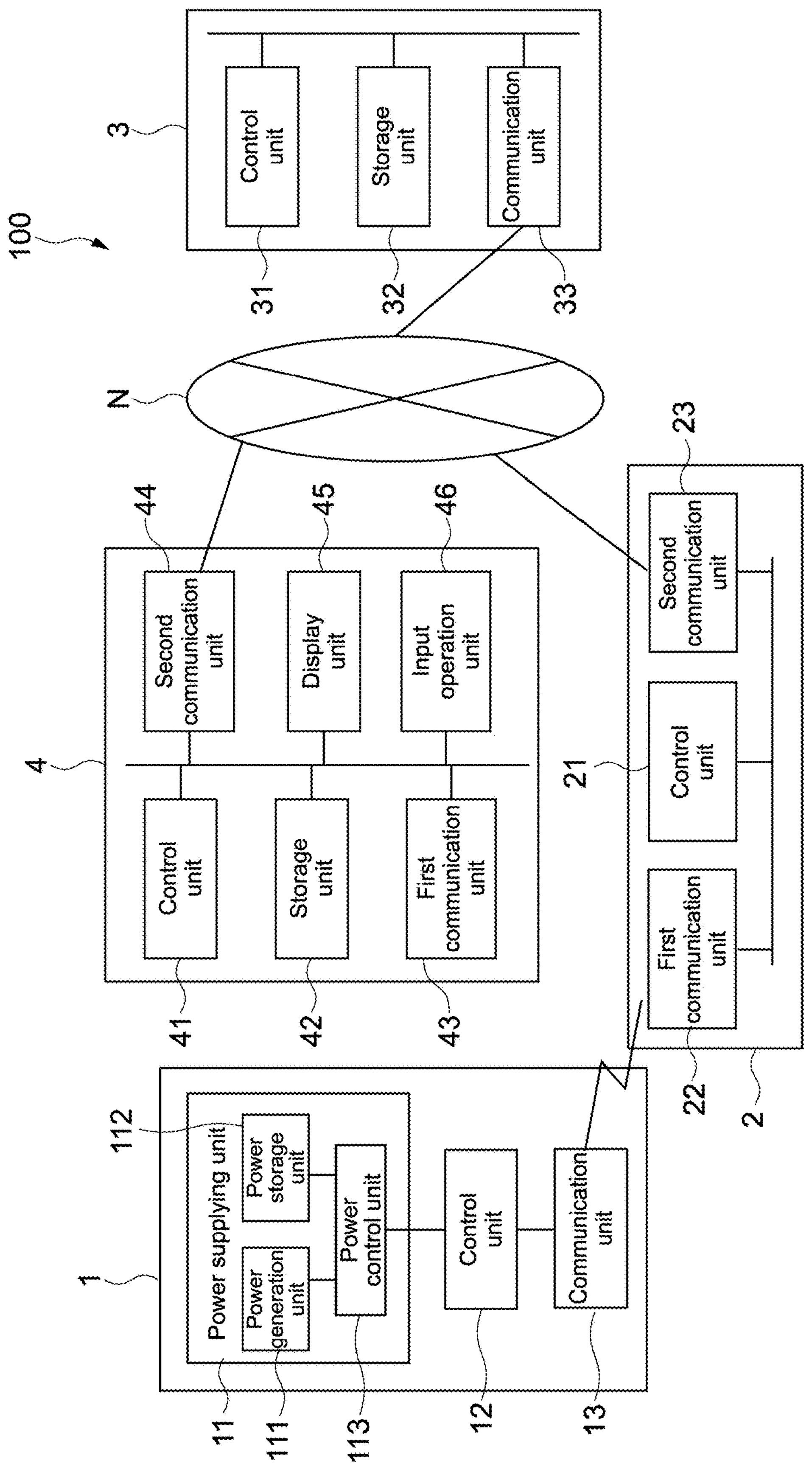
FIG. 3 A block diagram showing hardware configurations of respective apparatuses included in the livestock management system shown in FIG. 1.

FIG. 3 is a block diagram showing hardware configurations of respective apparatuses included in the livestock management system 100.

(Transmission Apparatus)

As shown in FIG. 3, the transmission apparatus 1 includes a power supplying unit 11, a control unit 12, and a communication unit 13. The transmission apparatus 1 further includes a casing (not shown) that houses the power supplying unit 11, the control unit 12, and the communication unit 13, and an attachment mechanism (not shown) for attaching the casing to the livestock animal. The attachment mechanism may be configured integrally with the casing.

The "attachment" set forth herein includes being directly attached to a living body and/or a non-living body with an attachment tool or the like, being indirectly attached by being attached to an object worn by a living body and/or a non-living body, and the like. As an example in which the casing is directly attached to a living body or the like, for example, the user can use an attachment device to attach the casing to the livestock animal by sandwiching an ear of a livestock animal between the casing and another object. As an example in which the casing is indirectly attached to a living body or the like, the casing may include a hole for a belt and may be attached to a livestock animal by passing the belt passing around the neck of the livestock animal through the hole. As another example in which the casing is indirectly attached to a living body or the like, the casing may include a structure for mounting a mount component for attachment and may be attached to a livestock animal via the mount component directly attached to the livestock animal.

The power supplying unit 11 is configured to be capable of supplying the control unit 12 and the communication unit 13 with electric power. The power supplying unit 11 includes, for example, a power generation unit 111, a power storage unit 112, and a power control unit 113.

The power generation unit 111 generates electric power in a manner that depends on a surrounding environment. The power generation unit 111 may perform power generation with energy based on at least any one of, for example, light, heat, vibration, radio waves including far electromagnetic field and near electromagnetic field, and particular organic matter and inorganic matter. The power generation unit 111 may perform power generation with two or more of the above-enumerated types of energy. Any power generation methods can be employed and, for example, an electrostatic type, electromagnetic type, an inverse magnetostrictive type, or a piezoelectric type can be employed.

The power generation unit 111 may perform power generation with light (e.g., indoor light bulb and solar light).

The power generation unit 111 may be a thermoelectric generator that performs power generation by utilizing a temperature difference (heat) (e.g., one that performs power generation by using the Seebeck effect and the Thomson effect, thermionic power generation unit 111, or one that performs thermomagnetic generation). Such a power generation unit 111 performs power generation by utilizing a temperature difference between a body temperature of a livestock animal and an ambient temperature, for example.

The power generation unit 111 may be an enzymatic cell (also called bio-cell or the like) that performs power generation by utilizing glucose.

The power generation unit 111 utilizes any of LCR (inductance, capacitance, and reactance) components or a combination thereof and capacitive coupling or electromagnetic coupling with a capacitor, an antenna, a rectenna, and the like. The power generation unit 111 may perform power generation with radio waves, for example.

The power generation unit 111 may perform near electromagnetic field power generation, in other words, perform power generation with energy obtained by bringing a transmission apparatus into the proximity of a predetermined apparatus. A well-known method such as a magnetic field resonance method, an electromagnetic induction method, electric field coupling, and an electric field resonance method can be applied to a method for near electromagnetic field power generation.

A well-known power generation unit 111 other than those exemplified above can be applied to the power generation unit 111.

The power storage unit 112 is used in a manner that depends on purposes, for example, storing electric power generated by the power generation unit 111. The electric power generated by the power generation unit 111 is stored in the power storage unit 112 and used as electric power for actuating the communication unit 13.

Besides various secondary batteries such as a lithium-ion secondary battery, the power storage unit 112 includes an electric double layer capacitor, a lithium ion capacitor, a polyacenic semiconductor (PAS) capacitor, a Nanogate capacitor ("Nanogate" is a registered trademark of Nanogate Aktiengesellschaft), a ceramic capacitor, a film capacitor, an aluminum electrolytic capacitor, a tantalum capacitor, and the like. Depending on purposes, a combination of these power storage units 112 may be used.

In accordance with electric power supplied from the power generation unit 111, the power control unit 113 shifts between a standby state and an output state in which it supplies the communication unit 13 and the control unit 12 with electric power. With this, if the amount of electric power generated by the power generation unit 111 (power generation amount) is equal to or larger than a predetermined amount, it becomes possible to transmit the individual identification signal.

The power control unit 113 includes, for example, an integrated circuit (IC) formed of one or more elements. Examples of the IC used in the power supplying unit 113 can include a switching element such as a transistor, a diode, a reset IC, a regulator IC, a logic IC, and various arithmetic circuits. A circuit configuration inside the IC can be changed in a manner that depends on needs as long as it can realize the function of the power control unit 113. Further, although the power control unit 113 is favorably configured to be capable of retaining a state after shift to thereby store that state, the power control unit 113 may be configured to be incapable of retaining and storing that state due to reset or the like.

Further, electric power generated by the power generation unit 11 may be appropriately supplied to the power control unit 113 after the voltage is increased or decreased.

The control unit 12 controls transmission of the communication unit 13, and includes a processor and a memory. The control unit 12 of this embodiment can be configured as an MCU (Micro Control Unit).

The processor used in the control unit 12 controls the communication circuit. Examples of this processor can include an MPU (Micro Processing Unit) and a CPU (Central Processing Unit). The MPU is more favorable as the processor because of the throughput of the communication unit 13 and a requirement for downsizing in the transmission apparatus 1.

The communication unit 13 transmits an individual identification signal including an individual identifier by using electric power supplied from the power supplying unit 11.

The individual identification signal of this embodiment may include information about an amount of electric power generated (power generation amount) in a manner that depends on a surrounding environment. The information about the power generation amount may include an transmission or reception pattern of the individual identification signal, which is based on the amount of electric power generated in a manner that depends on a surrounding environment, or may include a numerical value of the power generation amount. The individual identification signal may further include information representing the type of power generation. The information representing the type of power generation includes, for example, information indicating that a source of power generation performed by the communication unit 13 is one of light, a temperature difference, and radio waves or a combination thereof.

Typically, an individual identifier specific to the transmission apparatus 1, which is assigned in advance, is used as the individual identifier. With this, the individual identifier corresponds to a livestock animal wearing the transmission apparatus 1 in a one-to-one relationship, and can identify the livestock animal. Further, the individual identifier may be an individual identifier assigned every time it is necessary as long as it can identify the livestock animal.

The communication unit 13 includes a communication circuit and an antenna for communicating with the communication apparatus 2 and the like.

The communication performed by the communication circuit of the communication unit 13 may be wireless or may be wired. Further, a wireless module may be single, may be of various types, or may be a composite module including the various types. The wireless communication may be a communication method utilizing electromagnetic waves or infrared rays, may be communication utilizing an electric field, or may be communication utilizing acoustic waves. Examples of a specific communication method can include a communication method utilizing a band of several hundreds MHz (megahertz) to several GHz (gigahertz) such as "Wi-Fi (registered trademark)", "ZigBee (registered trademark)", "Bluetooth (registered trademark)", "Bluetooth Low Energy", "ANT (registered trademark)", "ANT+ (registered trademark)", and "EnOcean (registered trademark)". Proximity wireless communication such as NFC (Near Field Communication) may be employed.

The proximity wireless communication refers to, for example, a proximity field type wireless communication for approximately several centimeters to one meter. For example, a communication method such as a communication method using an RFID (Radio Frequency Identifier) such as ISO/IEC 14443 and infrared communication can be exemplified in addition to NFC.

(Communication Apparatus)

The communication apparatus 2 includes a control unit 21, a first communication unit 22, and a second communication unit 23. A signal reception unit 104 is realized by the first communication unit 22 of the communication apparatus 2.

The control unit 21 controls the first communication unit 22 and the second communication unit 23, and is realized by, for example, a MPU and a CPU. A processor used for the communication unit 42 controls the respective communication circuits. As this processor, for example, an MPU, a CPU, and the like can be exemplified.

A memory that stores apparatus information for identifying the communication apparatus 2 is connected to the processor of the control unit 21, and these processor and memory may configure an MCU (Micro Control Unit).

In addition, an apparatus information individual identifier for identifying the communication apparatus 2 may be stored in the memory of the control unit 21.

The apparatus information is information regarding the communication apparatus 2. The apparatus information includes, for example, an identifier (ID) of the communication apparatus 2, information regarding an attribute of the communication apparatus 2, and the like.

The individual identifier set forth herein may be an identifier specific to the communication apparatus 2 or may be an identifier set by the user.

The first communication unit 22 is configured to be capable of communicating with the communication unit 13 of the transmission apparatus 1. The first communication unit 22 includes, for example, a communication circuit and an antenna using a first communication method. As the first communication method, for example, there can be exemplified a communication method utilizing electromagnetic waves or infrared rays, a communication method utilizing an electric field, a wireless communication method utilizing acoustic waves, and a wired communication method.

The second communication unit 23 includes a communication circuit and an antenna using a second communication method different from the first communication method. In this embodiment, the second communication unit 23 is connected to the network N, and is configured to be capable of communicating with the server apparatus 3. A communication method for connecting to the network N, such as a communication method using a wireless LAN (IEEE802.11, etc.) such as Wi-Fi (registered trademark) or a 3G or 4G network for mobile communication, can be applied as the second communication method.

If the second communication unit 23 employs a communication method such as Wi-Fi, the second communication unit 23 can be connected to the network N via a predetermined access point.

Note that the communication apparatus 2 may include a communication circuit other than the above-mentioned one if necessary.

(Server Apparatus)

The server apparatus 3 includes a control unit 31, a storage unit 32, and a communication unit 33.

The control unit 31 is a processor realized by a CPU, and generally controls the respective blocks of the server apparatus 3. The control unit 31 executes predetermined processing in accordance with control programs or the like which are stored in the storage unit 32.

The storage unit 32 includes, for example, a ROM (Read Only Memory) in which programs to be executed by the control unit 31 are stored and a RAM (Random Access Memory) to be used as a work memory or the like when the control unit 31 executes processing. The storage unit 32 may further include an HDD (Hard Disk Drive) and a nonvolatile memory such as a flash memory (SSD; Solid State Drive).

The communication unit 33 is connected to the network N and is configured to be capable of communicating with the terminal apparatus 4. The communication unit 33 can be connected to the network N through a wireless LAN (IEEE802.11, etc.) such as Wi-Fi (registered trademark) or a network interface of hardware such as a wired LAN.

The server apparatus 3 may include, in addition to the above-mentioned configurations, configurations of a display unit, an input operation unit, and the like in a manner that depends on needs.

(Terminal Apparatus)

The terminal apparatus 4 includes a control unit 41, a storage unit 42, a first communication unit 43, a second communication unit 44, a display unit 45, and an input operation unit 46. The terminal apparatus 4 further includes a casing (not shown) that houses the control unit 41, the storage unit 42, the first communication unit 43, the second communication unit 44, the display unit 45, and the input operation unit 46. The casing is configured to be portable by the user, for example.

The control unit 41 is a processor realized by a CPU, and generally controls the respective blocks of the terminal apparatus 4. The control unit 41 executes predetermined processing in accordance with control programs stored in the storage unit 42.

The storage unit 42 includes a ROM, a RAM, and a nonvolatile memory, and the like.

The first communication unit 43 is configured to be capable of communication using a communication method different from that of the second communication unit 43. The first communication unit 43 is, for example, configured to be capable of wireless communication such as communication utilizing electromagnetic waves and infrared rays and communication utilizing an electric field. The first communication unit 43 may be capable of proximity wireless communication to be used for a communication distance of several centimeters to one meter such as NFC.

The second communication unit 44 is connected to the network N, and is configured to be capable of communicating with the server apparatus 3. Specifically, the second communication unit 44 is connected to the network N by using a wireless LAN (IEEE802.11, etc.) such as Wi-Fi (registered trademark) or a 3G or 4G network for mobile communication and is capable of communication with the server apparatus 3.

The display unit 45 may be realized by a display element such as an LCD (Liquid Crystal Display) and an organic EL (Electroluminescence) panel. The display unit 45 may include a D/A conversion circuit and the like in addition to the display element.

The input operation unit 46 is, for example, a pointing device such as a touch panel, a keyboard, and a mouse, or another input apparatus. If the input operation unit 46 is a touch panel, the touch panel can be integral with the display unit 45.

Note that the terminal apparatus 4 may include, in addition to the above-mentioned configurations, a battery, a camera, a microphone, a speaker, and the like (not shown).

[Functional Configurations of Livestock Management System]

Figure 4:
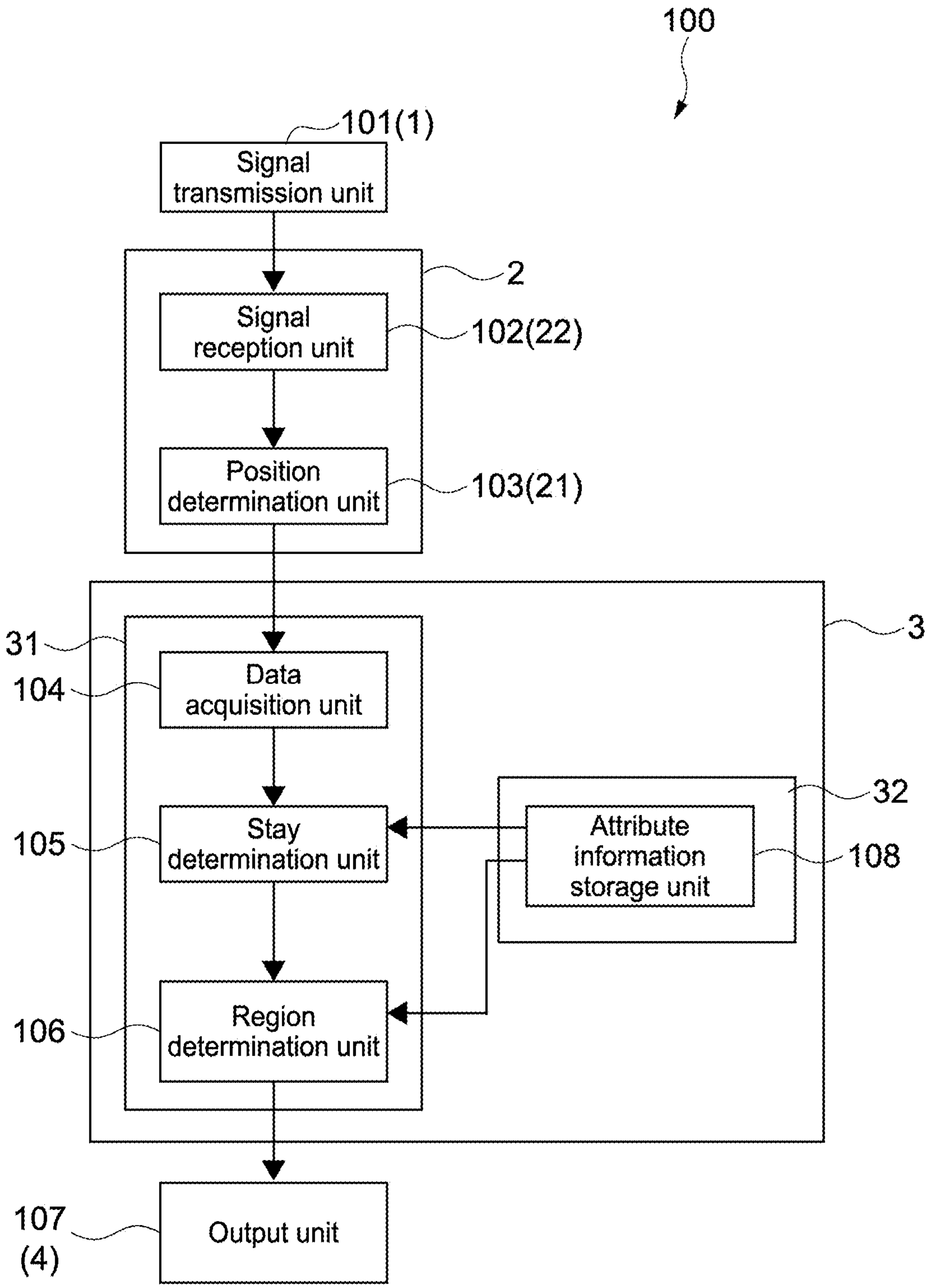
FIG. 4 A block diagram showing functional configurations and a flow of processing of the livestock management system shown in FIG. 1.

FIG. 4 is a block diagram showing functional configurations and a flow of processing of the livestock management system 100.

As shown in FIG. 4, the livestock management system 100 includes a signal transmission unit 101, a signal reception unit 102, a position determination unit 103, a data acquisition unit 104, a stay determination unit 105, a region determination unit 106, an output unit 107, and an attribute information storage unit 108.

In this embodiment, the signal transmission unit 101 of these configurations is realized by the communication unit 13 of the transmission apparatus 1.

The signal reception unit 102 is realized by the first communication unit 22 of the communication apparatus 2.

The position determination unit 103 is realized by the control unit 21 of the communication apparatus 2.

The data acquisition unit 104, the stay determination unit 105, and the region determination unit 106 are realized by the control unit 31 of the server apparatus 3.

The attribute information storage unit 108 is realized by the storage unit 32 of the server apparatus 3.

The output unit 107 is realized by the control unit 41 of the terminal apparatus 4.

A plurality of signal transmission units 101 each transmit an individual identification signal including an individual identifier made corresponding to a livestock animal. Then, the signal reception unit 102 of the communication apparatus 2 receives these individual identification signals.

The position determination unit 103 determines whether or not the individual identification signal transmitted from the transmission apparatus 1 satisfies a first condition under which the transmission apparatus 1 is positioned in a target region.

(1) If information about signal strength when received by one or more communication apparatuses 2 positioned in the target region is added to the individual identification signal transmitted from the transmission apparatus 1, this first condition may include a condition that the signal strength of the individual identification signal belongs to a first strength range. Alternatively, in (1), it may include (1a) a condition that the signal strength of the individual identification signal is equal to or larger than a predetermined threshold. In (1), the position determination unit 103 is capable of performing determination processing as to the first condition by using received signal strength (RSSI: Received Signal Strength Indication) of the individual identification signal.

It is known that the signal strength is correlated to a communication distance. Therefore, by referring to the signal strength, a distance between the transmission apparatus 1 and the communication apparatus 2 upon transmission can be estimated. Therefore, due to the condition (1), the position determination unit 103 is capable of determining the individual identification signal from the transmission apparatus 1 located within a predetermined distance range from the communication apparatus 2. Due to the condition (1a), the position determination unit 103 is capable of determining the individual identification signal from the transmission apparatus 1 located within a predetermined distance from the communication apparatus 2.

Alternatively, if (2) information regarding a transmission position obtained by a GPS or the like is added to the individual identification signal transmitted from the transmission apparatus 1 (see Modified Example 1-5 to be described later), the first condition may include a condition that this transmission position is located in the target region. Due to the condition (2), the position determination unit 103 is capable of more accurately determining the position of the transmission apparatus 1.

Alternatively, the first condition may be (3) another condition. Alternatively, the first condition may be a condition combining a plurality of conditions of (1) to (3) as a condition (4).

The data acquisition unit 104 is attached to a livestock animal, and acquires data regarding a plurality of individual identification signals transmitted from the transmission apparatus 1 that transmits the individual identification signal made corresponding to this livestock animal. The data acquisition unit 104 acquires data about the plurality of individual identification signals, on which determination by the stay determination unit 105 is based, and supplies necessary data to the stay determination unit 105.

The "plurality of individual identification signals" may be a plurality of individual identification signals transmitted from an identical transmission apparatus 1 or may be a plurality of individual identification signals transmitted from different transmission apparatuses 1.

The data regarding the plurality of individual identification signals, which is set forth herein, may include, for example, (A) an individual identifier(s) included in the individual identification signals, (B) apparatus information of the communication apparatus 2, (C) information about signal strength when received by one or more communication apparatuses positioned in the target region, (D) a determination result by the position determination unit 103, (E) information about reception times of the individual identification signals in the communication unit 2, and (F) other information, where (A) to (F) are associated with the plurality of individual identification signals. Alternatively, the data regarding the plurality of individual identification signals, which is set forth herein, may include a plurality of pieces of information of them.

Note that, regarding the information about the reception times of (E), for example, the control unit 21 of the communication apparatus 2 may include a clock circuit and add a time stamp of a point of time at which the individual identification signal is received, to this individual identification signal. Alternatively, the control unit 13 of the transmission apparatus 1 may include a clock circuit and add a time stamp of a point of time at which the individual identification signal is transmitted, to this individual identification signal. In the latter case, a transmission time is handled as the reception time.

The phrases, the data acquisition unit 104 acquires "the data", may be, for example, reading out data stored in the storage unit 32 received during a predetermined time or may be receiving data by controlling the communication unit 33. By reading out the data received during the predetermined time and temporarily stored, the stay determination unit 105 is capable of executing stay determination processing on the basis of the data received within a certain time. Further, the data acquisition unit 104 may acquire data regarding a predetermined number of individual identification signals.

Further, the data acquisition unit 104 may acquire data regarding a plurality of individual identification signals determined to satisfy the above-mentioned first condition. The terminal apparatus 4 may transmit only data about a plurality of individual identification signals determined to satisfy the first condition to the server apparatus 3. Alternatively, the terminal apparatus 4 may transmit all individual identification signals on which determinations have been performed, the data acquisition unit 104 may select and acquire data on the basis of the determination results.

On the basis of the data regarding the plurality of individual identification signals, the stay determination unit 105 determines whether or not the livestock animal is staying within the target region corresponding to the individual identification signal. In this embodiment, the stay determination unit 105 determines whether or not data regarding a plurality of signals determined to satisfy the first condition satisfies a second condition under which the livestock animal stays within the target region.

The phrases, "target region corresponding to the individual identification signal", indicate a target region in which the transmission apparatus 1 is positioned and a target region corresponding to a communication method for an individual identification signal to be described later in Modified Example 1-6.

This second condition can apply the following conditions (1) to (4).

First of all, (1) if the above-mentioned data includes information about a reception time of each of a plurality of individual identification signals in one communication apparatus 2 positioned in the target region, the second condition may include a condition regarding the reception time of each of the plurality of individual identification signals. Due to the condition (1), the stay determination unit 105 is capable of determining that the livestock animal is positioned within the target region for a time range satisfying the condition of "stay". With this, due to the condition (1), stay determination becomes possible if the plurality of individual identification signals are received by one communication apparatus 2 corresponding to a certain region (in case of patterns of (i) and (iii) where one communication apparatus 2 corresponds to each region). As a matter of course, it is also applicable to a case where plurality of individual identification signals are received by a plurality of communication apparatuses 2 corresponding to a certain region (in case of patterns of (i) and (iii) where a plurality of communication apparatuses 2 correspond to each region).

The condition (1) regarding the reception time may be, for example, (1a) a condition that the reception time of each of the plurality of individual identification signals is included in a predetermined time in which it is determined that the livestock animal is staying within the target region. Alternatively, it may be (1b) a condition that the reception times of the plurality of individual identification signals is a frequency equal to or higher than a predetermined frequency. Alternatively, it may be (1c) a condition based on an algorithm generated by machine learning. Alternatively, it may be (1d) another condition under which it can be determined that the livestock animal is staying within the target region. Further, it may be a condition combining a plurality of conditions of (1a) to (1d) as a condition (1e).

Alternatively, if (2) the above-mentioned data includes information about signal strength of each of the plurality of individual identification signals received by the plurality of communication apparatuses 2 positioned in the target region, the second condition may include a condition regarding the signal strength of each of the plurality of individual identification signals. With this, it is possible to estimate the position of the transmission apparatus 1 upon transmission of the individual identification signal.

For example, the condition regarding the signal strength may be a condition or the like as follows. It may be (2a) a condition that the signal strength of each of the plurality of individual identification signals is equal to or larger than a predetermined threshold. Alternatively, it may be (2b) a condition that an average value of signal strength of the plurality of individual identification signals is equal to or larger than a predetermined threshold. Alternatively, it may be (2c) a condition that lowest signal strength among the plurality of individual identification signals is equal to or larger than a predetermined threshold. Alternatively, it may be (2d) a condition that a standard deviation of the plurality of individual identification signals is equal to or smaller than a predetermined value. The "predetermined threshold" described in (2a) may be a threshold identical to a threshold of signal strength in position determination processing or may be a different threshold (e.g., higher threshold).

Due to the conditions (2a) to (2d), stay determination becomes possible in accordance with either of data regarding the plurality of individual identification signals received by one communication apparatus 2 and data regarding the plurality of individual identification signals received by the plurality of communication apparatuses 2.

For example, if the plurality of individual identification signals are received by one communication apparatus 2, by applying the conditions (2a) to (2d), it is possible to consider variations and the like of an average distance, a maximum distance, and a distance of the transmission apparatus 1 from the communication apparatus 2 within an individual identification signal reception time.

Further, if the plurality of individual identification signals are received by the plurality of communication apparatuses 2, by applying the conditions (2a) to (2d), it is possible to consider conditions of variations and the like of an average distance, a maximum distance, and a distance of the transmission apparatus 1 from the plurality of communication apparatuses 2 at a certain point of time.

Other than the conditions (2a) to (2d), the second condition may include (2e) a condition regarding a position of the transmission apparatus, which is estimated on the basis of the signal strength of the plurality of individual identification signals. In particular, if the plurality of individual identification signals are received by a plurality of communication apparatuses 2 corresponding to a certain region (patterns of (ii) and (iv) where a plurality of communication apparatuses 2 correspond to each region), it is possible to more accurately estimate the position of the transmission apparatus 1 (to be described later in detail).

In addition, the second condition may be (2f) a condition based on an algorithm generated by machine learning.

Alternatively, the second condition may be (3) another condition. It may be a condition combining a plurality of conditions of (1) to (3) as a condition (4).

In addition, on the basis of attribute information regarding the attribute of the communication apparatus 2 associated with the apparatus information of each of the plurality of individual identification signals, the stay determination unit 105 may determine one region of the plurality of regions as the target region and determine whether or not the livestock animal stays within the target region determined on the basis of the plurality of individual identification signals.

For example, in the above-mentioned patterns of (i) and (ii) including the plurality of regions, there is a possibility that the plurality of individual identification signals acquired by the data acquisition unit 104 are transmitted from the communication apparatus 2 corresponding to the plurality of regions. In view of this, the stay determination unit 105 is capable of determining, on the basis of the apparatus information of the communication apparatus 2 which is included in the data and stored information about the attribute of the communication apparatus 2, which region corresponds to the communication apparatus 2 that has transmitted the individual identification signal relating to the data, and processing the determined region as the target region.

In the attribute information storage unit 108, data regarding the attribute information is stored.

The attribute information storage unit 108 stores apparatus information for identifying the communication apparatus 2 that has received each of the plurality of individual identification signals and region attribute information of the communication apparatus 2 identified with the apparatus information in association with each other.

The region attribute information may include, for example, information regarding one region of the plurality of regions, which corresponds to a position of the communication apparatus 2. Further, the region attribute information may include information regarding a group of livestock animals managed in the region corresponding to the position of the communication apparatus 2, information about the communication apparatus in stock-raising facilities or a relative position of this region, information (latitude, longitude, etc.) about an absolute position of the communication apparatus 2 or this region, and the like.

The attribute information storage unit 108 may store one piece of region attribute information or may store a plurality of pieces of attribute information for the apparatus information.

FIG. 5 is a diagram showing a configuration example of a region attribute information database stored in the attribute information storage unit 108. It is assumed that "ID" shown in the figure is the identifier of the communication apparatus 2 which is included in the apparatus information, a communication apparatus with ID 001 shown in FIGS. 1 and 2 corresponds to a communication apparatus 2*a*, and a communication apparatus with ID 002 shown in FIG. 1 corresponds to a communication apparatus 2*b*. In the region attribute information database shown in FIG. 5, two pieces of region attribute information, "Name" and "Description", are stored in association with one communication apparatus 2.

For example, it is assumed that "Fence for cow group A" shown in the figure means a "region for managing the cow group A, which is divided with a fence" and indicates the region R1 of FIGS. 1 and 2.

Further, it is assumed that "Fence for cow group B" shown in the figure and similarly indicates the region R2 of FIGS. 1 and 2.

That is, on the basis of the database shown in FIG. 5, it can be seen that the communication apparatus 2*a* is installed in the entrance of the region R1 and the communication apparatus 2*b* is installed in the entrance of the region R2.

The attribute information storage unit 108 further stores the individual identifier and the management target information of the region regarding the attribute of the transmission apparatus 1 identified with the individual identifier in association with each other.

The management target information of the region may include information regarding a region corresponding to the livestock animal wearing the transmission apparatus 1. For example, the information regarding such a region may be information about a group of livestock animals managed in a certain region or may be information about the name of the region and the like.

FIG. 6 is a diagram showing a configuration example of a management target information database of the region, which is stored in the attribute information storage unit 108.

It is assumed that "Cow ID" shown in the figure indicates an individual identifier of the transmission apparatus 1 and "Registered cow group" indicates a group to which a livestock animal corresponding to each cow ID belongs.

For example, the livestock animal whose "Registered cow group" is registered as the cow group A is managed in the region R1 corresponding to "fence for cow group A" shown in FIG. 5. The livestock animal whose "Registered cow group" is registered as the cow group B and is managed in the region R1 corresponding to "fence for cow group B" shown in FIG. 5.

If it is determined that the livestock animal stays within the target region, the region determination unit 106 determines whether or not the determined target region and a region corresponding to the livestock animal wearing the transmission apparatus that is the transmission source of the plurality of individual identification signals are identical to each other, on the basis of the management target information of the region which is stored in the attribute information storage unit 108.

Exemplifying the livestock animal A2 of B of FIG. 2, if it is determined that the livestock animal A2 stays in the region R2 as the target region, the region determination unit 106 determines whether or not this region R2 is identical to a region stored in association with the cow group A belonging to the livestock animal A2. In this case, the region stored in association with the cow group A is the region R1. Therefore, they are not identical to each other. Therefore, it is necessary to inform the user about this determination result to move the livestock animal A2.

The output unit 107 is capable of appropriately outputting the determination result of the region determination unit 106 to the display unit 25 of the terminal apparatus 4 and/or the speaker (not shown) or the like.

Operation Example

Figure 7:
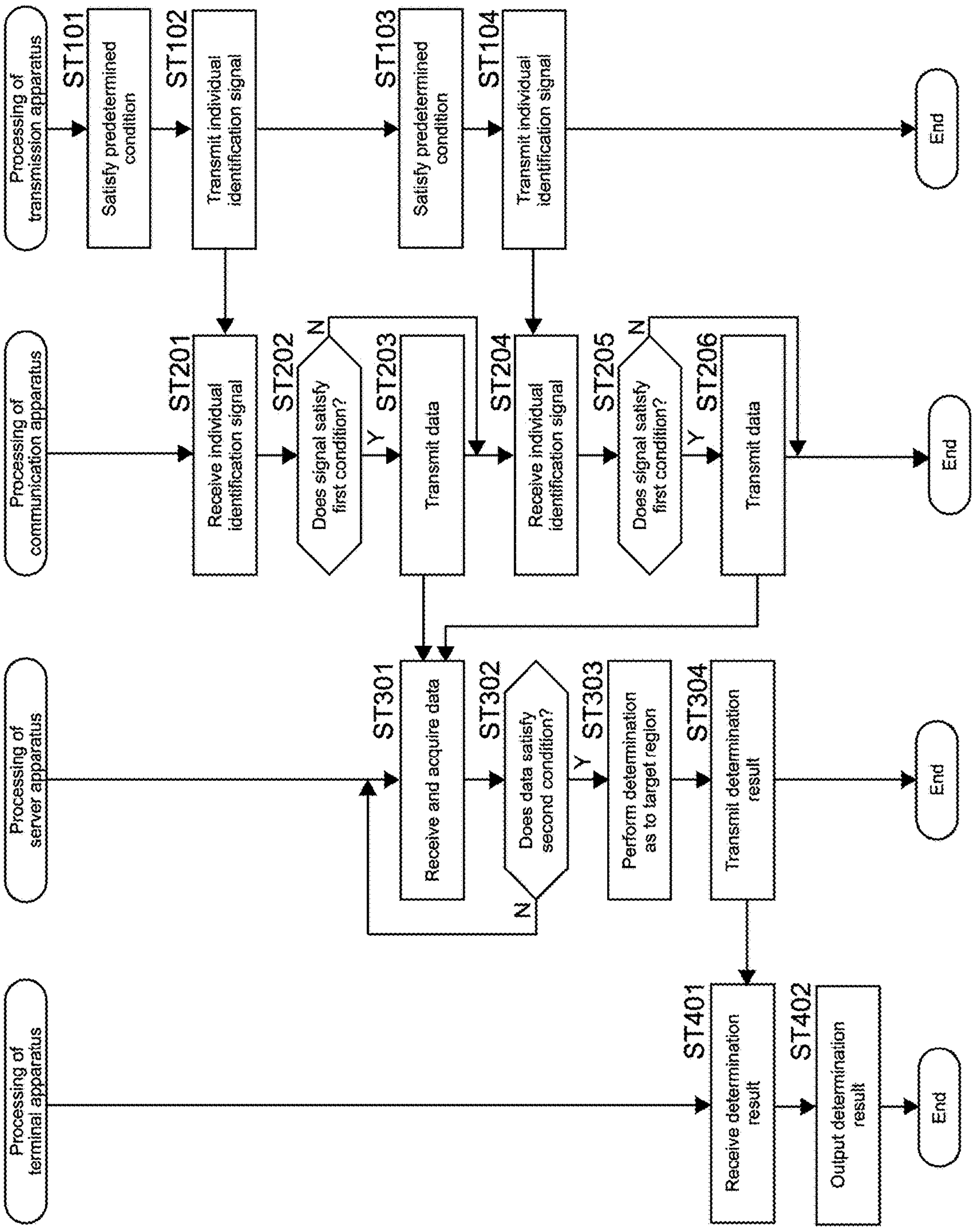
FIG. 7 A flowchart showing an operation example of registration processing of the livestock management system shown in FIG. 1.

FIG. 7 is a flowchart showing an operation example of registration processing of the livestock management system 100.

In this operation example, an example in which the individual identification signal is transmitted to the communication apparatus 2*b* from a transmission apparatus 1*a* attached to the livestock animal A1 of B of FIG. 2 will be described.

Note that, in the figure, processing of ST101 to ST104 is executed by the transmission apparatus 1, processing of ST201 to ST206 is executed by the communication apparatus 2, processing of ST301 to ST306 is executed by the server apparatus 3, and processing of ST401 to ST402 is executed by the terminal apparatus 4.

First of all, if the transmission apparatus 1*a* satisfies a predetermined condition (ST101), the transmission apparatus 1*a* transmits an individual identification signal including an individual identifier for identifying the transmission apparatus 1*a* (ST102). The predetermined condition set forth herein may be, for example, a condition that the amount of electric power generated by the power generation unit 111 (power generation amount) is equal to or larger than a predetermined power generation amount. Alternatively, it may be a condition that it has received a request individual identification signal for the individual identification signal from the communication apparatus 2, the terminal apparatus 4, or the like.

The signal reception unit 102 of the communication apparatus 2 receives the transmitted individual identification signal (ST201). The position determination unit 103 determines whether or not the individual identification signal transmitted from the transmission apparatus 1 satisfies the first condition under which the transmission apparatus 1 is positioned in the target region (ST202). In this operation example, it is assumed that the first condition includes, for example, the above-mentioned condition (1a), i.e., a condition that the signal strength of the received individual identification signal is equal to or larger than the predetermined threshold. This "predetermined threshold" may be set by the terminal apparatus 4 or the server apparatus 3 through machine learning or on the basis of data or the like acquired in advance or may be set by the user.

With this, for example, referring to FIG. 1, the transmission apparatus 1*a* is capable of determining that it is located at a predetermined distance or less from the communication apparatus 2, and capable of determining whether or not the livestock animal A1 wearing the transmission apparatus 1*a* is positioned in vicinity of the entrance of the region R1.

If it is determined that the individual identification signal satisfies the first condition (Y in ST202), the communication apparatus 2 transmits the data regarding this individual identification signal to the server apparatus 3. In this operation example, this data includes (A) the individual identifier included in the individual identification signal, (B) the apparatus information of the communication apparatus 2, and (C) the information about the signal strength when received by the one or more communication apparatuses positioned in the target region, regarding this individual identification signal. In addition, it may include (D) the determination result by the position determination unit 103.

If it is determined that the first condition is not satisfied (N in ST302), the communication apparatus 2 may receive another individual identification signal without transmitting the data (ST304).

On the other hand, if the transmission apparatus 1*a* satisfies the predetermined condition again (ST103), the transmission apparatus 1*a* transmits an individual identification signal including an individual identifier for identifying the transmission apparatus 1*a* (ST104).

Then, as in ST201 to ST203, the communication apparatus 2*b* receives the transmitted individual identification signal (ST204), determines whether or not this individual identification signal satisfies the first condition (ST205), and transmits the data regarding this individual identification signal (ST206).

Note that, without transmitting the data for each individual identification signal as shown in FIG. 7, the communication apparatus 2B may transmit the data regarding the plurality of individual identification signals together.

The server apparatus 3 receives the transmitted data and the data acquisition unit 104 acquires the data regarding the plurality of individual identification signals determined to satisfy the first condition (ST301). The data acquisition unit 104 acquires, for example, the data of each individual identification signal received within the predetermined time and temporarily accumulated in the storage unit 32.

Subsequently, the stay determination unit 105 determines whether or not the acquired data satisfies the second condition under which the livestock animal stays within the target region (ST302). In this operation example, the "plurality of individual identification signals" are a plurality of individual identification signals transmitted from one transmission apparatus 1*a*.

First of all, on the basis of the region attribute information of the communication apparatus 2*b* associated with the apparatus information of each of the plurality of individual identification signals, the stay determination unit 105 determines one region of the plurality of regions as the target region.

For example, on the basis of the region attribute information database shown in FIG. 5, the stay determination unit 105 determines, on the basis of ID "002" of the communication apparatus 2*b*, that the target region is "Cow group B" (region R2).

Then, the stay determination unit 105 determines whether or not the acquired data satisfies the second condition under which the livestock animal stays within the target region determined on the basis of the plurality of individual identification signals.

The second condition includes, for example, (1) the condition regarding the reception time of each of the plurality of individual identification signals. Regarding the condition (1), it may be any condition of the above-mentioned conditions of (1a) to (1e). The second condition may further include (2) the condition regarding the signal strength of each of the plurality of individual identification signals. Also regarding the condition (2), it may be any condition of the conditions (2a) to (2f), though, for example, it can be the conditions (2a) to (2d).

Further, in this operation example, parameters such as a threshold used in each process and a time interval of data acquisition by the data acquisition unit 104 can be set by the user. In this case, the parameters such as the threshold are set on the basis of the input operation from the input operation unit 46 of the terminal apparatus 4, for example.

Figure 8:
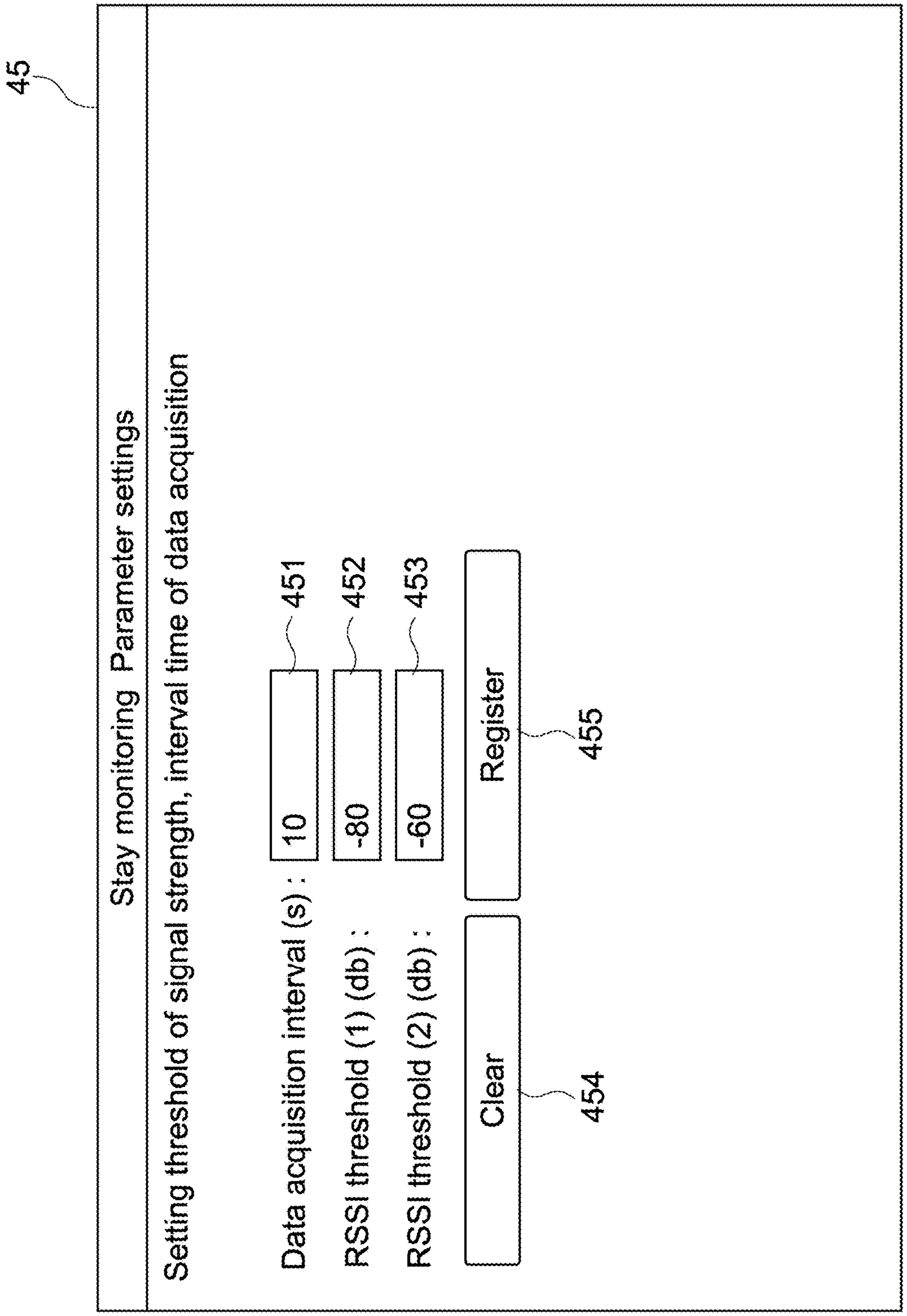
FIG. 8 A diagram showing an example of a setting screen of a parameter, which is displayed on a display unit of a terminal apparatus shown in FIG. 3.

FIG. 8 is a diagram showing an example of a parameter setting screen displayed on the display unit 45 of the terminal apparatus 4.

A data acquisition interval entry field 451 shown in the figure is a field for inputting a time interval of data acquisition by the data acquisition unit 104. An RSSI threshold entry field 452 is a field for inputting the threshold of the signal strength during the position determination processing by the position determination unit 103. An RSSI threshold entry field 453 is a field for inputting the threshold of the signal strength during the determination processing by the stay determination unit 105. Further, a clear button 454 is a button for eliminating an input value, and a registration button 455 is a button for validating an input value.

In addition, other than the example shown in the figure, a roughly estimated distance threshold entry field may be provided on the parameter setting screen in addition to the RSSI threshold entry field or instead of the RSSI threshold entry field. For example, it is assumed that the roughly estimated distance threshold entry field is a field for inputting a threshold of a roughly estimated distance (e.g., X[m] or the like) between the communication apparatus 2 and the transmission apparatus 1, which corresponds to the RSSI. With this, the user can define the distance between the transmission apparatus 1 and the communication apparatus 2 more intuitively than with the value of the RSSI itself.

Subsequently, if it is determined that it satisfies the second condition (Y in ST302), the region determination unit 106 determines whether or not the determined target region and the region corresponding to the livestock animal wearing the transmission apparatus 1 that is the transmission source of the plurality of individual identification signals are identical to each other, on the basis of the information stored in the attribute information storage unit 108 (ST303).

For example, the region determination unit 106 refers to the management target information database of the region shown in FIG. 6, and searches for the region corresponding to the transmitted individual identifier on the basis of the transmission apparatus 1*a*.

For example, if the individual identifier of the transmission apparatus 1*a* is ID 01000313, the registered cow group is the cow group A. With this, the region determination unit 106 determines that "Cow group A" and the determined "Cow group B" do not correspond to each other and the regions are not identical.

Subsequently, the server apparatus 3 transmits the determination results of the stay determination unit 105 and the region determination unit 106 to the terminal apparatus 4 (ST304). For example, the server apparatus 3 may transmit the determination result on the basis of a transmission request from the terminal apparatus 4 or may automatically transmit the determination result to the terminal apparatus 4.

The terminal apparatus 4 receives a transmission result transmitted from the server apparatus 3 (ST401). The output unit 107 outputs, for example, this determination result to the display unit 45 (ST402).

FIG. 9 is a table showing an example of results of stay determination and region determination displayed on the display unit 45.

"Cow ID" and "Registered cow group" shown in the figure are items identical to those stored in the management target information database of the region shown in FIG. 6, and respectively show examples of the individual identifier and the management target information of the region. "Current cow group" indicates a target region in which each livestock animal has been determined. Note that "Monitoring" indicates that the livestock management system 100 is executing processing. Further, a button or the like that allows the user to perform an input operation for starting or stopping the processing may be displayed on this screen.

Referring to the figure, for example, for the livestock animal with ID 01000313 wearing the transmission apparatus 1*a*, the registered cow group and the current cow group are not identical to each other. In this case, for example, a literal character color, a background color, and the like different from those of other cells are applied to a cell showing "Current cow group" of this ID 01000313, and the visibility of this cell is enhanced. With this, it is possible to more reliably notify the user about a livestock animal not managed in a suitable region.

In accordance with this operation example, first of all, the position determination unit 103 determines whether or not the individual identification signal transmitted from the transmission apparatus 1*a* has been transmitted from a predetermined distance range of the communication apparatus 2*b*. Subsequently, the stay determination unit 105 of the server apparatus 3 determines whether or not the individual identification signal determined as having been transmitted from the proximity is one that has been transmitted from the proximity of an identical communication apparatus 2*b* for the predetermined time or more. With this, it is possible to determine whether or not the livestock animal A1 wearing this transmission apparatus 1*a* had stayed in the proximity of the communication apparatus 2*b* for the predetermined time or more. That is, it is possible to determine that the livestock animal is staying within the region corresponding to the position of the communication apparatus 2*b* rather than only passing through the proximity of the communication apparatus 2*b*.

Further, the stay determination unit 105 is capable of determining the target region in which the livestock animal is staying on the basis of the region attribute information of the communication apparatus 2*b* that has received the individual identification signal. Therefore, it can also be applied to stock-raising facilities including a region for managing a plurality of livestock animals.

As described above, in accordance with this embodiment, it is possible to analyze not only the position of the transmission apparatus 1 upon transmission of the individual identification signal, but also transmission positions or the like over time, and determine whether or not each livestock animal stays within the target region. With this, it is possible to automatically determine whether or not each livestock animal is staying in a region that should be managed, and to facilitate management of, especially, a large number of livestock animals.

Further, in accordance with this embodiment, the processing of the position determination unit 103, which is relatively low in processing costs, is executed by the communication apparatus 2, and only the data regarding the individual identification signal, which satisfies the determination condition, is transmitted to the server apparatus 3. With this, it is possible to reduce the processing load of the communication apparatus 2 and to execute, in the server apparatus 3, more detailed analysis using the data about the plurality of individual identification signals. Further, it becomes unnecessary to transmit the data regarding all the individual identification signals to the server apparatus 3, and it is possible to also reduce the costs for the communication processing.

MODIFIED EXAMPLES OF THIS EMBODIMENT

Hereinafter, modified examples of this embodiment will be described. Note that configurations similar to those of the above-mentioned embodiment will be denoted by identical signs, and descriptions thereof will be omitted.

Modified Example 1-1: Modified Example in Case where Correspondence Pattern of Communication Apparatus and Region is (ii)

In the above-mentioned operation example, the case where the correspondence pattern of the communication apparatus and the region is (i) the pattern in which there are a plurality of regions and one communication apparatus 2 corresponds to each region has been described. Now, the case where it is (ii) the pattern in which there are a plurality of regions and a plurality of communication apparatuses 2 correspond to each region will be described.

Figure 10:
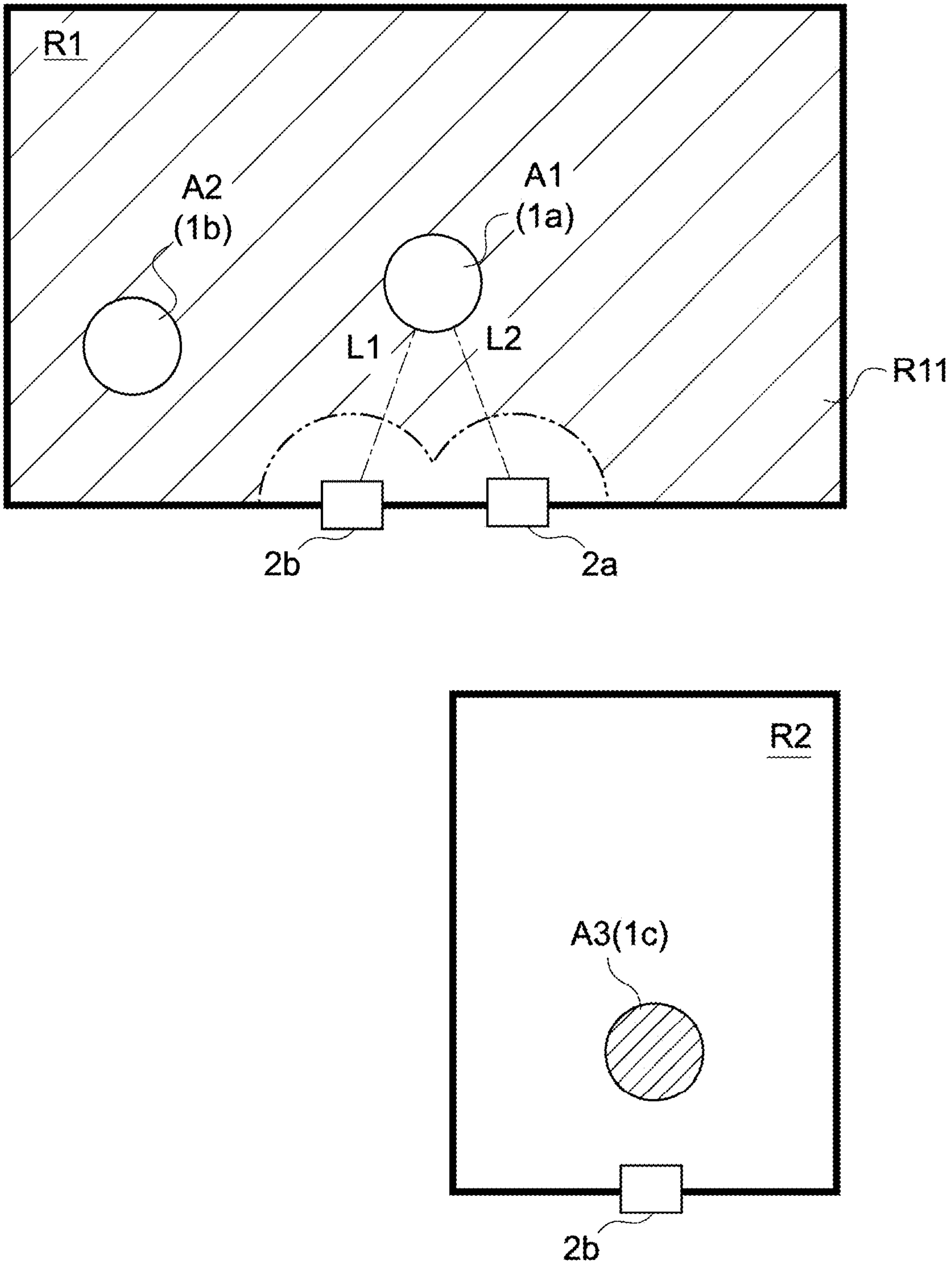
FIG. 10 A schematic diagram showing a position relationship between each region and a communication apparatus according to Modified Example 1-1.

FIG. 10 is a schematic diagram showing a position relationship between each region and the communication apparatus 2 according to Modified Example 1-1.

In the figure, as in FIG. 2, the livestock animals A1 to A3 are managed in the plurality of regions R1, R2 of the stock-raising facilities.

The communication apparatuses 2*a*, 2*b* are arranged in the entrance of the region R1 and communication apparatuses 2*c*, 2*d* are arranged in the entrance of the region R2.

Also in this modified example, there is a possibility that the plurality of individual identification signals acquired by the data acquisition unit 104 are transmitted from the communication apparatuses 2*a* to 2*d* corresponding to the plurality of regions R1, R2.

In view of this, on the basis of the region attribute information of the communication apparatuses 2*a* to 2*d* which are associated with the apparatus information of each of the plurality of individual identification signals, the stay determination unit 105 may determine one region of the plurality of regions R1, R2 as the target region and determine whether or not the livestock animal stays within the target region determined on the basis of the plurality of individual identification signals. The determination of the target region can be executed as in the above-mentioned operation example.

Further, after the stay determination unit 105 determines the target region, the stay determination unit 105 determines whether or not it satisfies the second condition under which the livestock animal stays within the target region determined on the basis of the plurality of individual identification signals.

In this modified example, the second condition includes (2) the condition regarding the signal strength of each of the plurality of individual identification signals. Regarding the condition (2), it may be any condition of the conditions (2a) to (2f). Alternatively, for example, it can be (2e) the condition regarding the position of the transmission apparatus, which is estimated on the basis of the signal strength of the plurality of individual identification signals.

Note that, other than the condition (2), the second condition may also include (1) the condition regarding the reception time of each of the plurality of individual identification signals. It may be another condition of (3). It may be a condition combining a plurality of conditions of (1) to (3) as a condition (4).

Referring to the region R1 of FIG. 10, the condition (2e) will be described.

As described above, the signal strength and the communication distance are correlated to each other. Therefore, for example, if each of the communication apparatuses 2*a*, 2*b* acquires the information about the signal strength regarding the individual identification signal from the transmission apparatus 1*a* worn by the livestock animal A1, distances L1, L2 between the transmission apparatus 1*a* and the respective communication apparatuses 2*a*, 2*b* can be respectively calculated. With this, it is possible to calculate the position of the transmission apparatus 1*a*, i.e., the position of the livestock animal A1 by using triangulation.

Using this calculation method, for example, a condition that the position of the transmission apparatus 1*a*, which is calculated by the plurality of communication apparatuses 2*a*, 2*b*, is a region R11 spaced away from the entrance within the region R1 can be applied as the condition (2e). For example, the region R11 may be a region spaced away by a predetermined distance or more from each of the communication apparatuses 2*a*, 2*b* arranged in the entrance of the region R1 or may be a region spaced away by the predetermined distance or more from the entrance of the region R1. With this, it is possible to reliably determine that the livestock animal A1 is staying inside the region R1.

Modified Example 1-2: Modified Example in Case where Correspondence Pattern of Communication Apparatus and Region is (iii)

The correspondence pattern of the communication apparatus and the region may be (iii) the pattern in which there is only one region and one communication apparatus 2 corresponds to each region. This pattern (iii) is, for example, a pattern including only the region R1 or the region R2 in FIG. 2.

In this modified example, the target region that should be determined is single, and hence the stay determination unit 105 is capable of executing determination as to the second condition without executing the processing of determining a region.

Figure 11:
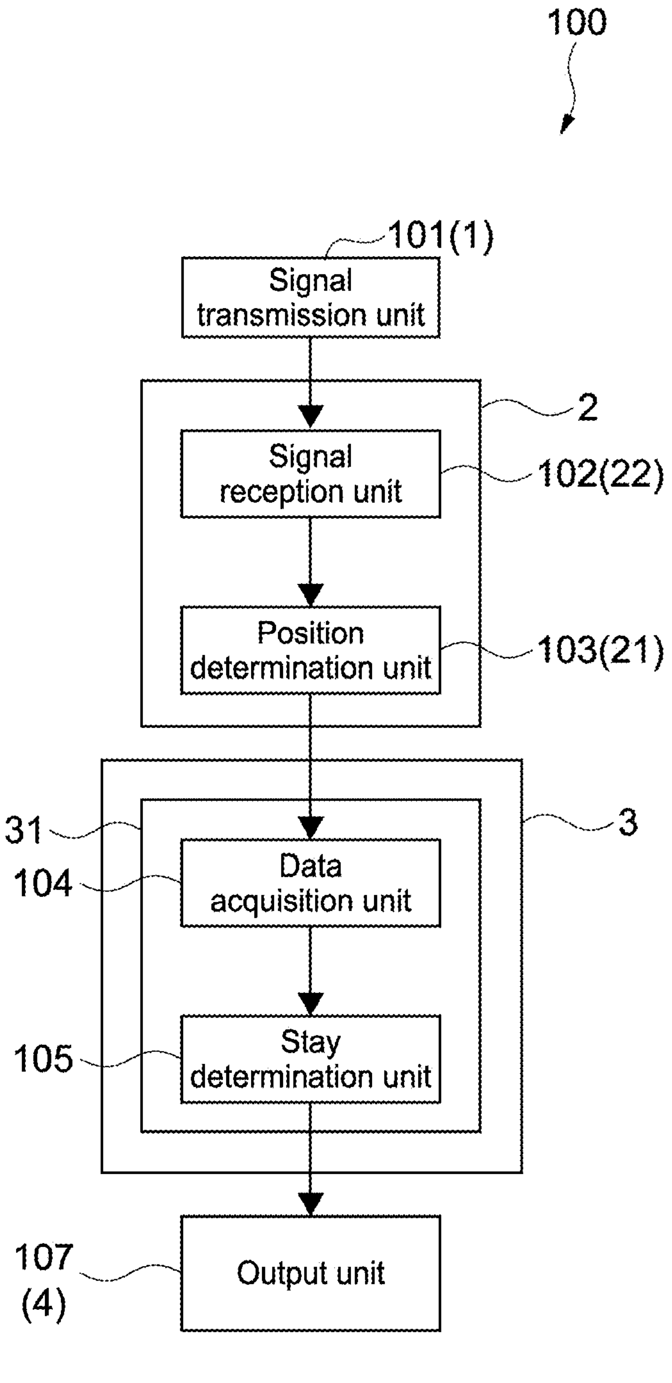
FIG. 11 A block diagram showing functional configurations of a livestock management system according to Modified Example 1-2.

FIG. 11 is a block diagram showing functional configurations of a livestock management system 100 according to Modified Example 1-2.

As shown in the figure, the livestock management system 100 according to this modified example includes a signal transmission unit 101, a signal reception unit 102, a position determination unit 103, a data acquisition unit 104, a stay determination unit 105, and an output unit 107. The livestock management system 100 does not execute the processing of determining a region. Therefore, the livestock management system 100 does not need to include a region determination unit 106. Further, the livestock management system 100 also does not need to consider the correspondence relationship between the communication apparatus 2 and the region. Therefore, the livestock management system 100 can be configured not to include an attribute information storage unit 108.

The second condition used in the determination of the stay determination unit 105 includes at least (1) the condition regarding the reception time of each of the plurality of individual identification signals. Regarding the condition (1), it may be any condition of the conditions (1a) to (1e).

Note that the second condition may include (2) the condition regarding the signal strength of each of the plurality of individual identification signals. It may be another condition of (3). It may be a condition combining a plurality of conditions of (1) to (3) as a condition (4).

Further, the output unit 107 is capable of outputting the determination result of the stay determination unit 105, and capable of notifying the user about whether or not each livestock animal is staying in one target region.

With this, it is possible to determine only whether or not each livestock animal is staying in the above-mentioned target region, and to make the system configuration more simple.

Modified Example 1-3: Modified Example in Case where Correspondence Pattern of Communication Apparatus and Region is (iii)

The correspondence pattern between the communication apparatus 2 and the region may be (iv) the pattern in which there is only one region and a plurality of communication apparatuses 2 correspond to each region. This pattern (iv) is, for example, a pattern including only the region R1 or the region R2 in FIG. 10.

Also in this modified example, the target region that should be determined is single, and hence the stay determination unit 105 is capable of executing determination as to the second condition without executing the processing of determining a region.

Figure 12:
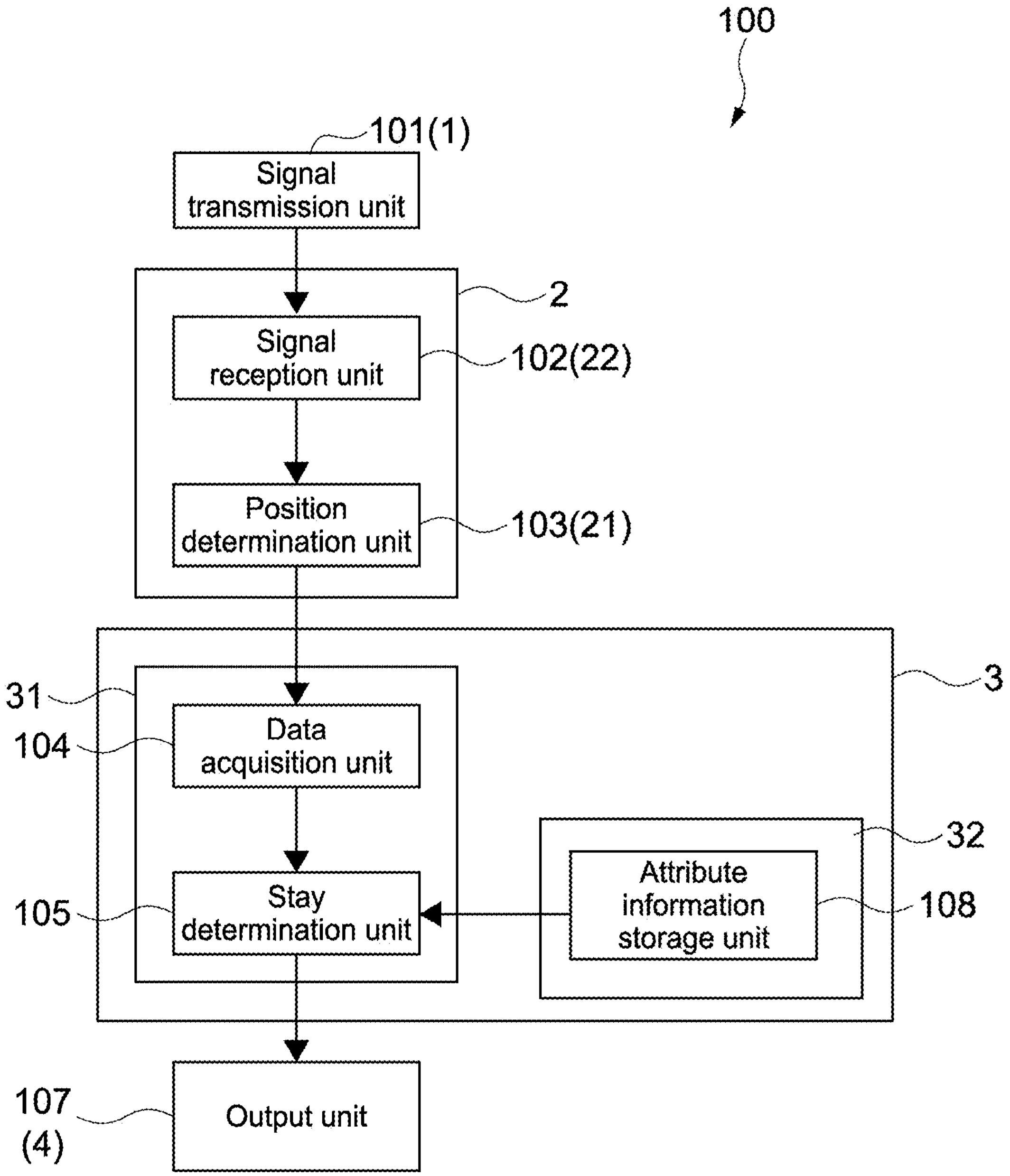
FIG. 12 A block diagram showing functional configurations of a livestock management system according to Modified Example 1-3.

FIG. 12 is a block diagram showing functional configurations of a livestock management system 100 according to Modified Example 1-3.

As shown in the figure, the livestock management system 100 according to this modified example includes a signal transmission unit 101, a signal reception unit 102, a position determination unit 103, a data acquisition unit 104, a stay determination unit 105, an output unit 107, and an attribute information storage unit 108. The livestock management system 100 does not execute the processing of determining a region. Therefore, the livestock management system 100 does not need to include a region determination unit 106.

The second condition used in the determination of the stay determination unit 105 includes at least (2) the condition regarding the signal strength of each of the plurality of individual identification signals. Regarding the condition (2), it may be any condition of the conditions (2a) to (2f). Alternatively, as described above in Modified Example 1-1, for example, it can be (2e) the condition regarding the position of the transmission apparatus, which is estimated on the basis of the signal strength of the plurality of individual identification signals.

Note that the second condition may include (1) the condition regarding the reception time of each of the plurality of individual identification signals. It may be another condition of (3). It may be a condition combining a plurality of conditions of (1) to (3) as a condition (4).

Further, the output unit 107 is capable of outputting the determination result of the stay determination unit 105, and capable of notifying the user about whether or not each livestock animal is staying in the single target region.

Modified Example 1-4: Modified Example Regarding System Configuration

Figure 13:
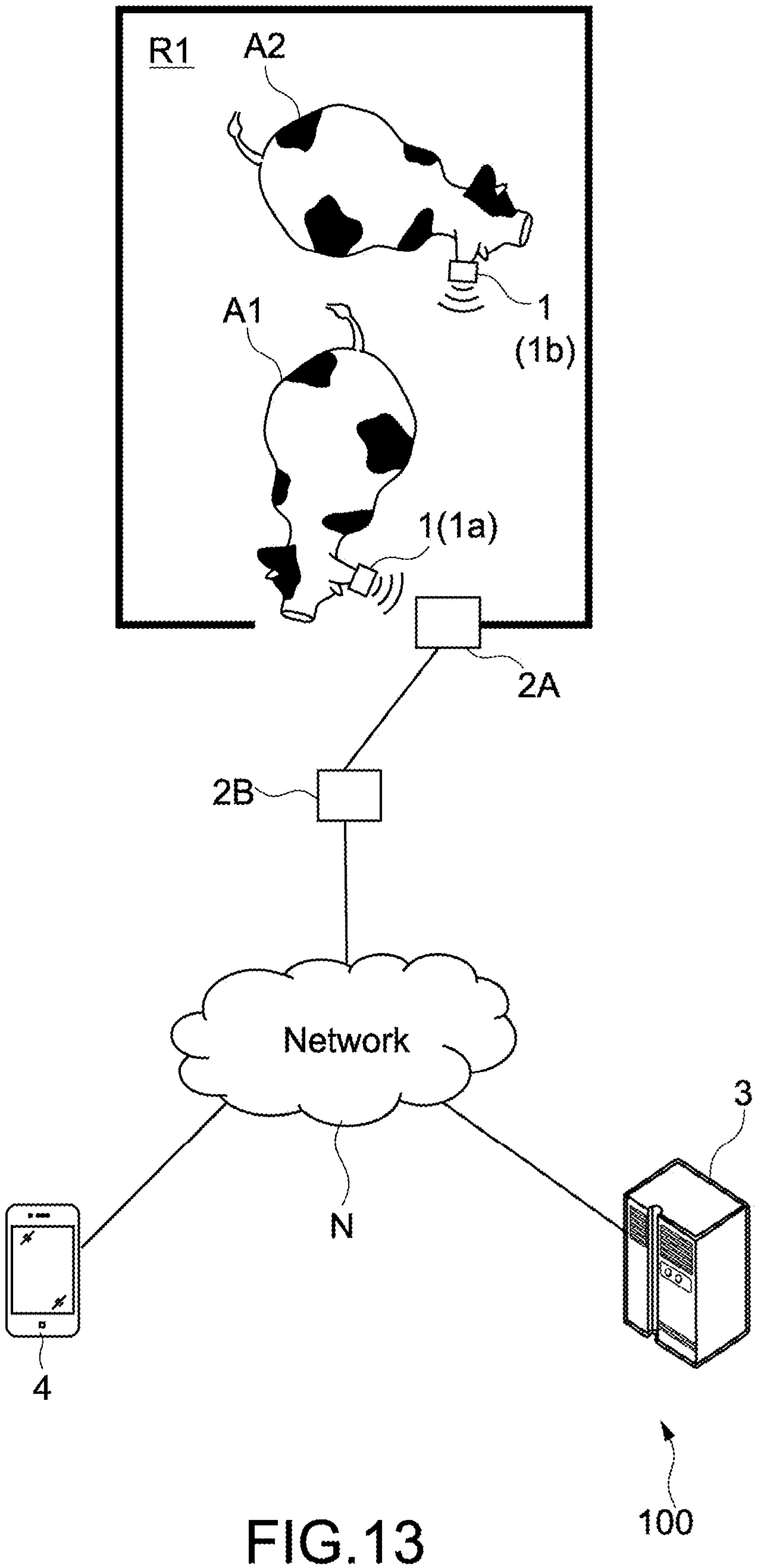
FIG. 13 A schematic diagram showing a schematic configuration of a livestock management system according to Modified Example 1-4.

As shown in FIG. 13, the livestock management system 100 may include a first communication apparatus 2A and a second communication apparatus 2B instead of the communication apparatus 2. The first communication apparatus 2A receives the individual identification signal transmitted from the transmission apparatus 1, and transmits this individual identification signal to the second transmission apparatus 2B. The second communication apparatus 2B receives the individual identification signal transmitted from the first communication apparatus 2A, and transmits the data regarding the individual identification signal received via the network N to the server apparatus 3.

The first communication apparatus 2A functions as the reception apparatus similar to the communication apparatus 2, and the second communication apparatus 2B functions as a relay apparatus.

The first communication apparatus 2A and the second communication apparatus 2B may include a hardware configuration similar to that of the above-mentioned communication apparatus 2.

For example, the first communication unit 22 may be used or another communication circuit may be used for the communication between the first communication apparatus 2A and the second communication apparatus 2B.

In addition, the livestock management system 100 may include three or more communication apparatuses 2.

Figure 14:
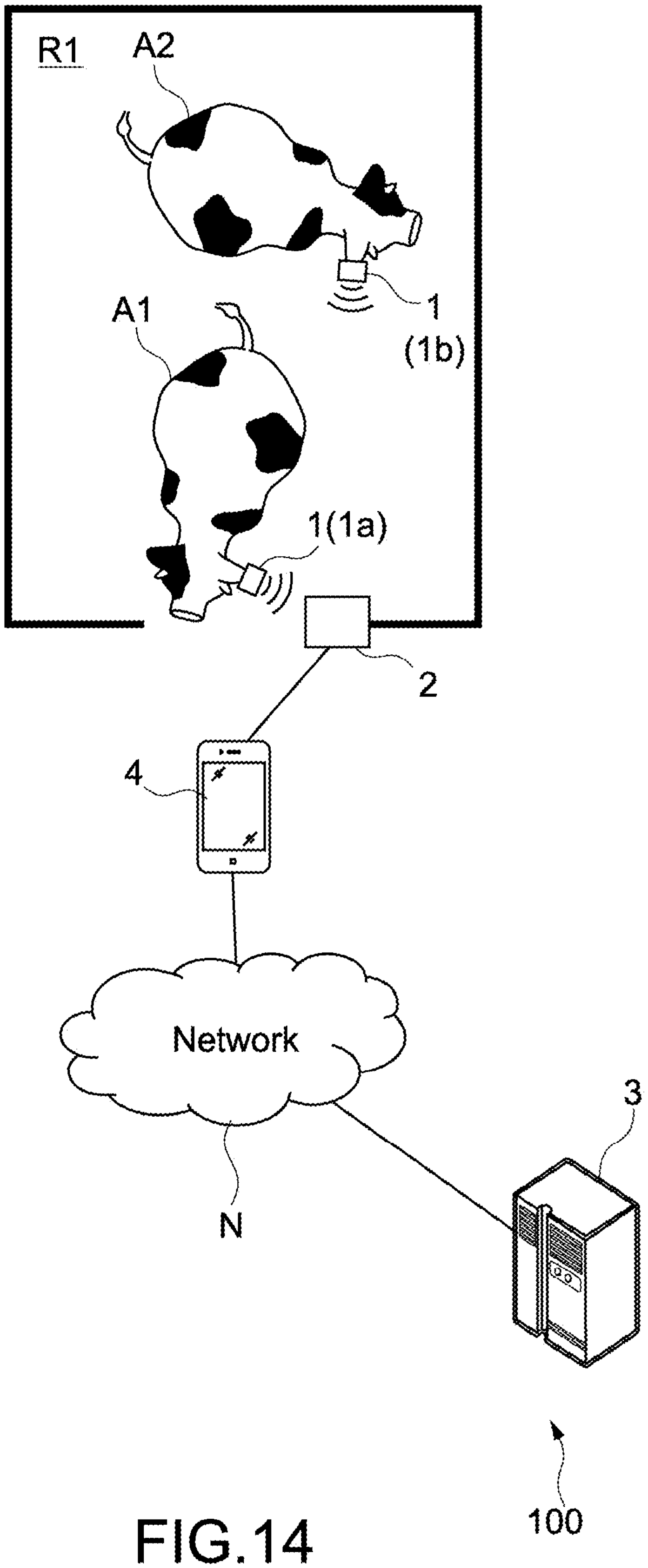
FIG. 14 A schematic diagram showing another schematic configuration of the livestock management system according to Modified Example 1-4.

As another configuration example, as shown in FIG. 14, the communication apparatus 2 may add predetermined information to the received individual identification signal and transmit the individual identification signal to which this predetermined information is added, to the terminal apparatus 4.

Further, this predetermined information may be, for example, (a) the apparatus information of the communication apparatus 2, (b) the information about the signal strength when received by the one or more communication apparatuses positioned in the target region, (c) information about the reception time of each of the plurality of individual identification signals in one communication apparatus positioned in the target region, or (d) other information. Alternatively, this predetermined information may be a combination of the information (a) to (d).

Figure 15:
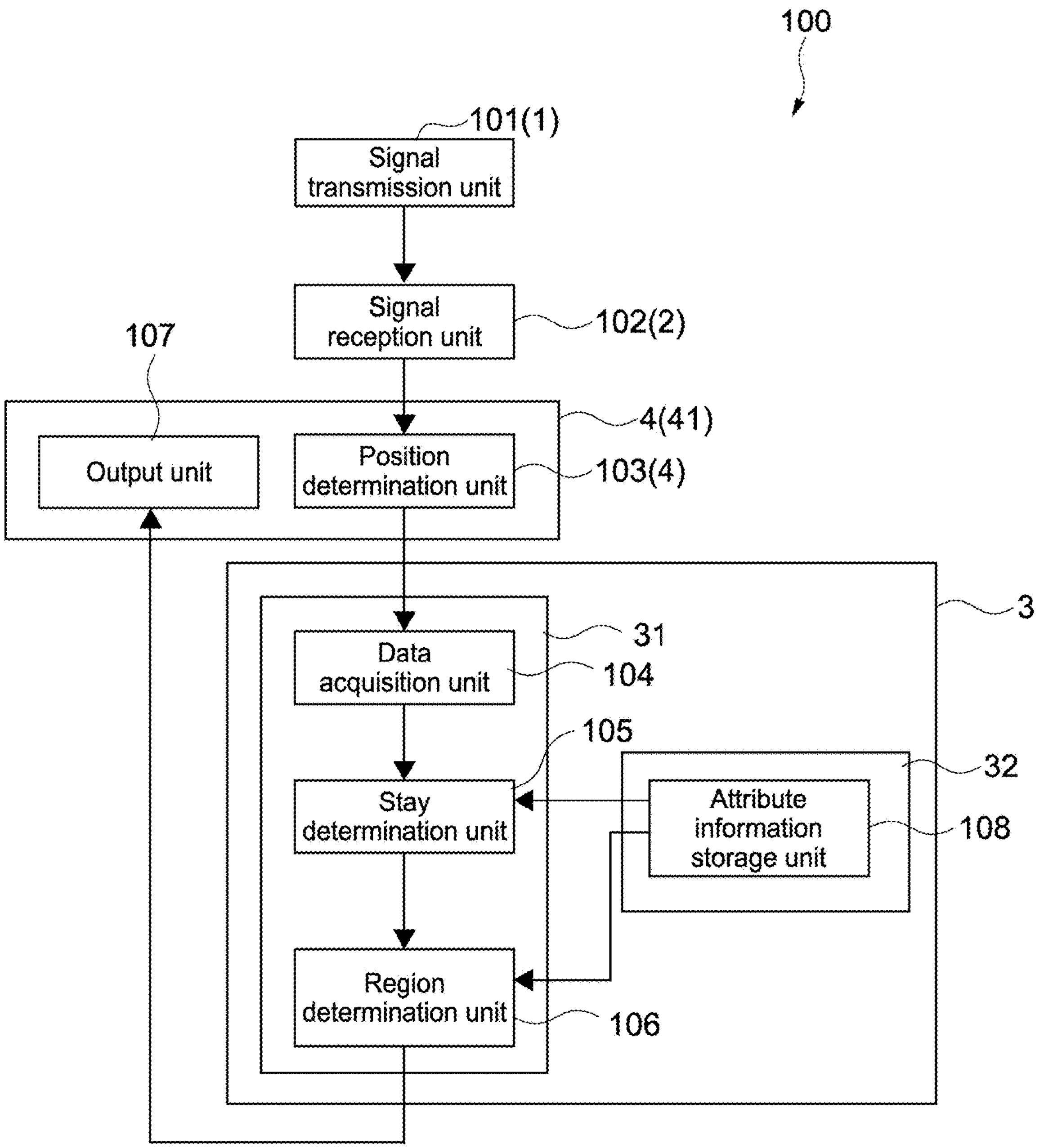
FIG. 15 A block diagram showing functional configurations of a livestock management system according to Modified Example 1-4.

In this case, as shown in FIG. 15, the position determination unit 103 may be realized by the control unit 41 of the terminal apparatus 4.

As another configuration example, although the example in which the communication apparatus 2 and the terminal apparatus 4 are separated from each other, for example, the function of the communication apparatus 2 may be realized by the terminal apparatus 4.

For example, for executing the stay monitoring processing, the terminal apparatus 4 is arranged at the position corresponding to the target region to function as the communication apparatus 2, the stay monitoring processing ends, and then the determination result is output by the terminal apparatus 4.

If the terminal apparatus 4 is a PC or the like, this terminal apparatus 4 may be constantly installed at the position corresponding to the target region. Further, if the terminal apparatus 4 is a portable information terminal such as a smartphone and a tablet, it may be arranged at the position corresponding to the target region only during execution of the stay monitoring processing and moved after the stay monitoring processing ends.

As still another configuration example, the livestock management system 100 only needs to include at least one information processing apparatus (terminal apparatus 4 or server apparatus 3 in above example) at least including the data acquisition unit 104 and the stay determination unit 105, as a management apparatus. That is, for the transmission apparatus, the communication apparatus, and the like, generally-used apparatuses or apparatuses not controlled by such a management apparatus can be applied.

Modified Example 1-5: Modified Example of Transmission Apparatus

The transmission apparatus 1 is not limited to the above-mentioned configuration.

Figure 16:
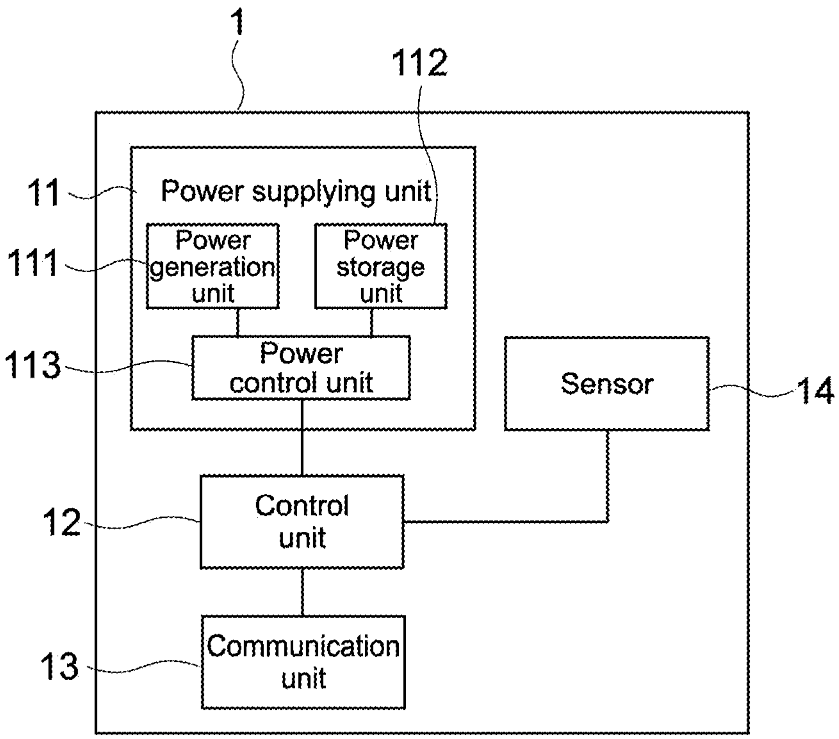
FIG. 16 A block diagram showing a hardware configuration of a transmission apparatus according to Modified Example 1-5.

For example, the transmission apparatus 1 may include, as shown in FIG. 16, a sensor unit 14 that acquires the information relating to a surrounding environment.

The signal transmission unit 101 of the transmission apparatus 1 is capable of transmitting sensor data obtained by the sensor unit 14 together with the individual identifier. The communication apparatus 2, the server apparatus 3, the terminal apparatus 4, and the like are capable of receiving and making use of the sensor data.

The sensor unit 14 may be a position information sensor such as a GPS. This sensor unit 14 can also function as a position information acquisition unit that acquires position information of the transmission apparatus 1. With this, the position determination unit 103 and/or the stay determination unit 105 is capable of performing the determination processing by using this position information.

Further, the sensor unit 14 may include an activity amount sensor such as a vibration sensor and an acceleration sensor, and a vital sensor for a livestock animal such as a body temperature sensor that outputs vital data of a livestock animal. With this, the control unit 31 of the server apparatus 3 or the like is capable of causing the attribute information storage unit 108 to store the received sensor data in association with the individual identifier. For example, the output unit 107 may display information of the sensor data to the user together with the determination result and the like of the stay monitoring processing or may output it in accordance with to a user's request.

In addition, the sensor unit 14 may include a sensor capable of measuring data relating to weather, such as temperature, humidity, rainfall, wind velocity, and atmospheric pressure.

Figure 17:
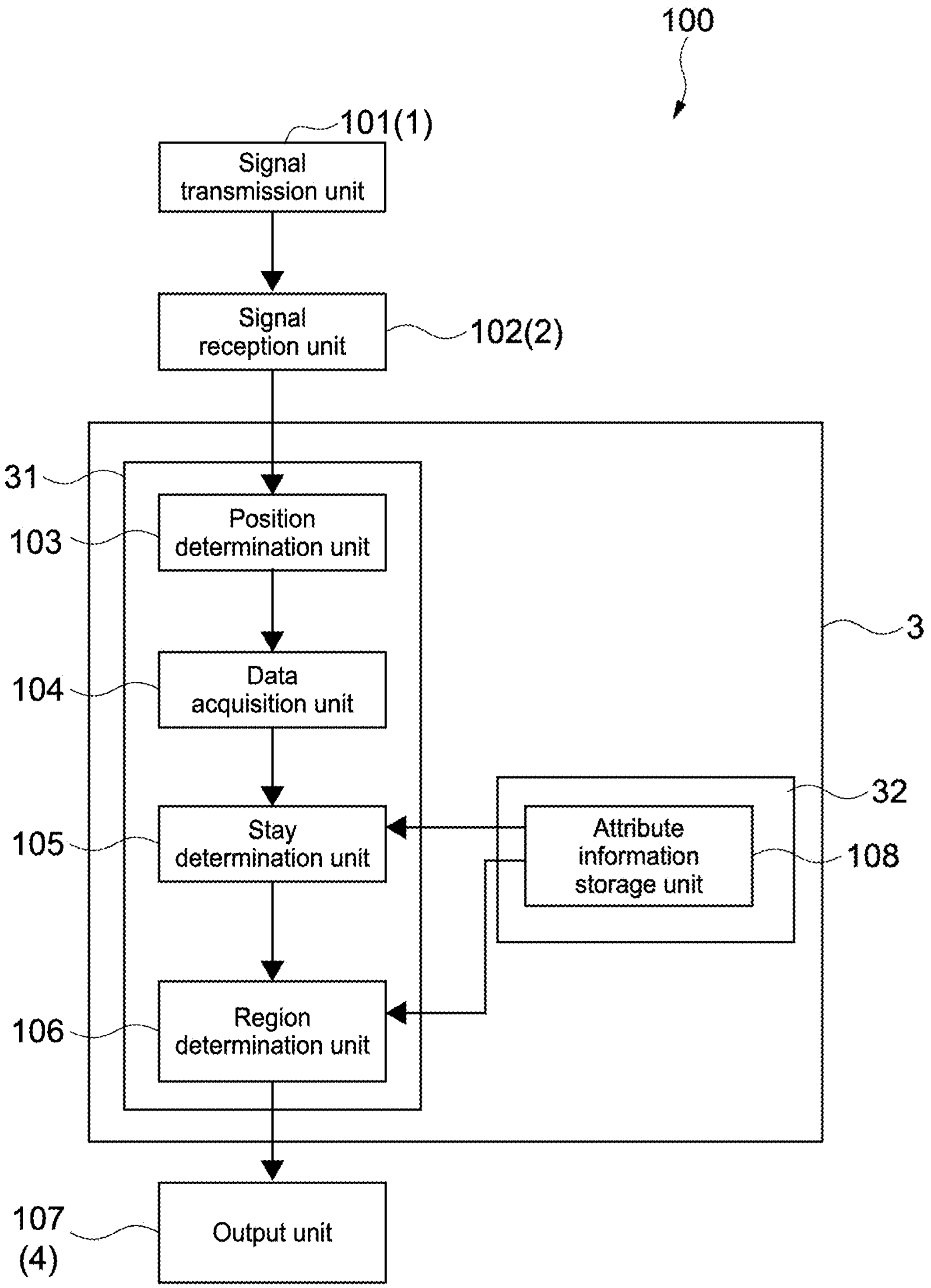
FIG. 17 A block diagram showing an example of functional configurations of a livestock management system in Modified Example 1-5.

FIG. 17 is a block diagram showing an example of functional configurations of a livestock management system 100 in Modified Example 1-5. As shown in the figure, in the livestock management system 100, a position determination unit 103 may be realized by a control unit 31 of a server apparatus 3. In this case, a communication apparatus 2 is capable of transmitting all individual identification signals to the server apparatus 3 without filtering received individual identification signals. With such a configuration, the server apparatus 3 is capable of also making use of sensor data of an individual identification signal having low signal strength (RSSI). In addition, position determination can also be precisely performed.

Modified Example 1-6: Modified Example Without Position Determination Unit

Figure 18:
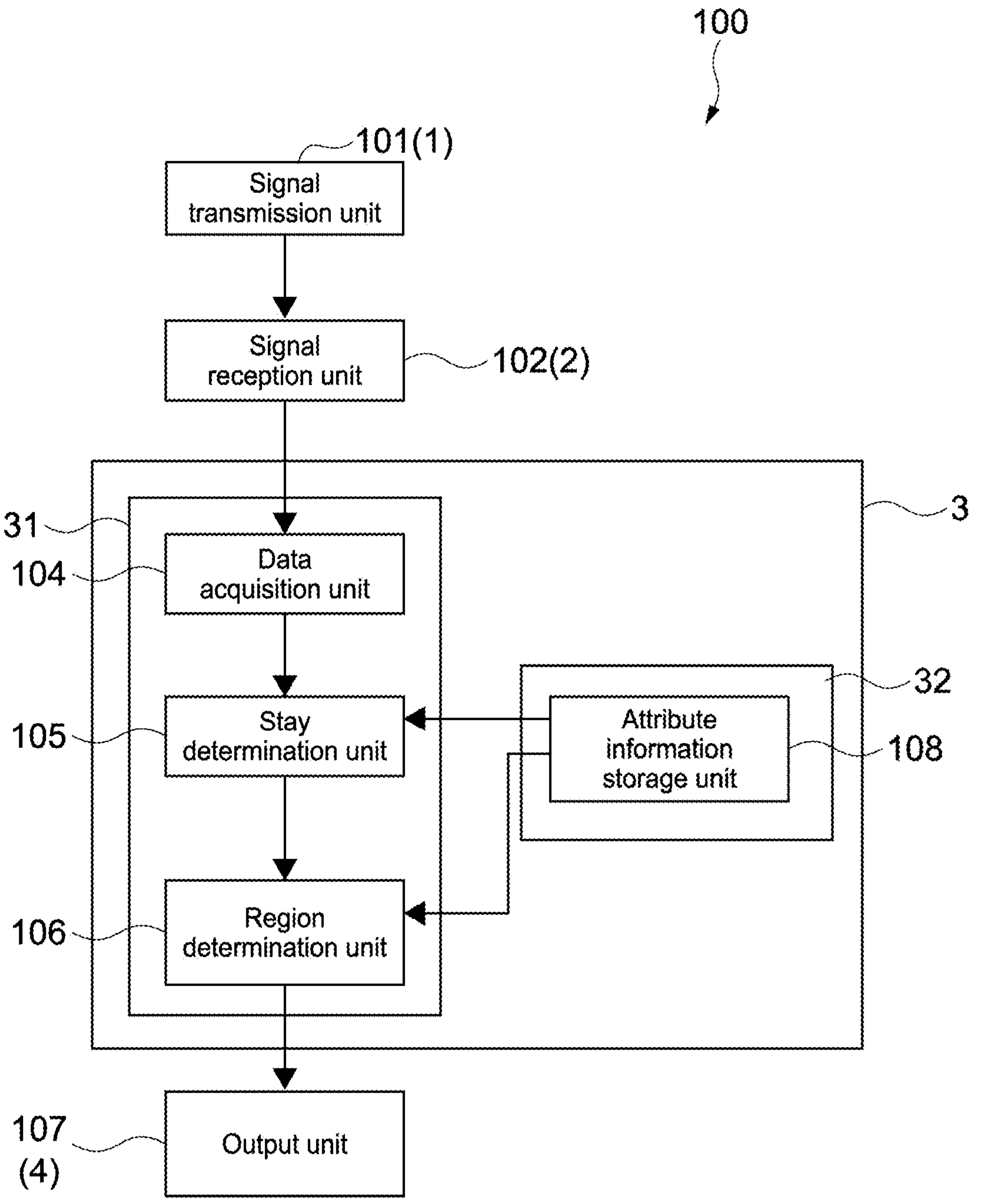
FIG. 18 A block diagram showing functional configurations of a livestock management system according to Modified Example 1-6.

FIG. 18 is a block diagram showing functional configurations of a livestock management system 100 in Modified Example 1-6. As shown in the figure, the livestock management system 100 may be configured not to include the position determination unit.

In this case, for example, a signal reception unit 102 has directivity regarding reception of an individual identification signal, and may be configured to receive an individual identification signal transmitted in a direction from the inside of the target region. With this, a data acquisition unit 104 is capable of acquiring the data regarding the plurality of individual identification signals transmitted from a transmission apparatus 1 attached to a livestock animal and located at a position corresponding to a target region. The signal reception unit 102 having such a configuration can be realized by adjusting the directivity or the like of an antenna of a first communication unit 22.

Alternatively, the data acquisition unit 104 may acquire data regarding the individual identification signal transmitted from the transmission apparatus 1 in accordance with a communication method corresponding to the target region. In this case, the communication unit 13 of the transmission apparatus 1 includes a plurality of communication circuits using different communication methods, and is configured to be capable of switching a communication method inside/outside the target region. For example, the communication unit 13 is switched to a communication method by which short-distance wireless communication of Bluetooth (registered trademark), infrared communication, or the like can be performed within the target region, and switched to a communication method for a longer communication distance (e.g., communication method utilizing radio waves in a frequency band of approximately several hundreds of MHz) outside the target region. A switching method of the communication unit 13 in the transmission apparatus 1 is not particularly limited. It may be switched on the basis of an outside individual identification signal or may be switched on the basis of information about a sensor or the like installed within the transmission apparatus 1.

In this example, the signal reception unit 102 of the communication apparatus 2 is capable of receiving an individual identification signal in accordance with the communication method corresponding to the target region, and is configured to be incapable of receiving an individual identification signal according to a communication method not corresponding to the target region. With this, the signal reception unit 102 is capable of receiving only the individual identification signal transmitted from the transmission apparatus 1 positioned within the target region.

Further, after the signal reception unit 102 receives the individual identification signal irrespective of the communication method, the signal reception unit 102 may transmit only the individual identification signal of the communication method corresponding to the target region to the server apparatus 3.

Modified Example 1-7: Modified Example Regarding Output Unit

The output unit 107 is not limited to the configuration realized by the terminal apparatus 4.

For example, the output unit 107 may be realized by the communication apparatus 2. In this case, the communication apparatus 2 includes an LED (Light Emitting Diode) capable of lighting up, a speaker, a display device, or the like, and the output unit 107 is realized by these configurations. In this example, the server apparatus 3 is capable of transmitting an individual identification signal of an output instruction to the output unit 107 of the communication apparatus 2 via the network N or the like.

For example, if the target region in which the livestock animal on which the stay monitoring processing has been executed stays and the region registered in the attribute information storage unit 108 are not identical to each other, the communication apparatus 2 (output unit 107) at the position corresponding to the target region can light up, to thereby notify the user about it. Alternatively, this communication apparatus 2 (output unit 107) may output audio such as warning sound and announce. Further, this communication apparatus 2 (output unit 107) may display, on the display device, the fact that a livestock animal of an unsuitable group is mixed and identification information or the like of that livestock animal.

Alternatively, the output unit 107 may be realized by the transmission apparatus 1. In this case, the transmission apparatus 1 includes an LED capable of lighting up, a speaker, or the like, and the output unit 107 is realized by these configurations. In this example, the server apparatus 3 is capable of transmitting the individual identification signal of the output instruction to the output unit 107 of the transmission apparatus 1 through the communication apparatus 2.

For example, if the target region in which the livestock animal on which the stay monitoring processing has executed stays and the region registered in the attribute information storage unit 108 are not identical to each other, the transmission apparatus 1 (output unit 107) worn by this livestock animal can lights up, to thereby notify the user about it. Alternatively, this communication apparatus 2 (output unit 107) may output warning sound.

Modified Example 1-8: Modified Example in which Processing is Executed on Basis of Individual Identification Signals of Plurality of Transmission Apparatuses The data acquisition unit 104 may acquire data regarding the plurality of individual identification signals transmitted from the plurality of transmission apparatuses 1, and the stay determination unit 105 may execute the stay determination processing on the basis of this data.

For example, due to the plurality of individual identification signals whose position has been determined by the position determination unit 103, the stay determination unit 105 is capable of acquiring information regarding positions of the plurality of transmission apparatuses 1 (livestock animals) at a certain point of time. In addition, the stay determination unit 105 is capable of analyzing the plurality of individual identification signals transmitted from the respective transmission apparatuses at different points of time, to thereby analyze movement histories of the plurality of transmission apparatuses 1, i.e., behavior histories of the plurality of livestock animals. With this, it is possible to determine whether or not each livestock animal is staying within the target region on the basis of motions of other livestock animals.

Modified Example 1-9: Other Modified Examples

The stay monitoring processing of this embodiment can also be applied not only to the livestock management system but also a warning system for persons.

That is, the warning system at least includes the stay determination unit. On the basis of data regarding a plurality of individual identification signals transmitted from a transmission apparatus attached to a target person and positioned in a target region in which this target person can stay, the stay determination unit determines whether or not this target person stays within the target region.

Specifically, the target region can be a living room of the target person, facilities where the target person can stay, a region in facilities where the target person stays, and the like.

With this, a stay place of an elderly person who suffers from dementia or is suspected to be dementia or a child or the like who can be lost can be estimated, and the safety for the elderly person or child or the like can be secured.

In addition, for outputting the determination result, the warning system for persons is capable of checking authority of the terminal apparatus and outputting a limitative result in accordance with this authority. With this, it is possible to allow sufficient information disclosure to family and concerned people, and to prevent a result of this system to be utilized with foul intention.

Further, as described above, the "livestock (animals)" in the present technology also includes companion animals raised as pets. Therefore, the livestock management system according to the present technology can be applied to breeding management of pets, search for lost pets, and the like.

Second Embodiment: Apparatus Registration Processing

Figure 19:
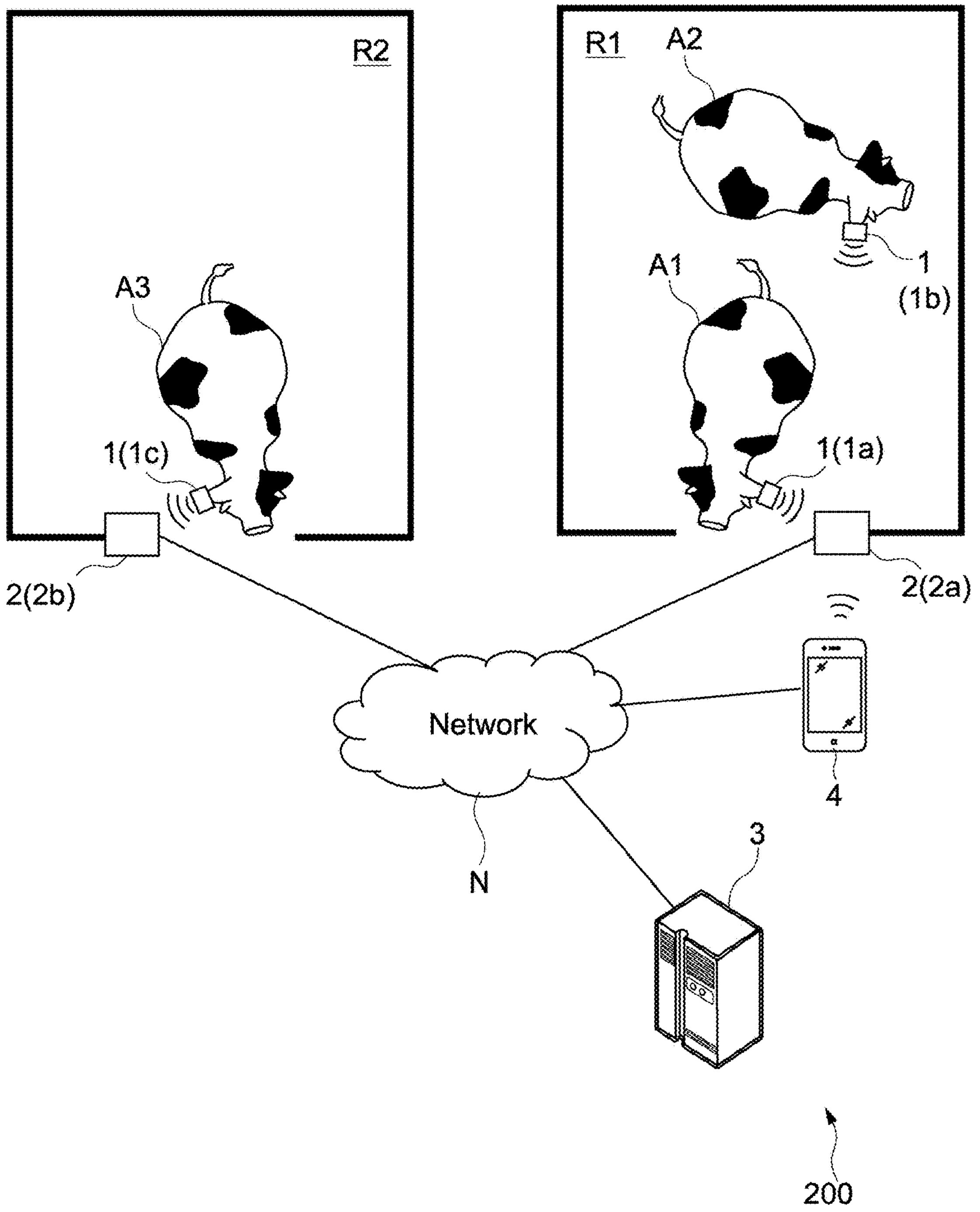
FIG. 19 A schematic diagram showing a schematic configuration of a livestock management system according to a second embodiment of the present technology.

FIG. 19 is a schematic diagram showing a schematic configuration of a livestock management system according to a second embodiment of the present technology.

As shown in the figure, a livestock management system 200 includes a plurality of transmission apparatuses 1 that each transmit individual identification signals, a plurality of communication apparatuses 2 that each receive individual identification signals from the plurality of transmission apparatuses 1, a server apparatus 3 that executes processing on the basis of individual identification signals received by these communication apparatuses 2, and a terminal apparatus 4 that is used by the user.

Further, in the following description, configurations similar to those of the above-mentioned embodiment will be denoted by identical signs, and descriptions thereof will be omitted.

For example, as in the first embodiment, if processing based on an individual identification signal transmitted from the livestock animal is executed, information regarding the transmission apparatus 1 that has transmitted the individual identification signal and the communication apparatus 2 that has received the individual identification signal can be required. Therefore, a troublesome process for registering information regarding each apparatus can be required when or after the transmission apparatus 1 and the communication apparatus 2 are introduced.

In view of this, in this embodiment, in addition to such a problem, it is an object to provide a livestock management system and a management method for livestock by which an apparatus can be easily registered.

Further, the "apparatus" set forth herein refers to an apparatus capable of communication of the individual identification signal in a local range within stock-raising facilities. Examples of the "apparatus" can include the transmission apparatus 1 and the communication apparatus 2.

Further, it is assumed that the "identification information" in the following description collectively refers to identification information for identifying the apparatus, which includes the individual identifier of the transmission apparatus 1 and the apparatus information of the communication apparatus 2, which have been described in the above embodiment. Similarly, the "attribute information" collectively refers to information regarding an attribute of the apparatus, which includes the management target information of the region of the transmission apparatus 1 and the region attribute information of the communication apparatus 2.

[Hardware Configuration of Livestock Management System]

Figure 20:
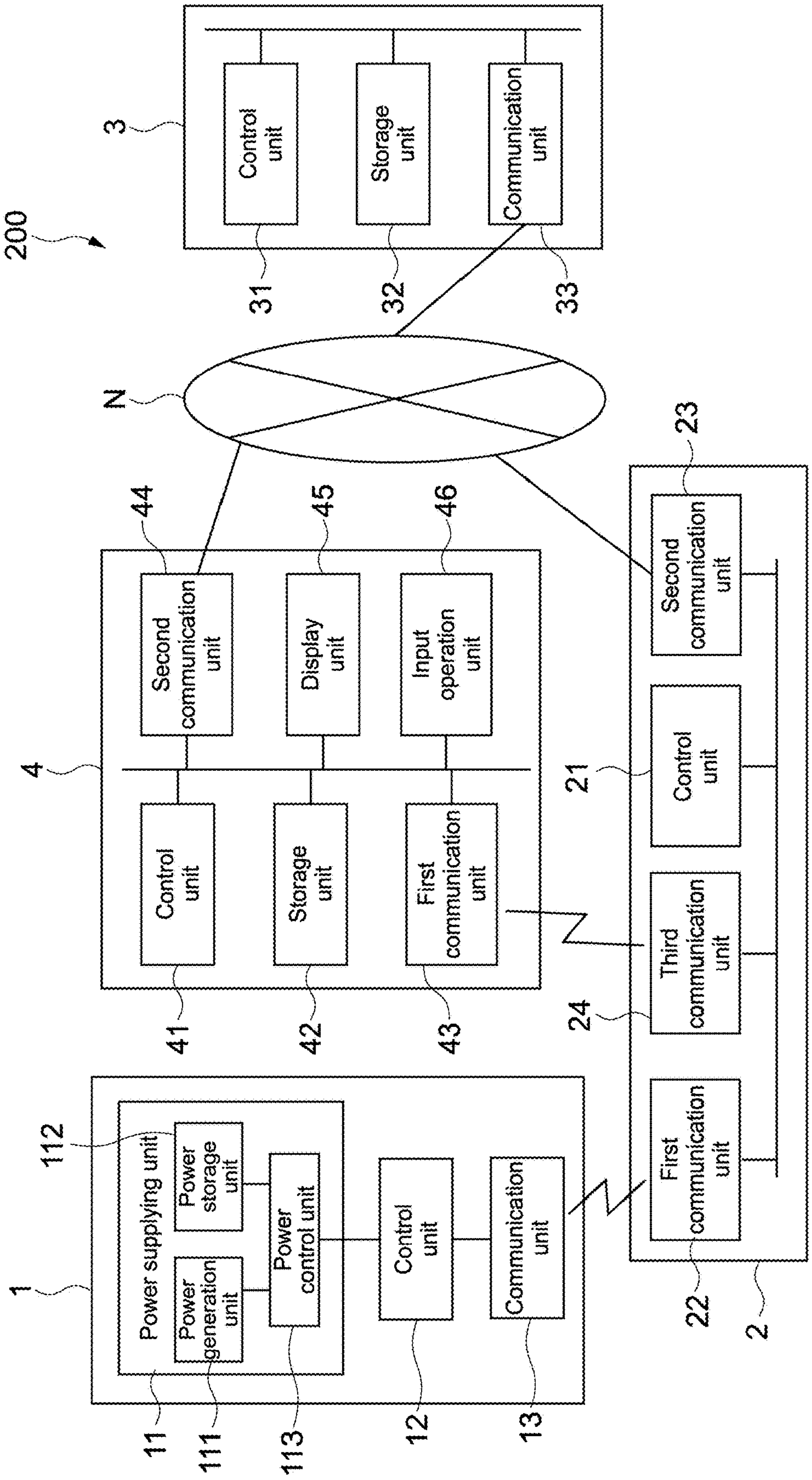
FIG. 20 A block diagram showing hardware configurations of respective apparatuses included in the livestock management system shown in FIG. 19.

FIG. 20 is a block diagram showing hardware configurations of respective apparatuses included in the livestock management system 200. The livestock management system 200 is different from the livestock management system 100 described in FIG. 2 in that the communication apparatus 2 further includes a third communication unit 24.

The third communication unit 24 of the communication apparatus 2 includes a communication circuit and an antenna using a communication method different from the above-mentioned first and second communication methods, and is configured to be capable of communicating with the first communication unit 43 of the terminal apparatus 4.

The third communication unit 24 is configured to be capable of short-distance wireless communication. For example, the third communication unit 24 is configured to be capable of wireless communication such as communication utilizing electromagnetic waves or infrared rays and communication utilizing an electric field. The first communication unit 43 may be capable of proximity wireless communication such as NFC.

[Functional Configurations of Livestock Management System]

Figure 21:
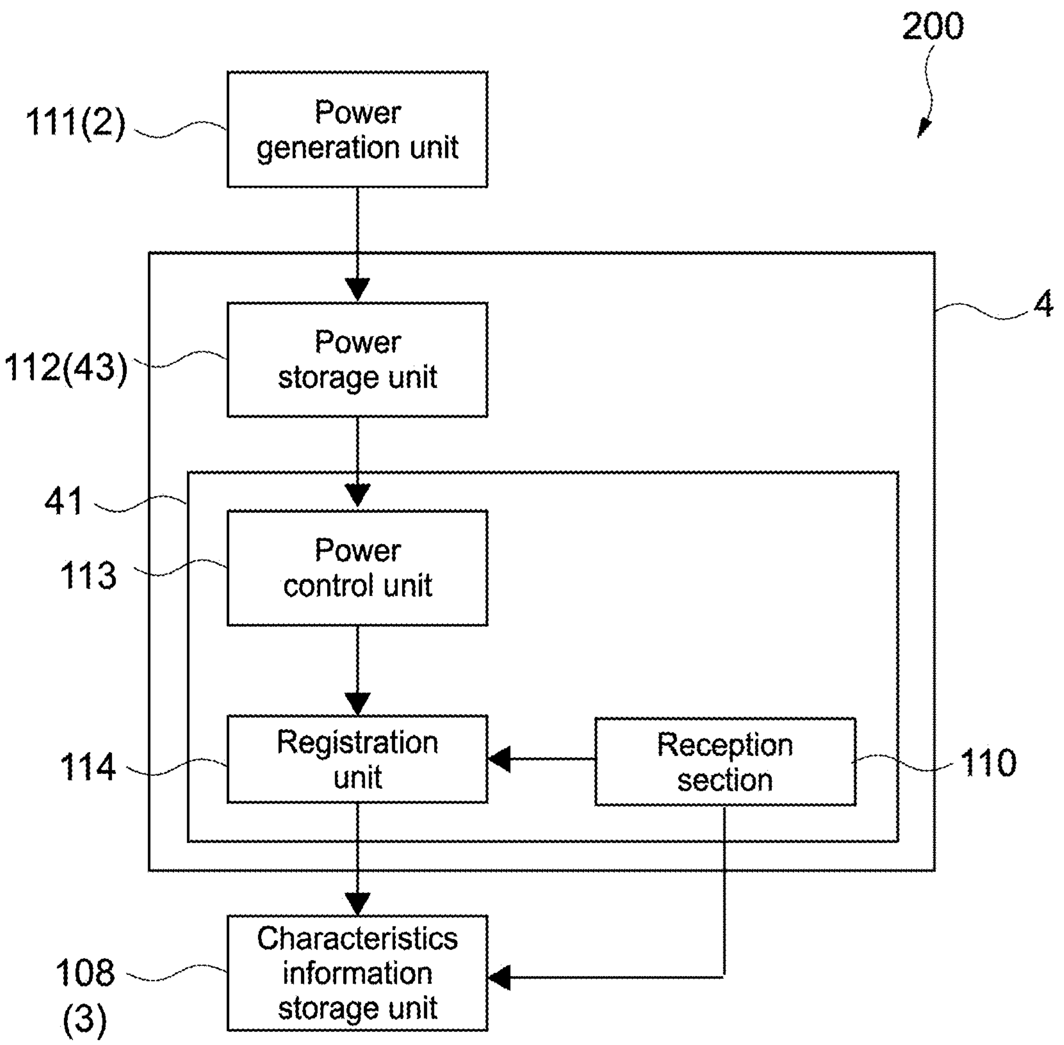
FIG. 21 A block diagram showing functional configurations a configuration and a flow of processing of the livestock management system.

FIG. 21 is a block diagram showing functional configurations and a flow of processing of the livestock management system 200.

As shown in FIG. 21, the livestock management system 200 includes a reception section 110, an identification information transmission unit 111, an identification information reception unit 112, an identification information acquisition unit 113, a registration unit 114, and an attribute information storage unit 108.

In this embodiment, the identification information transmission unit 111 of these configurations is realized by the third communication unit 24 of the communication apparatus 2.

The identification information reception unit 112 is realized by the first communication unit 43 of the terminal apparatus 4.

The reception section 110, the identification information acquisition unit 113, and the registration unit 114 are realized by the control unit 41 of the terminal apparatus 4.

The attribute information storage unit 108 is realized by the storage unit 32 of the server apparatus 3.

The reception section 110 receives an input operation from the user. The reception section 110 receives, for example, information input from the input operation unit 26 or the like of the terminal apparatus 4.

The reception section 110 receives, for example, input information or the like regarding an attribute of the apparatus to be described later.

In this embodiment, the attribute information storage unit 108 stores a plurality of pieces of attribute information regarding the attribute of the apparatus such as the communication apparatus 2 and the transmission apparatus 1.

The plurality of pieces of attribute information set forth herein refer to a plurality of pieces of attribute information corresponding to one apparatus. For example, if the "apparatus" is the communication apparatus 2, the attribute information storage unit 108 stores a plurality of pieces of region attribute information regarding the attribute of the communication apparatus 2. Further, if the "apparatus" is the communication apparatus 1, the attribute information storage unit 108 stores management target information of a plurality of regions regarding the attribute of the transmission apparatus 1.

The plurality of pieces of attribute information also includes information before it is made corresponding to the identification information and the attribute information made corresponding thereto.

In this embodiment, the plurality of pieces of attribute information may be information based on a user's input operation received by the reception section 110. Alternatively, it may be stored by default or may be input by a trader that manages the server apparatus 3.

The attribute information may include information regarding one region of the plurality of regions, which corresponds to the position of the apparatus. Further, the attribute information may include information regarding a group of livestock animals managed in the region corresponding to the position of the apparatus, information of a relative position of the apparatus or this region in stock-raising facilities, information (latitude, longitude, etc.) about an absolute position of the apparatus or this region, and other descriptions of the apparatus.

The identification information transmission unit 111 transmits the identification information of the apparatus. If the "apparatus" is the communication apparatus 2, the identification information transmission unit 111 transmits, for example, the apparatus information of the communication apparatus 2.

The identification information reception unit 112 receives the identification information of the apparatus transmitted from the identification information transmission unit 111, and receives the apparatus information, for example.

The identification information may include the individual identifier as described above. Further, the identification information may include information about the absolute position of the apparatus, which is acquired by the GPS or the like, and may include information for identifying another apparatus. Alternatively, the identification information may include a plurality of pieces of information of such information.

A transmission timing of the identification information is not particularly limited. For example, a transmission request may be transmitted to the communication apparatus 2 or the like including the identification information transmission unit 111 unit from the terminal apparatus 4 including the identification information reception unit 112. In this case, the transmission request may be transmitted according to a user's input operation.

Alternatively, each of the terminal apparatus 4 and the communication apparatus 2 may be shift to a reception-permitted state or a transmission state in accordance with a user's input operation.

Further, the identification information reception unit 112 may receive apparatus information transmitted through proximity wireless communication. The proximity wireless communication refers to, for example, proximity field type wireless communication for approximately several centimeters to one meter. Examples of the proximity wireless communication can include a communication method using NFC or RFID such as ISO/IEC 14443 and a communication method such as an infrared communication.

The identification information acquisition unit 113 acquires transmitted identification information. The identification information acquisition unit 113 acquires, for example, apparatus information transmitted from the communication apparatus 2.

In this embodiment, the identification information acquisition unit 113 acquires apparatus information transmitted from the communication apparatus 2 through proximity wireless communication.

The registration unit 114 associates the acquired identification information with the attribute of the apparatus information selected from the plurality of pieces of attribute information, and registers them as registration information. If the "apparatus" is the communication apparatus 2, the registration unit 114 is capable of associating the acquired apparatus information with the region attribute information selected from the plurality of pieces of region attribute information, and registers them as registration information.

The attribute information may be selected in accordance with a user's input operation via the reception section 110. Alternatively, if information about an absolute position is included as the identification information, the registration unit 114 is capable of matching it against the information about the absolute position of the apparatus stored as the information about the attribute and selecting information identical or closer thereto.

With this, the attribute information storage unit 108 of this embodiment is capable of associating the identification information for identifying the apparatus that has received each of the plurality of individual identification signals with the attribute of the apparatus information identified with the identification information, and storing them as registration information. For example, the attribute information storage unit 108 is capable of associating the apparatus information for identifying the communication apparatus 2 that has received each of the plurality of individual identification signals with the attribute information of the communication apparatus 2 identified with the apparatus information, and storing them as registration information.

Operation Examples

Next, operation examples of input processing of the attribute information (region attribute information) and apparatus registration processing in apparatus registration of the communication apparatus 2 will be each described.

Note that, in both the operation examples, an example in which, as an example, the server apparatus 3 provides the terminal apparatus 4 with the livestock management app in the form of a web application. Note that the livestock management app may be provided in the form of a local application installed in the terminal apparatus 4 to communicate with the server apparatus 3.

(Input Processing of Attribute Information)

Figure 22:
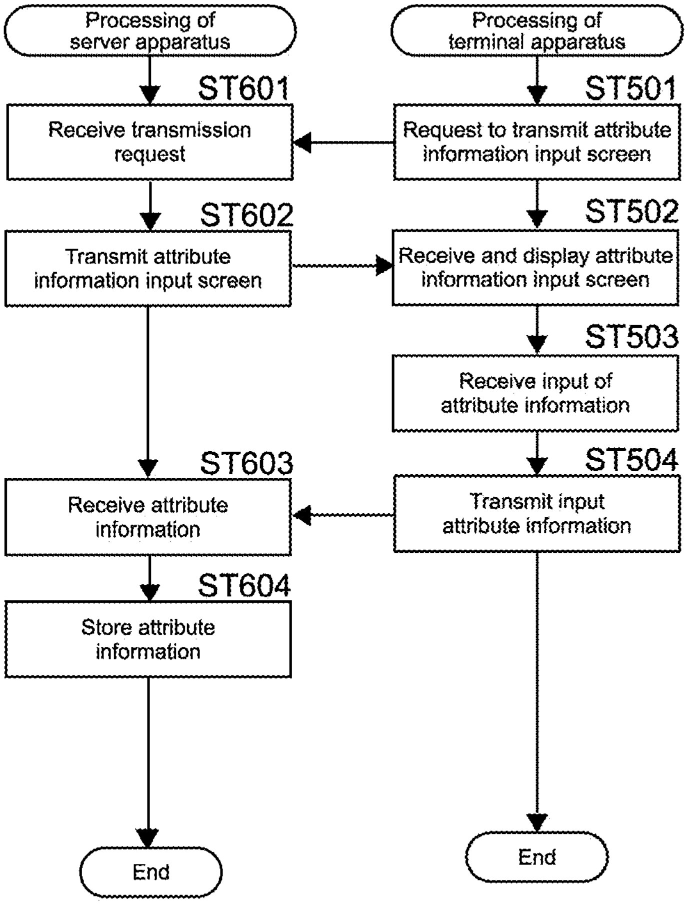
FIG. 22 A flowchart showing an operation example of input processing of region attribute information in the livestock management system.

FIG. 22 is a flowchart showing an operation example of input processing of the region attribute information of the livestock management system 200.

Note that, in the figure, the processing of ST501 to ST504 is executed by the terminal apparatus 4, and the processing of ST601 to ST604 is executed by the server apparatus 3.

First of all, the terminal apparatus 4 in which the livestock management app is activated requests the server apparatus 3 to execute a program in this app and transmit an input screen of the region attribute information (ST501). The terminal apparatus 4 may request transmission on the basis of a user's input operation or the like via the input operation unit 26.

The server apparatus 3 receives the transmission request and the like (ST601). The server apparatus 3 transmits the input screen of the region attribute information to the terminal apparatus 4 (ST602).

The terminal apparatus 4 receives the input screen of the region attribute information, and displays this screen on the display unit 45 (ST502).

Figure 23:
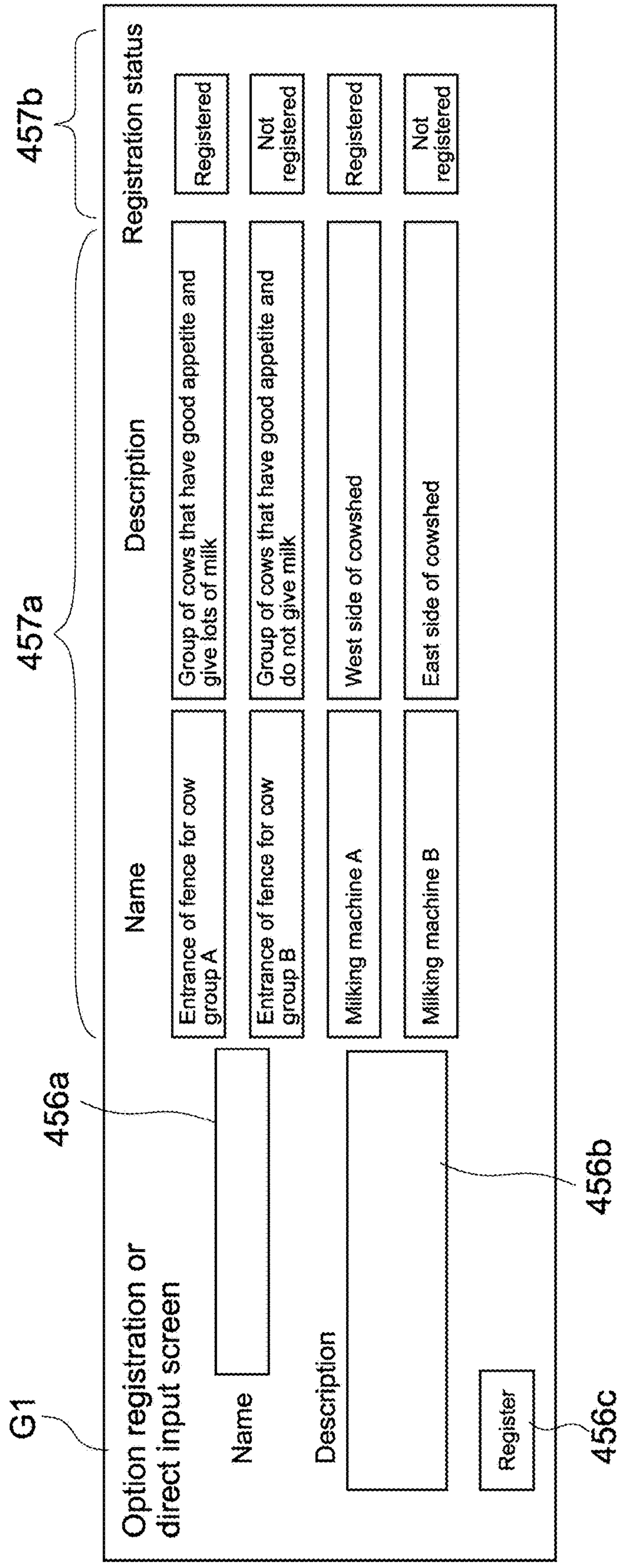
FIG. 23 A diagram showing an example of an input screen of region attribute information displayed on a display unit of a terminal apparatus shown in FIG. 20.

FIG. 23 is a diagram showing an example of the input screen of the region attribute information displayed on the display unit 45 of the terminal apparatus 4.

An entry field 456*a* of the attribute information and an entry field 456*b* of the attribute information are displayed on an input screen G1. For example, the name of the region corresponding to the position of the communication apparatus 2 can be input into in the entry field 456*a* of the attribute information. Descriptions of this region, the communication apparatus 2, and the like can be freely given in the entry field 456*b* of the attribute information in a manner than depends on user's needs.

After the user inputs attribute information in these entry fields 456*a*, 456*b*, the user can tap or click a registration button 456*c*, for example, to thereby transmit the input information.

Further, attribute information 457*a* already stored in the attribute information storage unit 108 is displayed as "Name" and "Description" on the input screen G1.

Further, registration status information 457*b* is displayed on the input screen G1. The tab of "Registered" of the registration status information 457*b* indicates that it is attribute information that has already been associated with the identification information and stored in the attribute information storage unit 108 as registration information. The tab of "Not registered" indicates that it is attribute information that has been stored as the attribute information but has not been associated with the identification information.

The reception section 110 of the terminal apparatus 4 receives the input operation of the region attribute information via the entry fields 456*a*, 456*b* shown in FIG. 23 (ST503), and transmits this input region attribute information to the server apparatus 3 (ST504).

The server apparatus 3 receives the region attribute information (ST603), and causes the attribute information storage unit 108 to store this region attribute information (ST604).

By using the thus stored region attribute information, the following apparatus registration processing is executed.

(Apparatus Registration Processing)

Figure 24:
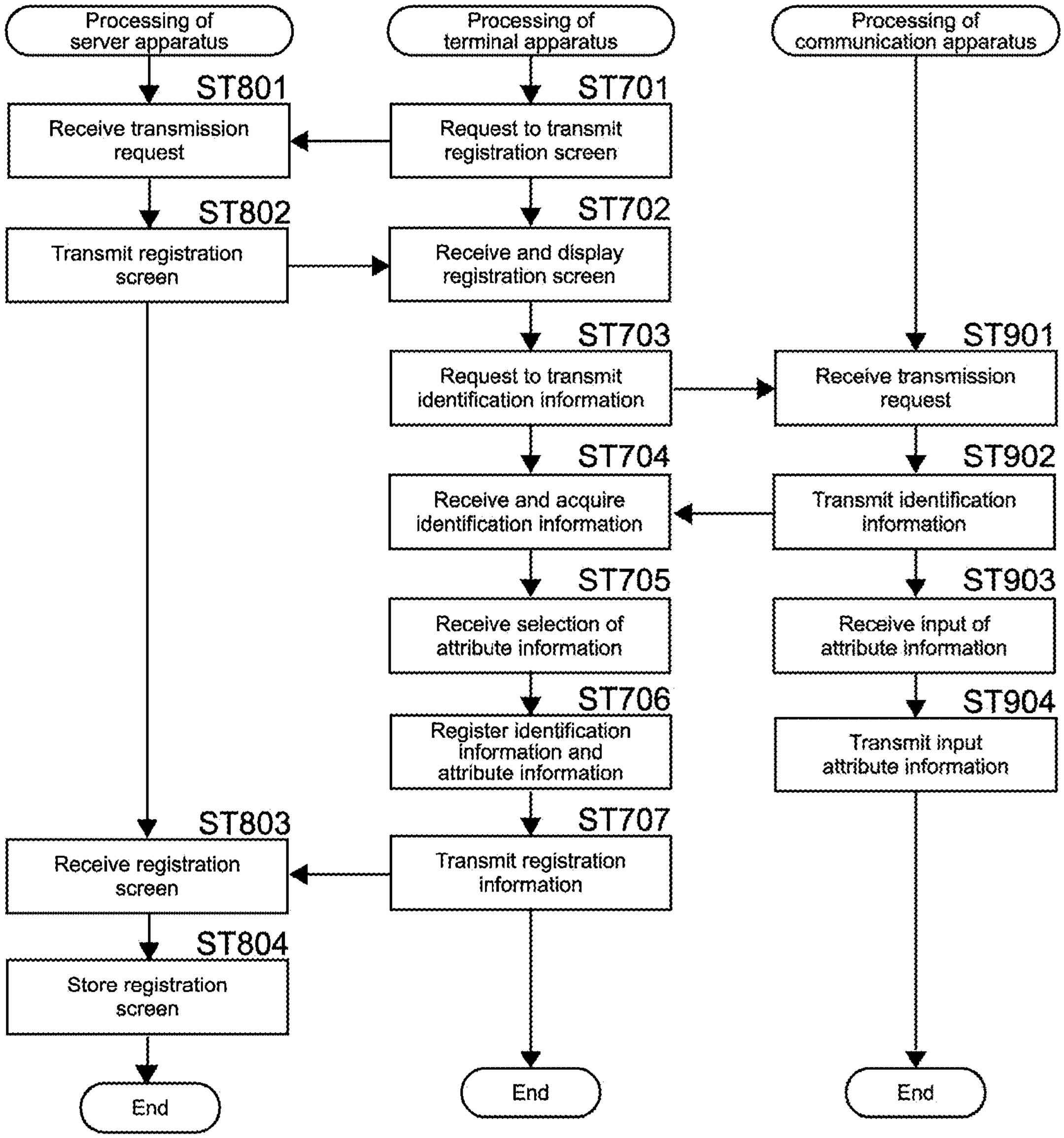
FIG. 24 A flowchart showing an operation example of input processing of attribute information of the livestock management system.

FIG. 24 is a flowchart showing an operation example of the input processing of the attribute information of the livestock management system 200.

Note that, in the figure, the processing of ST701 to ST706 is executed by the terminal apparatus 4, the processing of ST801 to ST804 is executed by the server apparatus 3, and the processing of ST901 to ST904 is executed by the communication apparatus 2.

First of all, the terminal apparatus 4 in which the livestock management app is activated requests the server apparatus 3 to execute the program in this app and transmit a registration screen (ST701). The terminal apparatus 4 may request transmission on the basis of a user's input operation or the like via the input operation unit 26.

Note that the registration screen set forth herein is a screen displayed by the terminal apparatus 4 for executing the apparatus registration processing, and may be, for example, a screen for guiding the transmission request of the apparatus information and the like. Further, the server apparatus 3 may transmit a plurality of registration screens that can be displayed in the apparatus registration processing to the terminal apparatus 4 together or may transmit a necessary registration screen in accordance with the request of the terminal apparatus 4 every time it is necessary.

The server apparatus 3 receives the transmission request and the like (ST801). The server apparatus 3 transmits the registration screen to the terminal apparatus 4 (ST802).

The terminal apparatus 4 receives the registration screen, and displays this screen on the display unit 45 (ST702).

Subsequently, in accordance with the guide of the registration screen, the terminal apparatus 4 requests the communication apparatus 2 that will perform apparatus registration to transmit the apparatus information. In this operation example, the apparatus information is communicated through proximity wireless communication. Therefore, in this step, the user who operates the terminal apparatus 4 brings the terminal apparatus 4 closer to the communication apparatus 2 that will perform apparatus registration.

The communication apparatus 2 receives the transmission request (ST901). The communication apparatus 2 transmits the apparatus information through proximity wireless communication in accordance with it (ST902).

The identification information reception unit 112 of the terminal apparatus 4 receives the apparatus information, and the identification information acquisition unit 113 acquires this identification information (ST704). Then, the registration unit 114 receives selection of the region attribute information from the user (ST705).

Figure 25:
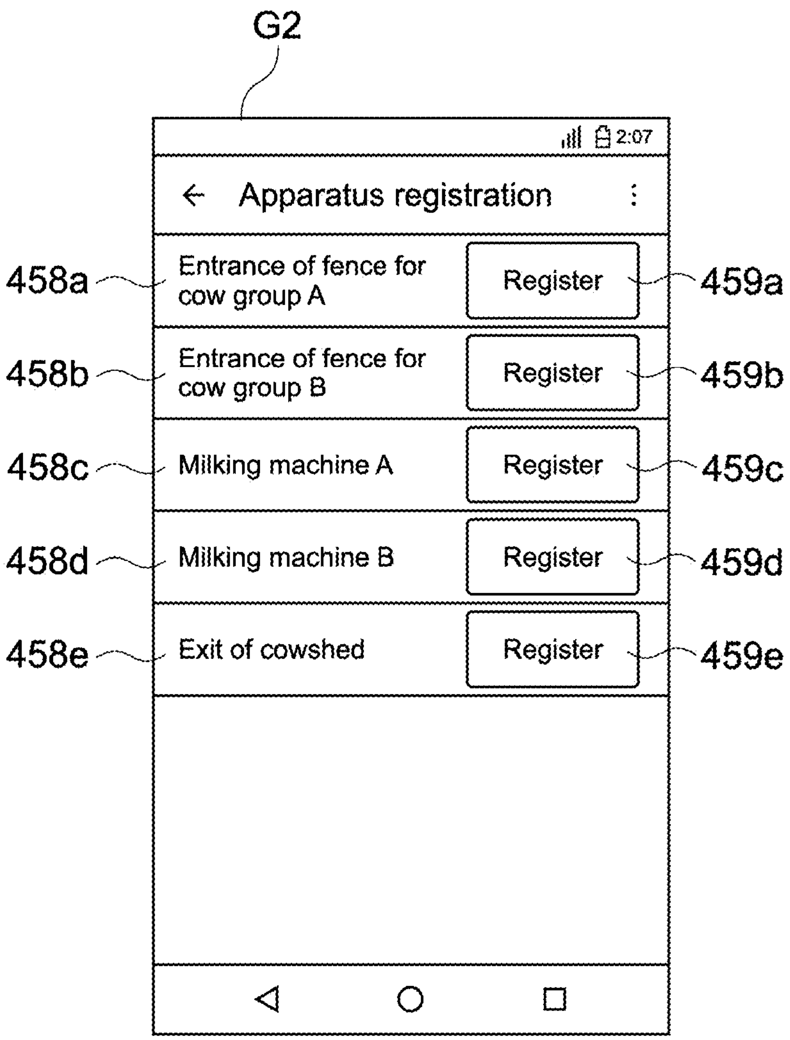
FIG. 25 A diagram showing an example of a registration screen for receiving selection of region attribute information, which is displayed on the display unit of the terminal apparatus.

FIG. 25 is a diagram showing an example of a registration screen for receiving selection of the region attribute information, which is displayed on the display unit 45 of the terminal apparatus 4.

In a registration screen G2, a plurality of pieces of region attribute information 458*a* to 458*e* stored in the attribute information storage unit 108 are displayed as options. Then, registration buttons 459*a* to 459*e* are displayed corresponding to the pieces of region attribute information 458*a* to 458*e*, respectively.

For example, the user taps or clicks any of the registration buttons 459*a* to 459*e* of the region attribute information corresponding to the communication apparatus 2 that has received the apparatus information, from the plurality of pieces of region attribute information 458*a* to 458*e* displayed.

Subsequently, the registration unit 114 associates the acquired apparatus information with the region attribute information of the communication apparatus 2, which is selected from the plurality of pieces of region attribute information, and registers them as registration information (ST706).

Then, the terminal apparatus 4 transmits this registration information to the server apparatus 3 (ST707).

The server apparatus 3 receives the registration information (ST803). The attribute information storage unit 108 stores the registration information in which the apparatus information and the attribute information of the communication apparatus 2 identified with the apparatus information are associated with each other (ST804).

If the apparatus information has already been associated with other region attribute information, the attribute information storage unit 108 is capable of overwrite-recording the registration information. That is, the attribute information storage unit 108 cancels associating the apparatus information with this region attribute information, and associates this apparatus information with the selected region attribute information and stores them.

In accordance with this embodiment, the apparatus registration can be easily performed in such a manner that the user receives the identification information from the apparatus placed in the stock-raising facilities by using the terminal apparatus 4 and selects suitable attribute information from the attribute information stored in advance. With this, for example, the troublesome process of the communication apparatus 2 for inputting the identification information of the individual identifier or the like can be omitted and the apparatus can be easily registered.

MODIFIED EXAMPLE OF THIS EMBODIMENT

Modified Example 2-1: Communication Apparatus 2 that Further Executes Stay Monitoring Processing The apparatus registration processing according to this embodiment can be executed for preparation of the stay monitoring processing according to the first embodiment. With this, the apparatus information and the region attribute information of the communication apparatus 2, the individual identifier and the management target information of the region of the transmission apparatus 1, and the like, which are used in the stay monitoring processing, can be stored in the attribute information storage unit 108 in advance.

In view of this, the livestock management system 200 may be capable of performing the stay monitoring processing according to the first embodiment.

Figure 26:
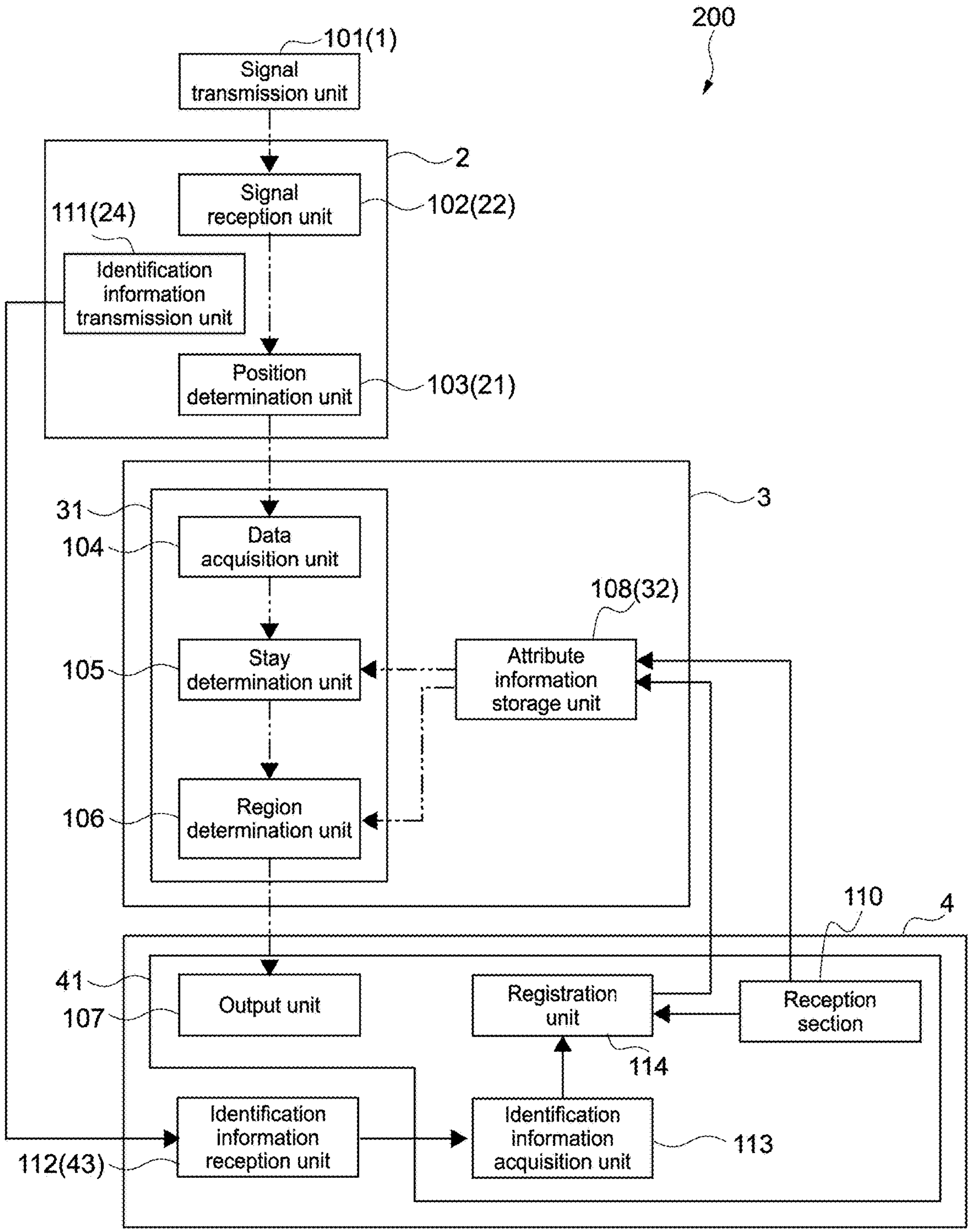
FIG. 26 A block diagram showing functional configurations and a flow of processing of a livestock management system according to Modified Example 2-1.

FIG. 26 is a block diagram showing functional configurations and a flow of processing of a livestock management system 200 according to Modified Example 2-1. In the figure, the long dashed double-short dashed line shows a flow of processing in the stay monitoring processing and the solid line shows a flow of processing in the apparatus registration processing of this embodiment.

As shown in the figure, a livestock management system 200 includes a signal transmission unit 101, a signal reception unit 102, a position determination unit 103, a data acquisition unit 104, a stay determination unit 105, a region determination unit 106, an output unit 107, an attribute information storage unit 108, a reception section 110, an identification information transmission unit 111, an identification information reception unit 112, an identification information acquisition unit 113, and a registration unit 114.

The signal transmission unit 101, the signal reception unit 102, the position determination unit 103, the data acquisition unit 104, the stay determination unit 105, the region determination unit 106, the output unit 107, and the attribute information storage unit 108 are configurations that function in the stay monitoring processing which have been described in the first embodiment.

Further, the reception section 110, the identification information transmission unit 111, the identification information reception unit 112, the identification information acquisition unit 113, the registration unit 114, and the attribute information storage unit 108 are configurations that function in the apparatus registration processing in this embodiment.

In accordance with this modified example, the apparatus registration processing necessary for the stay determination processing can be easily executed.

Modified Example 2-2: Modified Example Regarding Apparatus Registration Other than Communication Apparatus In the above-mentioned operation example, the example of the apparatus registration of the communication apparatus 2 has been shown. However, the apparatus registration may be performed with respect to the transmission apparatus 1.

In this case, the identification information to be registered can be an individual identifier with which the transmission apparatus 1 can be identified and the attribute information to be registered can be management target information of a region regarding an attribute of the transmission apparatus 1.

The attribute information storage unit 108 stores management target information of a plurality of regions regarding the transmission apparatus 1.

The identification information transmission unit 111 is realized by the communication unit 13 of the transmission apparatus 1, and transmits the individual identifier.

The identification information acquisition unit 113 acquires the individual identifier transmitted from the transmission apparatus 1.

The registration unit 114 associates the acquired individual identifier with the management target information of the region selected from the management target information of the plurality of regions, and registers them as registration information.

The attribute information storage unit 108 stores the registration information in which the individual identifier and the management target information of the region of the transmission apparatus 1 identified with the individual identifier are associated with each other.

Further, the attribute information storage unit 108 may store each of the management target information database of the region for storing the management target information of the region regarding the transmission apparatus 1 and the region attribute information database for storing the region attribute information regarding the communication apparatus 2. With this, as the apparatus, the apparatus registration processing of both of the transmission apparatus 1 and the communication apparatus 2 can be executed.

In addition, as shown in Modified Example 1-4, if the livestock management system 200 includes the first communication apparatus 2A and the second communication apparatus 2B, these first communication apparatus 2A and second communication apparatus 2B are each capable of executing the apparatus registration processing as the "apparatus".

Modified Example 2-3: Modified Example Regarding Operation of Registration Unit If the user tries to perform the apparatus registration processing on an apparatus whose identification information has already been registered, the registration unit 114 may notify the user about it.

Figure 27:
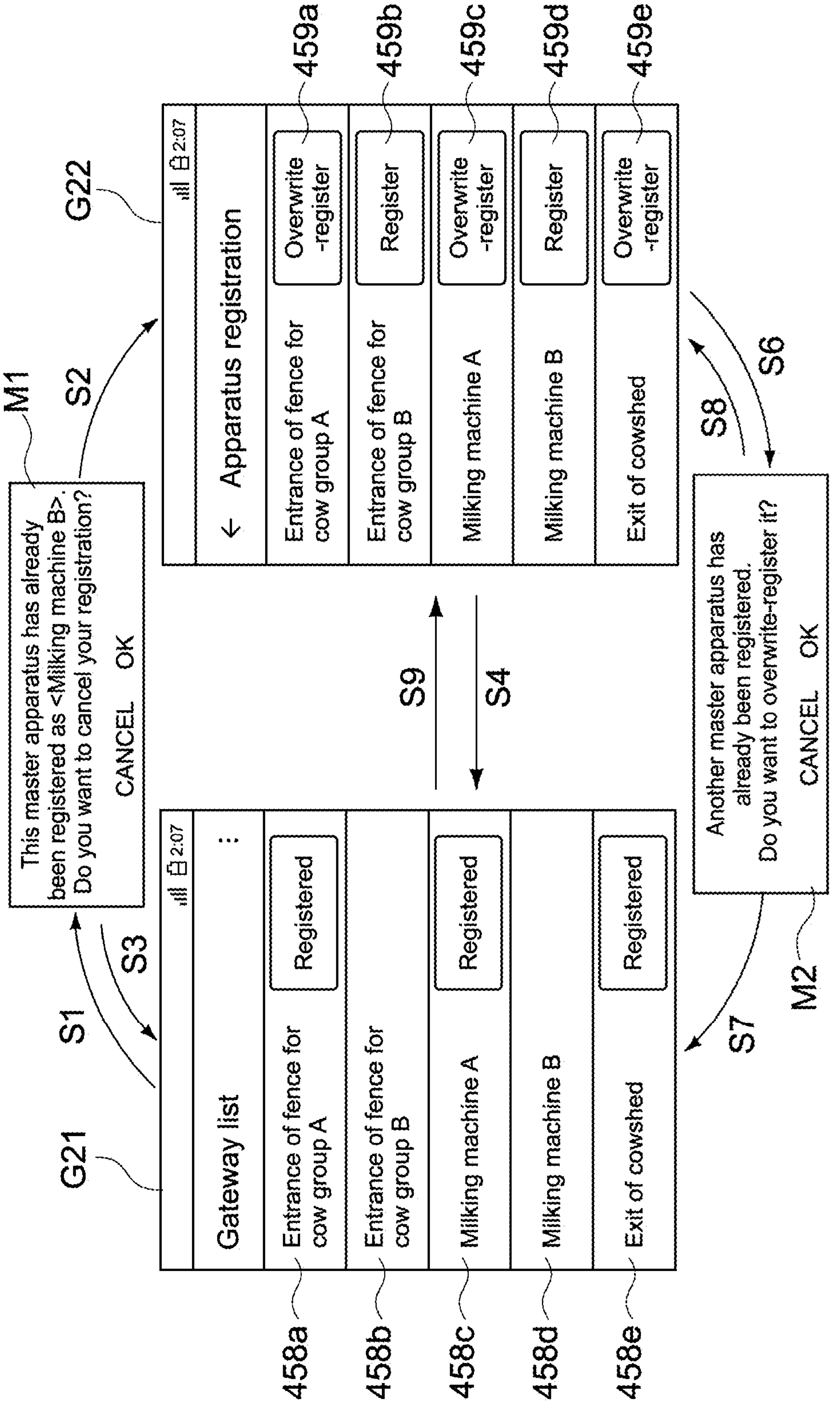
FIG. 27 A diagram showing a shift example of a registration screen according to Modified Example 2-3.

FIG. 27 is a diagram showing a shift example of registration screens G21, G22 according to Modified Example 2-3.

On the registration screen G21, the plurality of pieces of attribute information 458*a* to 458*e* stored in the attribute information storage unit 108 are displayed as options. In the plurality of pieces of attribute information 458*a* to 458*e*, information as to whether or not they have been stored in the attribute information storage unit 108 as registration information is further displayed. In the example of the figure, the pieces of attribute information 458*a*, 458*c*, 458*e* are displayed as "Registered".

While the registration screen G21 is displayed, a request of the apparatus information is transmitted from the terminal apparatus 4 to the registered communication apparatus 2 (S1). With this, for example, a message M1 is displayed on the registration screen G21. The message M1 can be displayed as, for example, "This master apparatus has already been registered as <Milking machine B>. Do you want to cancel your registration?".

If the user approves this message M1 (S2), it shifts to a registration screen G22. Note that, if the user does not approve it (S3), the message 1 is removed and the display returns to the registration screen G21.

On the registration screen G22, the registration buttons 459*a* to 459*e* of the attribute information corresponding to the pieces of the attribute information 458*a* to 458*e* are displayed. The registration buttons 459*a*, 459*c*, 459*e* corresponding to the attribute information that is "Registered" are described as "Overwrite-register".

On the registration screen G22, if the user taps or clicks the registration buttons 459*a*, 459*c*, 459*e* described as "Overwrite-register", for example, the registration unit 114 may associate the acquired identification information with the attribute information selected from the plurality of attributes, and overwrite-register them as registration information. In this case, it may return to the registration screen G21 (S4).

Alternatively, on the registration screen G22, if the user taps or clicks the registration buttons 459*a*, 459*c*, 459*e* described as "Overwrite-register", for example, a message M2 for check may be further displayed (S6). Although the message M2 can be displayed as, for example, "Another apparatus has already been registered. Do you want to overwrite-register it?".

If the user approves this message M2 (S7), it shifts to the registration screen G22. Note that, if the user does not approve it (S8), the message M2 is removed and the display returns to the registration screen G22.

Further, while the registration screen G21 is displayed, if the request of the identification information from the terminal apparatus 4 is transmitted to the communication apparatus 2 that is not registered (S9), it may be shifted to the registration screen G22 without displaying the message M1.

In accordance with this modified example, it is possible to notify the user about the registration state of the apparatus upon registration, and to prevent erroneous registration operations.

Further, another operation example of the registration unit 114, the registration information may be deleted on the basis of the user's input operation or the like. With this, it is possible to suitably erase registration information regarding a removed apparatus and the like, and thus prevent confusion.

Modified Example 2-4: Modified Example Regarding of System Configuration and Functional Configurations If the livestock management system 200 executes only the apparatus registration processing of the communication apparatus 2, a configuration without the transmission apparatus 1 may be employed.

Alternatively, if the livestock management system 200 executes only the apparatus registration processing of the transmission apparatus 1, a configuration without the communication apparatus 2 may be employed.

Further, the livestock management system 200 may include a plurality of terminal apparatuses 4 connected to the server apparatus 3 via the network N. In this case, the reception section 110 may be realized by a plurality of terminal apparatuses 5. For example, the input operation of the attribute information may be performed by one terminal apparatus 5 and the selection operation of the attribute information in the apparatus registration processing may be performed by the other terminal apparatus 4.

The registration unit 114 or the identification information acquisition unit 113 and the registration unit 114 are not limited to the example in which they are realized by the control unit 41 of the terminal apparatus 4. They may be realized by the control unit 31 of the server apparatus 3.

Alternatively, the attribute information storage unit 108 may be realized by the storage unit 42 of the terminal apparatus 4 instead of the server apparatus 3. In this case, the livestock management system 200 can be configured not to include the server apparatus 3.

Modified Example 2-6: Modified Example Regarding Hardware Configuration

Although the communication apparatus 2 includes the third communication unit 24, it is not limited thereto. For example, the communication apparatus 2 does not need to include the third communication unit 24, the identification information transmission unit 111 of the communication apparatus 2 may be realized by the first communication unit 22 and/or the second communication unit 23, and the identification information may be transmitted by the first communication unit 22 and/or the second communication unit 23.

In addition, the communication apparatus 2 does not need to include the third communication unit 24 and the terminal apparatus 4 may function as a reader capable reading a bar code, an apparatus identifier, and the like added to the communication apparatus 2. In this case, the terminal apparatus 4 does not include the identification information reception unit, and a camera (not shown) is capable of picking up images of these bar code and identifier and acquiring picked up information as the identification information. The bar code and the identifier of the apparatus may be directly printed on the communication apparatus 2 or may be printed on the tag or the like attached to the communication apparatus 2. The bar code may be a two-dimensional bar code of a QR code (registered trademark) or the like.

Modified Example 2-7: Another Modified Example

The apparatus registration processing of this embodiment can also be applied not only to the livestock management system but also to the warning system for persons.

That is, the warning system at least includes an attribute information storage unit, an identification information acquisition unit, and a registration unit.

The attribute information storage unit stores a plurality of pieces of attribute information including attribute information of a transmission apparatus attached to a target person.

The identification information acquisition unit acquires the identification information of the transmission apparatus attached to the target person.

The registration unit associates the acquired identification information with the attribute information selected the plurality of pieces of attribute information, and registers them as registration information.

Further, also in the warning system, the apparatus registration processing may be able to be performed also regarding a communication apparatus positioned in a target region.

With this, attribute information of an elderly person who suffers from dementia or is suspected to be dementia or a child or the like who can be lost can be registered, and the safety for the elderly person or child or the like can be secured.

In addition, for outputting the determination result, the warning system for persons is capable of checking authority of the terminal apparatus and performing the output of a limitative result in accordance with this authority. With this, it is possible to allow sufficient information disclosure to family and concerned people, and to prevent a result of this system to be utilized with foul intention.

Third Embodiment: Configuration of Communication Apparatus

In each of the above-mentioned embodiments, the fact that the communication apparatus may be installed at the position corresponding to the region provided within the stock-raising facilities has been described.

In the case of installing it within the stock-raising facilities, it is installed outdoor in some cases. Thus, it is easily influenced by weather such as rain, wind, and snow. Further, in the case of installing it at a plurality of positions, a configuration easy to install is desired.

In view of this, in this embodiment, it is an object to provide a communication apparatus excellent in durability against weather influences and easy to install besides the above-mentioned problem.

[Schematic Configuration of Communication Apparatus]

Figure 28:
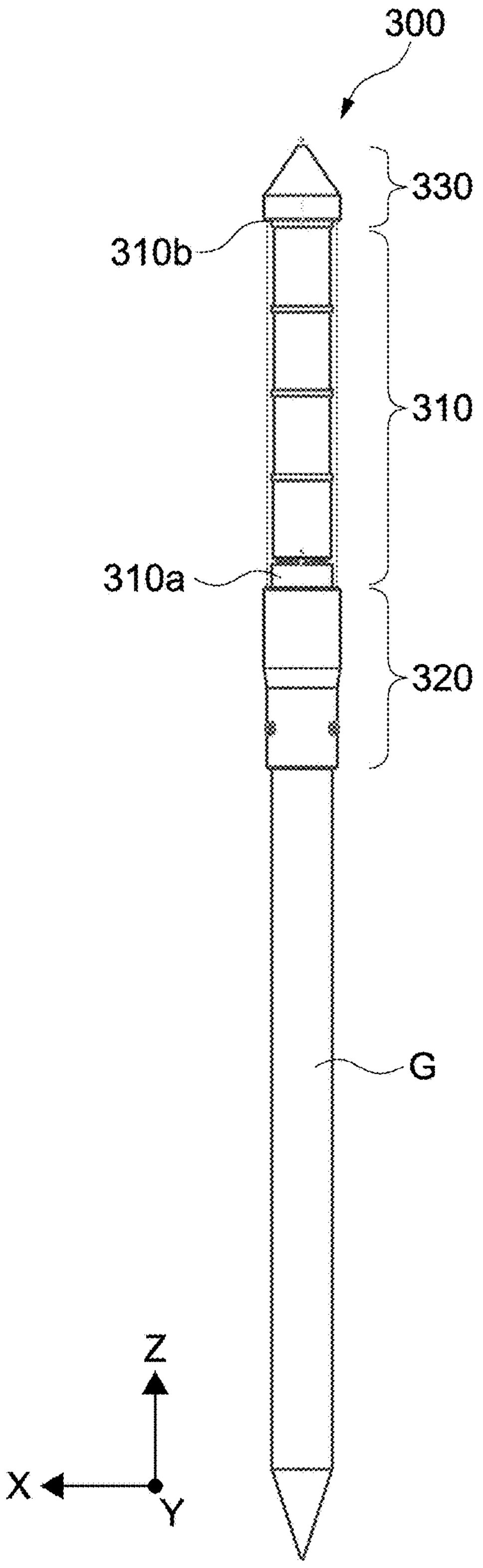
FIG. 28 A schematic side view showing a communication apparatus according to a third embodiment of the present technology.

FIG. 28 is a schematic side view showing a communication apparatus 300 according to a third embodiment of the present technology. Note that, in the figure, an X-axis, a Y-axis, and a Z-axis indicates three axis directions orthogonal to one another. In a standard installation embodiment of the communication apparatus 300, a Z-axis direction indicates a vertical direction, and X-axis and Y-axis directions both indicate plane directions. Further, the Z-axis direction corresponds to “one axis direction” in this embodiment.

This communication apparatus 300 can be applied as the communication apparatus 2 (including first and second communication apparatuses 2A, 2B) described above in the first and second embodiments.

As shown in the figure, the communication apparatus 300 includes a main body 310, a mounting portion 320, and a cap portion 330.

The main body 310 extends from a first end portion 310*a* to a second end portion 310*b* in the Z-axis direction.

The mounting portion 320 is for installing the communication apparatus 300, which is connected to the first end portion 310*a* of the main body 310. In this embodiment, the mounting portion 320 is configured to be mountable on a tip end of a bar-like structure G extending in the Z-axis direction.

The cap portion 330 is connected to the second end portion 310*b*.

That is, the communication apparatus 300 is configured having a bar shape extending in the Z-axis direction as a whole, and further configured to be mountable on the tip end of the structure G.

With such a configuration, the communication apparatus 300 can have an outer shape having a low fluid resistance and be strong against wind, rain, snow, and the like. In addition to this, easy installation can be performed by the communication apparatus 300 is mounted on the tip end of the structure G.

The bar-like structure G is, for example, formed of a wood or resin pile, a metal bar, or the like. The cross-section shape orthogonal to the structure G in the Z-axis direction is not particularly limited, and may be, for example, a circular shape, an oval shape, a polygonal shape, or another shape.

Further, generally, commercially available one or one currently used in stock-raising facilities or the like can be used as the structure G. Here, it is assumed that the structure G is a pile generally used in the stock-raising facilities. Such a pile can have, as an example, a height of approximately 1 to 1.5 m (length in Z-axis direction). A cross-section thereof orthogonal to the Z-axis direction can be circular and a diameter thereof can be approximately 50 to 100 mm.

[Configuration of Mounting Portion]

Figure 29:
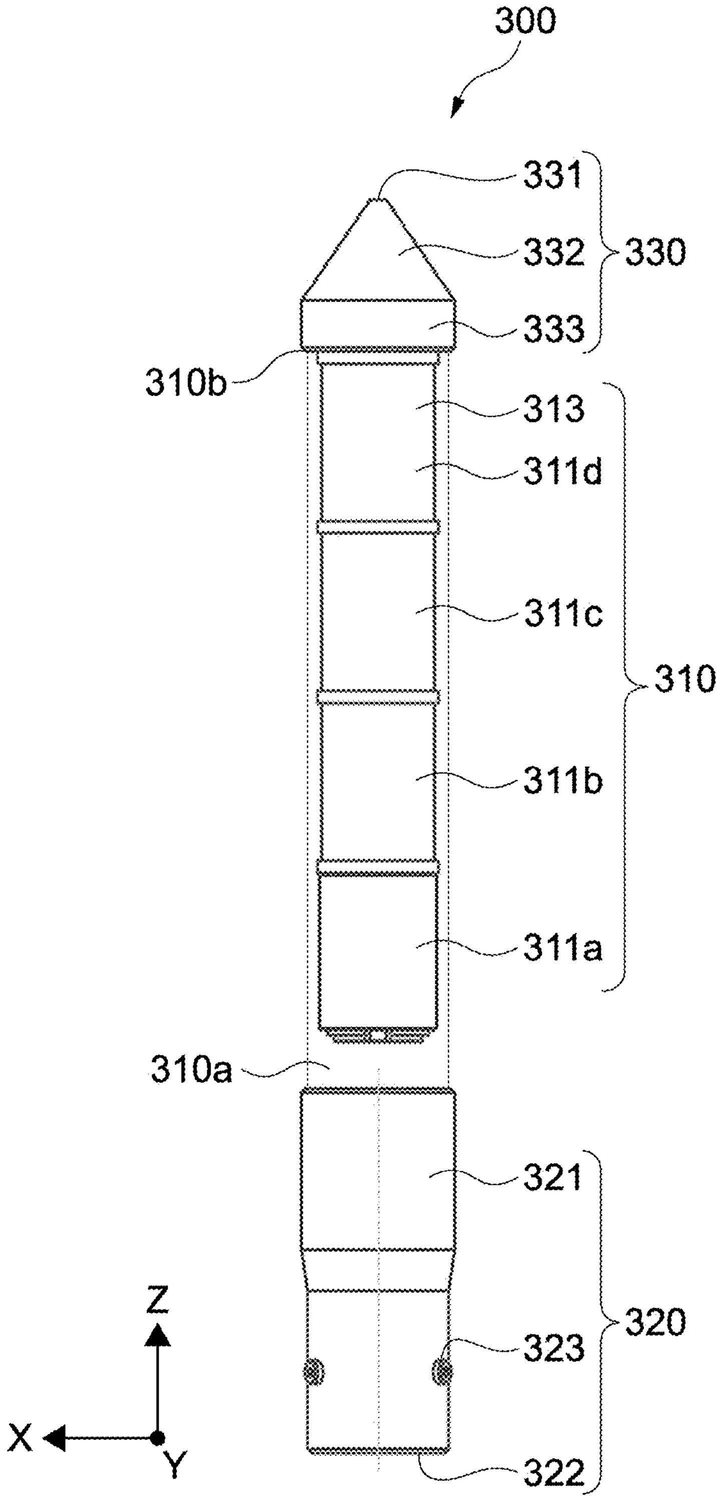
FIG. 29 A side view showing the communication apparatus.
Figure 30:
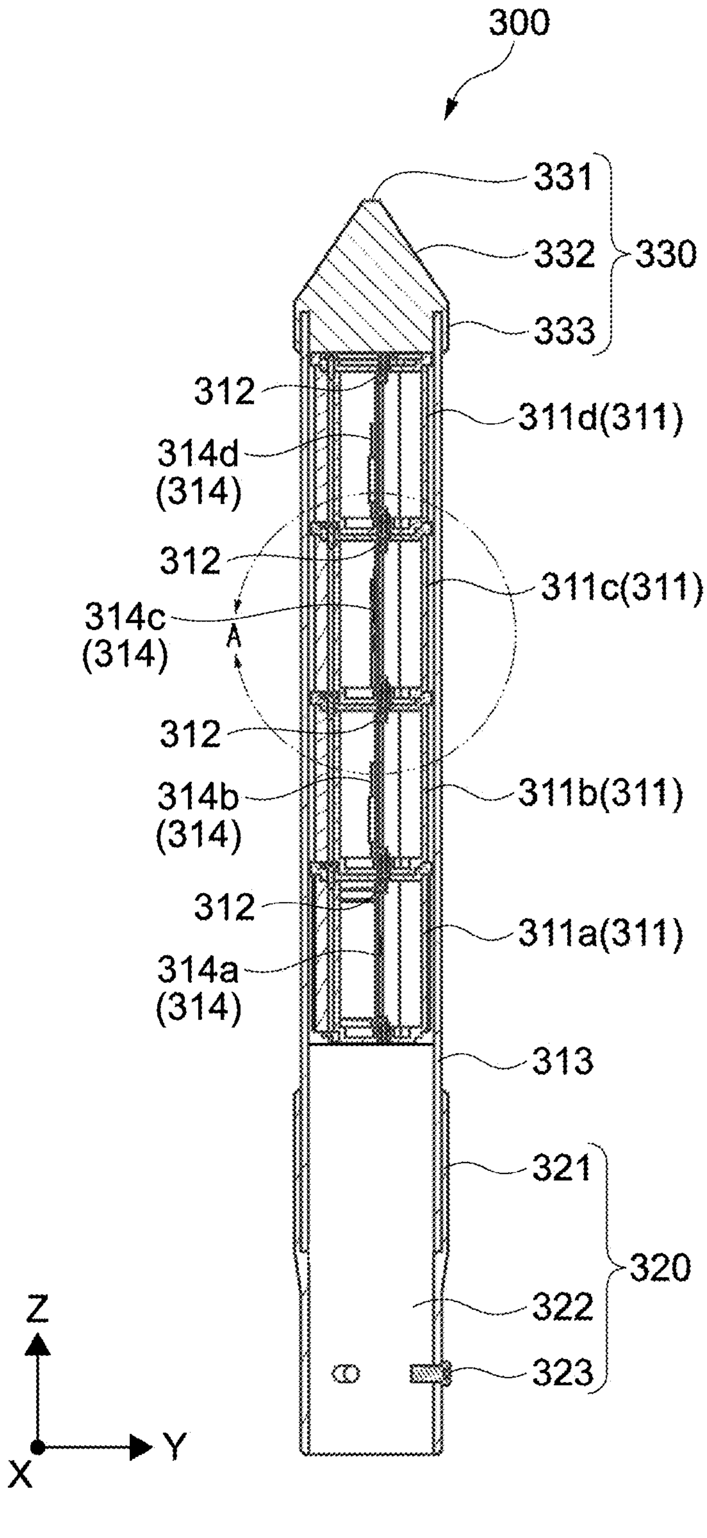
FIG. 30 A cross-sectional view of a communication apparatus shown in FIG. 29 as viewed in an X-axis direction.

FIG. 29 is a side view showing the communication apparatus 300. FIG. 30 is a cross-sectional view of the communication apparatus 300 shown in FIG. 29 as viewed in the X-axis direction.

As shown in these figures, in this embodiment, the mounting portion 320 includes a connection portion 321 connected to the first end portion 310*a* of the main body 310 and an aperture 322 opened in the Z-axis direction.

The connection portion 321 may be configured to be mountable on a cover 313 of the main body 310 to be described later and may be formed in a part of the aperture 322.

The aperture 322 is, for example, configured such that the tip end of the structure G is inserted therein. The aperture 322 can be appropriately designed to be adapted for the shape of the tip end of the structure G. For example, the aperture 322 is formed in a cylindrical shape. With such a configuration, the mounting portion 320 can be easily mounted on the tip end of the structure G.

In addition, the mounting portion 320 may include a plurality of screws 323 that allow fastening to the structure G. With this, it is possible to strengthen connection to the structure, and to prevent the structure G of the communication apparatus 300 from being detached.

Further, with the above-mentioned configuration, the mounting portion 320 is formed in a cylindrical shape as a whole. The cross-section shape of the mounting portion 320, which is orthogonal to the Z-axis direction, may be a shape approximately identical to the cross-section shape of the main body 310, which is orthogonal to the Z-axis direction. With this, the entire communication apparatus 300 can be formed in a columnar shape having an approximately identical cross-section structure, and the fluid resistance can be lowered. Therefore, the durability against wind and the like can be lowered.

[Configuration of Cap Portion]

As shown in FIGS. 29 and 30, in this embodiment, the cap portion 330 includes an apex portion 331 protruding in the Z-axis direction, a taper surface 332 formed toward the second end portion 310*b* from the apex portion 331, and a connection portion 333 connected to the second end portion 310*b*.

Although the apex portion 331 may be a sharp structure, it may include, as shown in FIGS. 29 and 30, a flat surface having an area smaller than the cross-section shape of the connection portion 333, which is orthogonal to the Z-axis direction. Alternatively, the apex portion 331 may be formed of a convex surface or may be formed to be continuous with the taper surface 332, for example. With the apex portion 331 that is not sharp, the safety in case of collision or the like of the livestock animal can be ensured.

In this embodiment, the taper surface 332 is formed as a peripheral surface of a truncated cone. Alternatively, the taper surface 332 may be formed of a plurality of flat surfaces as a peripheral surface of a truncated pyramid or may be formed of a plurality of curved surfaces.

Due to the provision of the taper surface 332, moisture of rain, snow, and the like, organic matter, and the like adhering to the cap portion 330 can fall down in a vertical direction (Z-axis direction). With this, the main body 310, in particular, the cover 313 can be kept clean. Therefore, lowering of the efficiency of solar power generation of a power generation unit 315*a* to be described later can be suppressed.

For example, the connection portion 333 may be configured to be capable of connecting the cover 313 (to be described later) of the main body 310. As an example, there may be formed a slit into which the end portion (second end portion 310*b*) of the cover 313 can be inserted.

Further, the area of the cross-section of the connection portion 333, which is orthogonal to the Z-axis direction, is configured to be larger than the area of the cross-section (area of a region surrounded with the cover 313) of the main body 310 to be described later, which is orthogonal to the Z-axis direction. In the example of this embodiment, the diameter of the cross-section of the connection portion 333, which is orthogonal to the Z-axis direction, is configured to be larger than the diameter of the cross-section of the main body 310, which is orthogonal to the Z-axis direction. With this, the main body 310 can be further kept clean.

[Configuration of Main Body]

Figure 31:
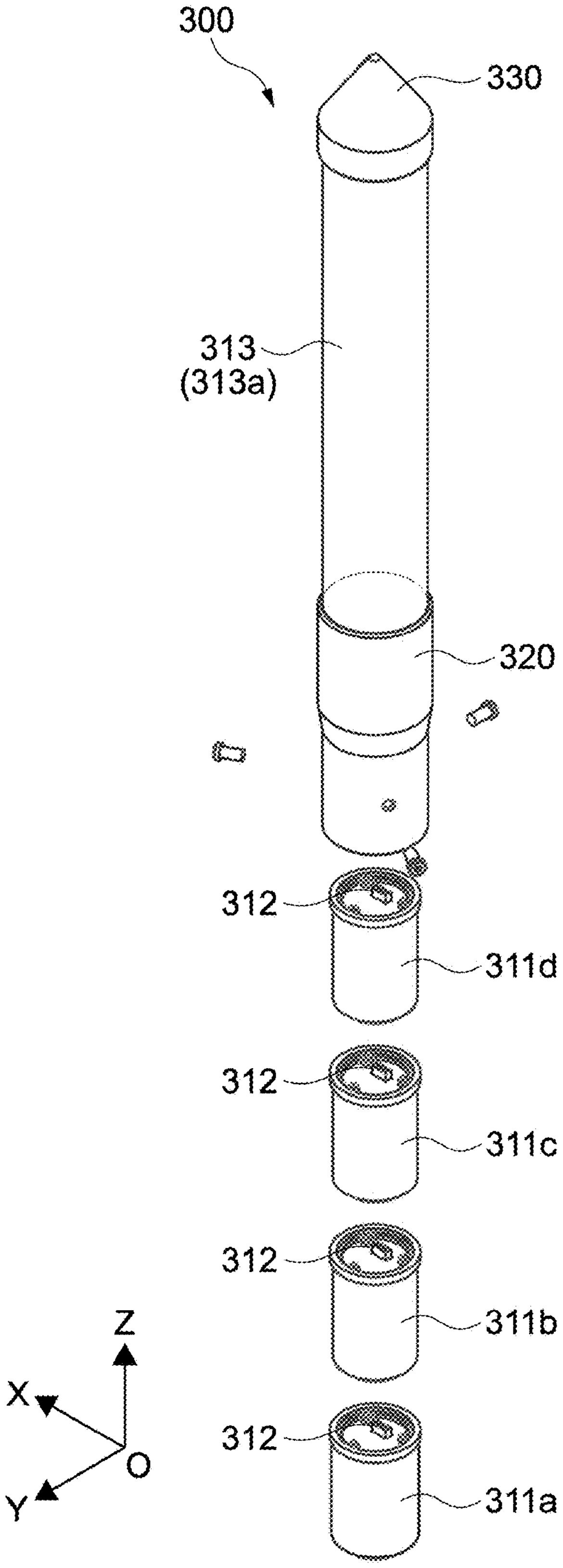
FIG. 31 An exploded perspective view of the communication apparatus shown in FIG. 29.

FIG. 31 is an exploded perspective view of the communication apparatus 300.

Referring to these figures, the main body 310 includes a first unit casing 311*a*, a second unit casing 311*b*, a third unit casing 311*c*, a fourth unit casing 311*d*, and the cover 313. All of the first to fourth unit casings 311*a* to 311*d* are installed inside the cover 313 in the Z-axis direction.

Each of the first to fourth unit casings 311*a* to 311*d* is formed in a tubular shape having an axis direction in the Z-axis direction, and connected to the unit casing, to which that unit casing is adjacent, in the one axis direction. In this embodiment, the first to fourth unit casings 311*a* to 311*d* have an identical shape.

That is, the fourth unit casing 311*d* is connected to the third unit casing 311*c* in the Z-axis direction, the third unit casing 311*c* is connected to the second unit casing 311*b* in the Z-axis direction, and the second unit casing 311*b* is connected to the first unit casing 311*a* in the Z-axis direction.

The plurality of unit casings each formed in a tubular shape are connected in the Z-axis direction, and hence the main body 310 has a configuration extending in the Z-axis direction as a whole.

The cross-section shapes of the second unit casing 311*b* and the third unit casing 311*c*, which are orthogonal to the Z-axis direction, are, for example, configured to be identical to a cross-section shape of the first unit casing 311*a*, which is orthogonal to the Z-axis direction. With this, the entire peripheral surface of the main body 310 can be formed of a smooth surface having few irregularities. Therefore, it is possible to further lower the fluid resistance of the shape of the main body 310 and to enhance the adaptability for the shape of the cover 313.

In addition, in this embodiment, this cross-section shape can be a circular shape, and the entire peripheral surface of the main body 310 can be formed of a smooth surface having fewer regularities.

Further, it is formed in a columnar shape as a whole in this manner, and hence it is possible to also reduce costs for storage and packing.

The adjacent unit casings 311*a* to 311*d*, for example, the first unit casing 311*a* and the second unit casing 311*b* are connected via connectors 312 that are attachable/detachable in the Z-axis direction. These connectors 312 all have identical shapes as will be described later.

In the cover 313, the first end portion 310*a* and the second end portion 310*b* are formed. The cover 313 has a hollow shape extending from the first end portion 310*a* to the second end portion 310*b* in the Z-axis direction. The main body 310 includes the cover, and hence it is possible to further enhance the durability of the communication apparatus 300.

The above-mentioned hollow shape is configured to be capable of housing each of the unit casings 311*a* to 311*d*. The cross-section shape of the cover 313, which is orthogonal to the Z-axis direction, is not particularly limited. For example, this cross-section shape may be a circular shape or may be an oval shape or a polygonal shape. The cover 313 has a circular cross-section shape, and hence it is possible to further lower the fluid resistance of the main body 310, and a configuration strong against wind and the like can be realized.

The above-mentioned cross-section shape of the cover 313 may be, for example, formed in a shape corresponding to the cross-section shape of each of the unit casings 311*a* to 311*d*. The "corresponding shape" refers to, for example, a similar shape bigger than the cross-section shape of the unit casing. For example, if the cross-section shape of each of the unit casings 311*a* to 311*d* is a circular shape as in this embodiment, the cross-section shape of the cover 313 is formed in a circular shape larger in diameter than the circular shape according to the cross-section shape of the unit casing. With this, the shape adaptability for each of the unit casings 311*a* to 311*d* can be enhanced.

Alternatively, the cross-section shape of the cover 313 may be a shape different from the cross-section shape of each of the unit casings 311*a* to 311*d*, for example. For example, regularities may be formed in a part of an inner surface of the cover 313. Those regularities may be used for, for example, positioning between the unit casings.

In this embodiment, the entire cover 313 is light-transmissive. For example, the cover 313 is formed of a light-transmissive material such as a resin (polycarbonate, acrylic resin, polyethylene terephthalate, polyurethane, etc.) and glass.

In this embodiment, both end portions of the cover 313 form the first and second end portions 310*a*, 310*b* of the main body 310. The mounting portion 320 and the cap portion 330 are respectively connected to the first and second end portions 310*a*, 310*b*.

Figure 32:
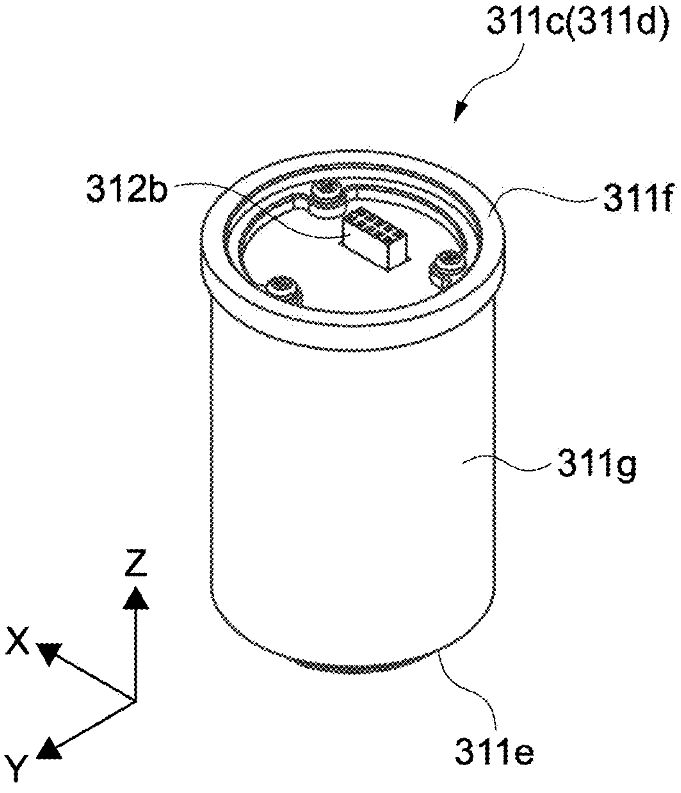
FIG. 32 A perspective view of a third unit casing shown in FIG. 31.

FIG. 32 is a perspective view of the third unit casing 311*c*. A of FIG. 33 is a plan view of the third unit casing 311*c*. B of FIG. 33 is a bottom view of the third unit casing 311*c*.

As described above, in this embodiment, the unit casings 311*a* to 311*d* have similar schematic configurations. Therefore, these unit casings will be collectively referred to as a "unit casing 311", and a description will be made by taking the third unit casing 311*c* as an example of the unit casing 311.

The unit casing 311 includes a first connection end portion 311*e*, a second connection end portion 311*f*, and a tube portion 311*g*.

The first connection end portion 311*e* is formed on a lower side in the Z-axis direction (mounting portion 320 side), and configured as the bottom of the unit casing 311, for example.

The second connection end portion 311*f* is formed on an upper side in the Z-axis direction (cap portion 330 side). That is, the first connection end portion 311*e* and the second connection end portion 311*f* are arranged to be opposed to each other in the Z-axis direction. The second connection end portion 311*f* is configured as, for example, a lid of the unit casing 311 on the upper side in the Z-axis direction. If the second connection end portion 311*f* is configured as a lid, it may be fixed to the tube portion 311*g* with a screw.

The tube portion 311*g* is formed between the first and second connection end portions 311*e*, 311*f*, and formed in a cylindrical shape in this embodiment.

Although the material of the unit casing 311 is not particularly limited, metal, a resin, or the like can be applied, for example.

The first connection end portion 311*e* of each unit casing 311 is configured to be adaptable for the second connection end portion 311*f* of the other unit casing 311*a*. For example, regularities of the first connection end portion 311*e* can be adapted for regularities of the second connection end portion 311*f* and held in close contact with each other. With this, the plurality of unit casings 311 a to 311*d* can be stacked on each other in the Z-axis direction. Therefore, the unit casings 311 can be standardized. The unit casings 311 having a variety of functions can be freely combined depending on purposes. The communication apparatus 300 having a suitable function depending on each place can be configured.

Further, these regularities of the first and second connection end portions 311*e*, 311*f* also include regularities of the shapes of connectors 312*a*, 312*b* to be described later.

With such a configuration, assembling of the main body 310 is facilitated and it becomes easy to change the number of unit casings and the arrangement of the unit casings.

Further, the first connection end portion 311*e* and the second connection end portion 311*f* includes the connector 312 for electrically connecting the unit casings 311*a* to 311*d* to one another (see FIG. 31). These connectors 312 have all identical shape. With this, the unit casings 311 can be standardized also from the perspective of electrical connection.

The first connection end portion 311*e* includes the male type connector 312*a*. The second connection end portion 311*f* includes the female connector 312*b*.

In the example of FIG. 33, the male type connector 312*a* of the first connection end portion 311*e* is connected to the female connector 312*b* of the second unit casing 311*b* in the Z-axis direction. The female connector 312*b* of the second connection end portion 311*f* is connected to the male type connector 312*a* of the fourth unit casing 311*d* in the Z-axis direction.

These connectors 312 (312*a*, 312*b*) are both connected to boards arranged within the unit casing 311 and serve to perform electrical connection between the respective unit casings 311. The electrical connection refers to mutual connection of an interface (I/F) of a power system and an I/F of data communication via the connectors 312. For example, the power system I/F is configured as a power supplying bus and the data communication I/F is configured as a data communication bus. The power supplying bus and the data communication bus are, for example, configured as serial buses that allows serial communication. More specifically, the power supplying bus and the data communication bus can be configured as serial buses such as SPI (Serial Peripheral Interface) and I2C (Inter-Integrated Circuit).

Figure 34:
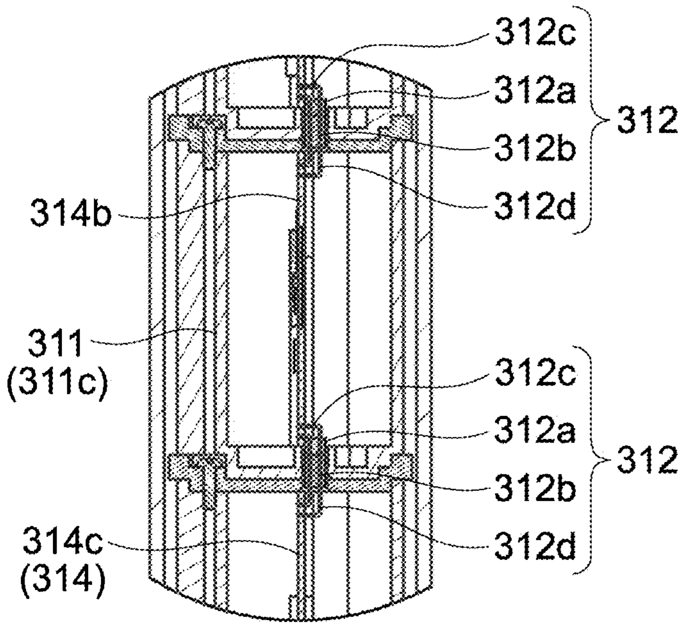
FIG. 34 An enlarged, cross-sectional view of A part of FIG. 30.

FIG. 34 is an enlarged, cross-sectional view of A part of FIG. 30.

As shown in FIG. 30, the connector 312 is connected within each of the unit casings 311*a* to 311*d* (311), and circuit boards 314*a* to 314*d* (circuit boards 314*a* to 314*d* will be collectively referred to as circuit board 314) are arranged. An electronic component and the like are mounted on the circuit board 314.

As shown in FIG. 34, the male type connector 312*a* includes a first terminal 312*c* and the female connector 312*b* includes a second terminal 312*d*. The first terminal 312*c* is electrically connected to the second terminal 312*d* of the adjacent unit casing 311. The second terminal 312*d* is also electrically connected to the first terminal 312*c* of the adjacent unit casing 311.

These first and second terminals 312*c*, 312*d* are all connected to the circuit board 314 (314*c*). Therefore, the electronic components of the unit casings 311 close to each other can be electrically connected to each other.

In the circuit boards 314*a* to 314*d* housed within the respective unit casings 311*a* to 311*d*, there are mounted electronic components and the like that respectively realize functions of a power supplying unit 315, a first communication unit 316, a communication unit 317, and a communication unit 318.

That is, the main body 310 further includes the power supplying unit 315, the first communication unit 316, the second communication unit 317, and the third communication unit 318.

The power supplying unit 315 is housed in the first unit casing 311*a*.

The first communication unit 316 is housed in the second unit casing 311*b*.

The second communication unit 317 is housed in the third unit casing 311*c*.

The third communication unit 318 is housed in the fourth unit casing 311*d*.

Further, as described above, the first communication unit 316 and the power supplying unit 315, the second communication unit 317 and the power supplying unit 315, and the third communication unit 318 and the power supplying unit 315 are respectively connected via the connectors 312 to the power supplying bus. In addition, the respective communication units 316, 317, and 318 are also connected to the data communication bus via the connectors 312.

(Power Supplying Unit)

Figure 35:
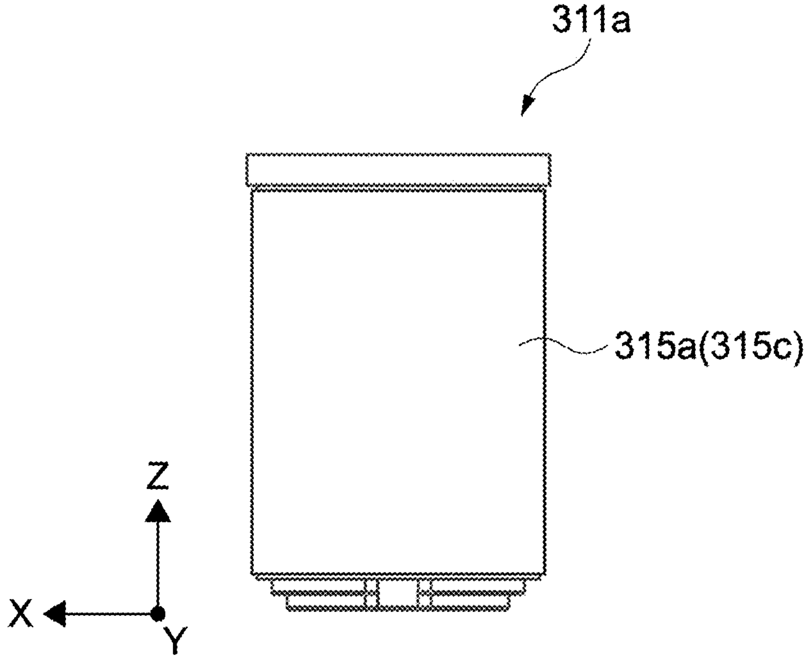
FIG. 35 A side view of a first unit casing shown in FIG. 31.
Figure 36:
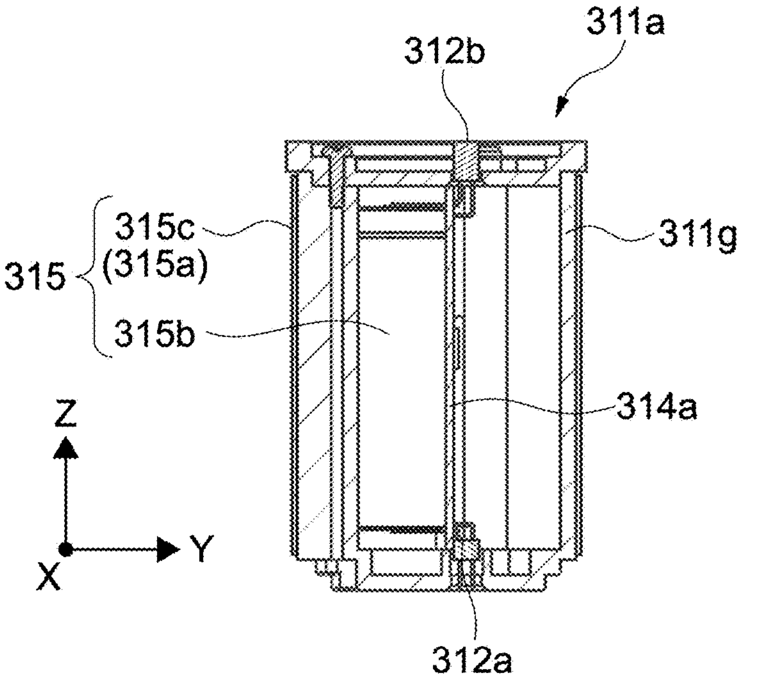
FIG. 36 A cross-sectional view of the first unit casing shown in FIG. 31.

FIG. 35 is a side view of the first unit casing 311*a* that houses the power supplying unit 315. FIG. 36 is a cross-sectional view of the first unit casing 311*a*. The cross-section shown in FIG. 36 corresponds to the cross-section (cross-section as viewed in the X-axis direction) as viewed in the A-A direction of B of FIG. 33.

The power supplying unit 315 supplies the first to third communication units 316 to 318 with electric power.

The power supplying unit 315 includes the power generation unit 315*a* and a power storage unit 315*b*.

The power generation unit 315*a* generates electric power in a manner that depends on a surrounding environment. The power generation unit 315*a* may perform power generation perform power generation with energy based on at least any one of, for example, light, heat, vibration, radio waves including far electromagnetic field and near electromagnetic field, and particular organic matter and inorganic matter. The power generation unit 315*a* may perform power generation with two or more of the above-enumerated types of energy. Any power generation methods can be employed and, for example, an electrostatic type, electromagnetic type, an inverse magnetostrictive type, or a piezoelectric type can be employed.

The power generation unit 315*a* may perform power generation with light (e.g., indoor light bulb and solar light).

The power generation unit 315*a* may be a thermoelectric generator that performs power generation by utilizing a temperature difference (heat) (e.g., one that performs power generation by using the Seebeck effect and the Thomson effect, thermionic power generation element, or one that performs thermomagnetic generation).

The power generation unit 315*a* may be an enzymatic cell (also called bio-cell or the like) that performs power generation by utilizing glucose.

The power generation unit 315*a* utilizes any of LCR (inductance, capacitance, and reactance) components or a combination thereof and capacitive coupling or electromagnetic coupling with a capacitor, an antenna, a rectenna, and the like. The power generation unit 315*a* may perform power generation with radio waves, for example.

The power generation unit 315*a* may perform near electromagnetic field power generation, in other words, perform power generation with energy obtained by bringing a transmission apparatus into the proximity of a predetermined apparatus. A well-known method such as a magnetic field resonance method, an electromagnetic induction method, electric field coupling, and an electric field resonance method can be applied to a method for near electromagnetic field power generation.

A well-known power generation element other than those exemplified above can be applied to the power generation unit 315*a*.

For example, the power generation unit 315*a* is configured as a photovoltaic electric generator that performs power generation with ambient light, and includes a solar photovoltaic film 315*c*.

The solar photovoltaic film 315*c* is formed of a flexible film. For example, the solar photovoltaic film 315*c* is formed to have a thickness of approximately 0.01 to 1 mm.

The solar photovoltaic film 315*c* is wrapped around the Z-axis. For example, the solar photovoltaic film 315*c* is wrapped on the peripheral surface of the tube portion 311*g* of the first unit casing 311*a*. Further, for example, the solar photovoltaic film 315*c* may be wrapped on the entire peripheral surface of the tube portion 311*g* and formed in a tubular shape having an axis direction along the Z-axis direction.

With the power generation unit 315*a* configured to be capable of solar power generation, the cover 313 includes a light-transmissive region 313*a* around at least the power generation unit 315*a*. With this, it is possible to prevent the cover 313 from blocking solar light. In this embodiment, as described above, the entire cover 313 includes the light-transmissive region 313*a*.

The power storage unit 315*b* is used in a manner that depends on purposes, for example, for storing electric power generated by the power generation unit 315*a*. Electric power generated by the power generation unit 315*a* is stored in the power storage unit 315*b* and used as electric power for operating the first communication units 316 to 318.

Besides various secondary batteries such as a lithium-ion secondary battery, the power storage unit 315*b* includes an electric double layer capacitor, a lithium ion capacitor, a polyacenic semiconductor (PAS) capacitor, a Nanogate capacitor (“Nanogate” is a registered trademark of Nanogate Aktiengesellschaft), a ceramic capacitor, a film capacitor, an aluminum electrolytic capacitor, a tantalum capacitor, and the like. Depending on purposes, a combination of them may be used.

The power storage unit 315*b* may be, for example, an olivine-type lithium-ion iron phosphate secondary battery. With this, it is possible to prolong the lifetime of the power storage unit 315*b* and to reduce the frequency of maintenance.

In addition, the power supplying unit 315 may include, for example, a power control unit 315*d* (not shown in FIG. 35, see FIG. 39) besides the power generation unit 315*a* and the power storage unit 315*b*.

The power control unit 315*d* includes, for example, an integrated circuit (IC) formed of one or more elements as in the power control unit 113 of the transmission apparatus 1. Examples of the IC used in the power supplying unit 113 can include a switching element such as a transistor, a diode, a reset IC, a regulator IC, a logic IC, and various arithmetic circuits. A circuit configuration inside the IC can be changed in a manner that depends on needs as long as it can realize the function of the power control unit 113.

Note that, other than the above-mentioned configuration example, the power supplying unit 315 can also be configured not to include the power generation unit 315*a*.

If the power supplying unit 315 does not include the power generation unit 315*a*, the power storage unit 315*b* may be used as a battery. As that power storage unit 315*b*, various primary batteries such as a dry cell, a lithium battery, a mercury battery, and a thermal battery and various secondary batteries such as a lithium-ion secondary battery, and the like can be applied.

Figure 39:
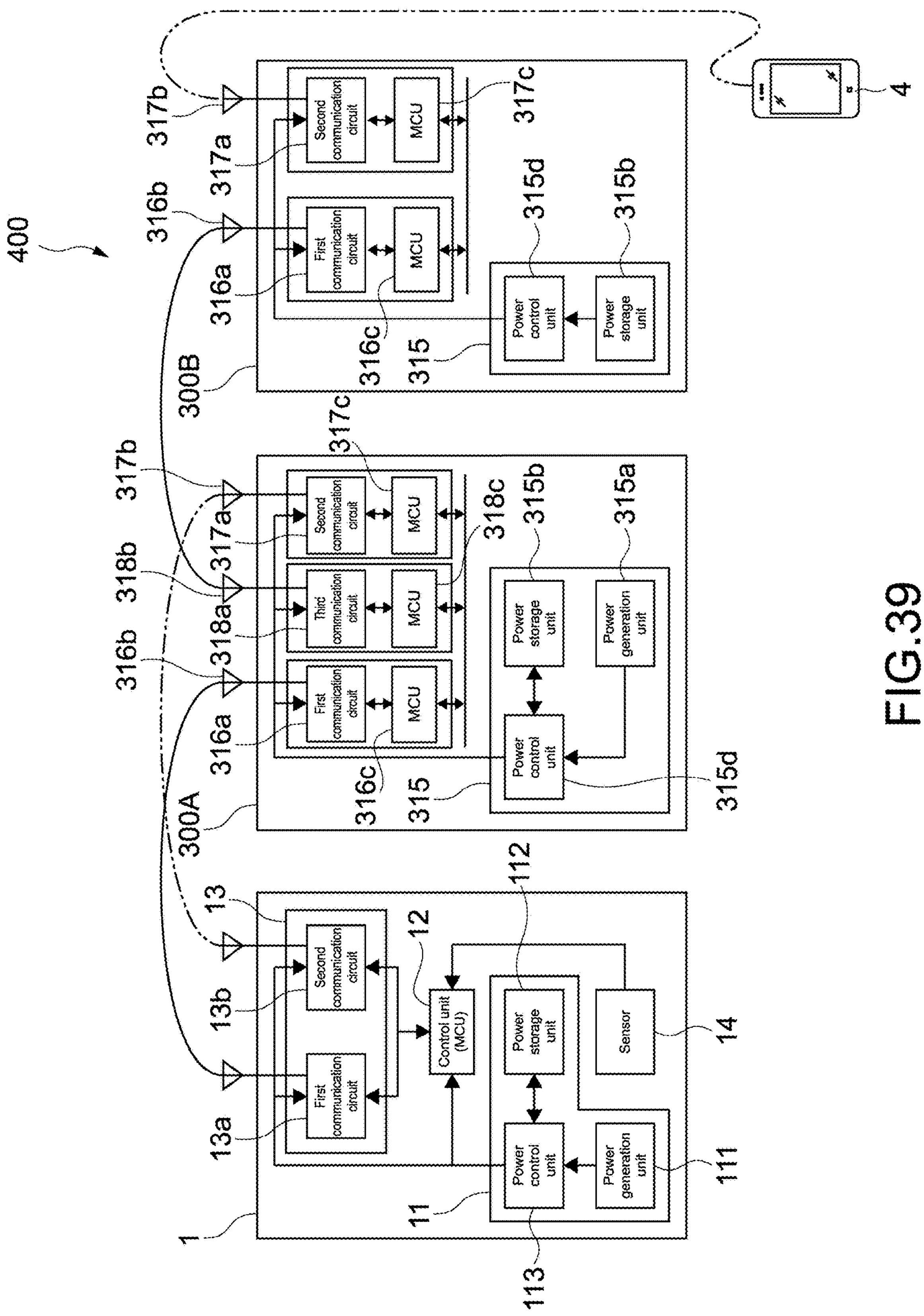
FIG. 39 A block diagram showing a configuration example of a communication system using the communication apparatus.

If the power storage unit 315*b* is used as a battery, the power supplying unit 315 may include the power storage unit 315*b* and the power control unit 315*d* (see FIG. 39).

(First Communication Unit)

Figure 37:
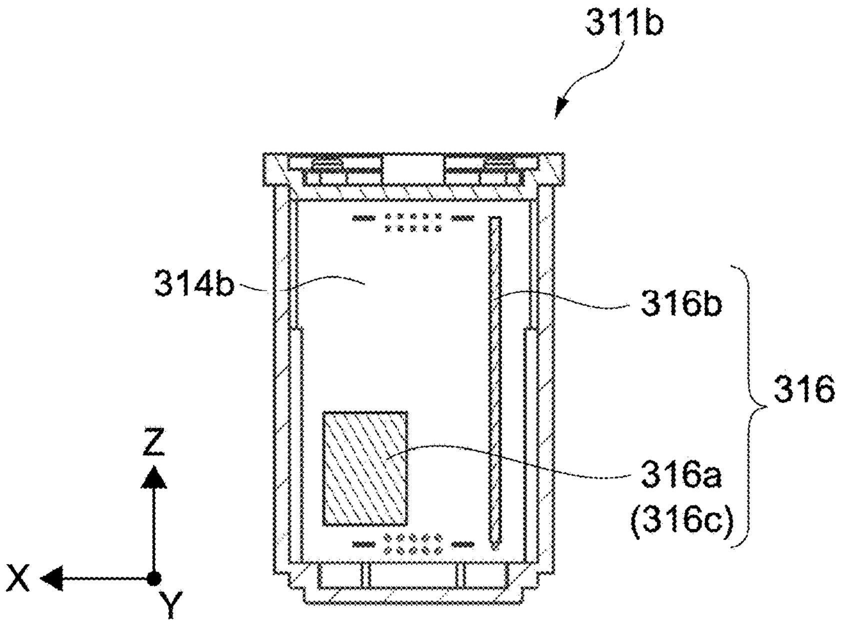
FIG. 37 A cross-sectional view of a second unit casing shown in FIG. 31.

FIG. 37 is a cross-sectional view of the second unit casing 311*b* that houses the first communication unit 316. The cross-section shown in FIG. 37 is equivalent to the cross-section (cross-section as viewed in the Y-axis direction) as viewed in the B-B direction of B of FIG. 33.

The first communication unit 316 is configured to be capable of communication with the first apparatus.

The first apparatus can also be, for example, one of the transmission apparatuses 1 described in the first and second embodiments. Alternatively, the first apparatus can also be the other communication apparatus 300, the terminal apparatus 4, or the server apparatus 3.

The first communication unit 316 receives, for example, an individual identification signal including an individual identifier of the transmission apparatus 1 (first apparatus).

The first communication unit 316 is configured to be capable of communication by according to first communication method.

The first communication method can be appropriately selected in a manner that depends on the configuration of the first apparatus. Examples of the first communication method can include communication methods such as “Wi-Fi (registered trademark)”, “Zigbee (registered trademark)”, “Bluetooth (registered trademark)”, “Bluetooth Low Energy”, “ANT (registered trademark)”, “ANT+(registered trademark)”, and “EnOcean (registered trademark)”, and a communication method utilizing radio waves or infrared rays other than those communication methods, a communication method utilizing an electric field, a communication method utilizing acoustic waves, and a 3G or 4G communication method. The first communication method may be a communication method utilizing a wireless communication or wired communication other than the above-mentioned communications.

For example, the first communication unit 316 is capable of communication according to a communication method utilizing radio waves. As an example, the first communication unit 316 is capable of communication according to a communication method utilizing radio waves in a frequency band of 920 MHz. Such a first communication unit 316 is, for example, capable of wireless communication with a first apparatus spaced away therefrom by approximately several tens of centimeters to several meters.

The first communication unit 316 includes, for example, a communication circuit 316*a*, an antenna 316*b*, and an MCU 316*c*, which are mounted on a circuit board 314*b*.

The antenna 316*b* extends in the Z-axis direction, for example. With this, reception sensitivity of the antenna 316*b* in the XY-plane can be made uniform.

(Second Communication Unit)

Figure 38:
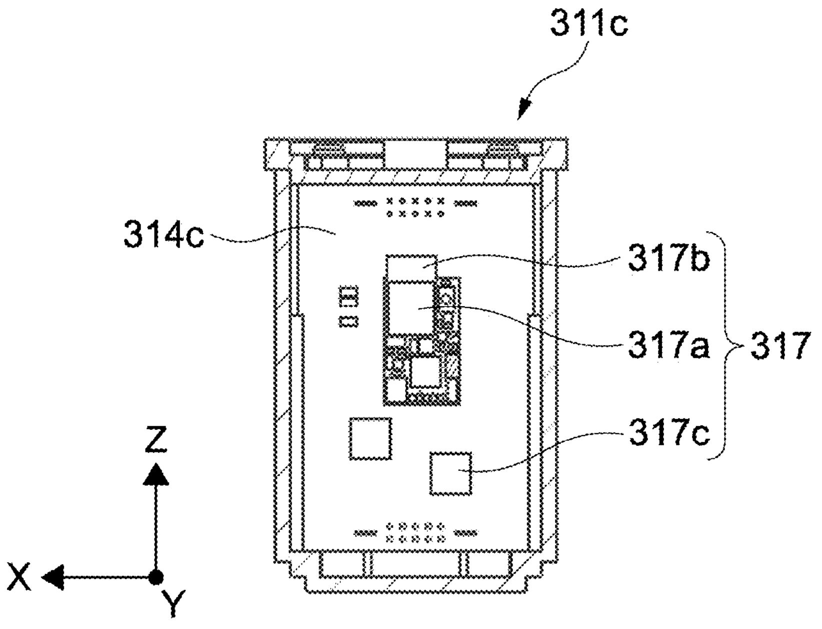
FIG. 38 A cross-sectional view of the third unit casing shown in FIG. 31.

FIG. 38 is a cross-sectional view of the third unit casing 311*c* that houses the second communication unit 317. The cross-section shown in FIG. 38 corresponds to a cross-section as viewed in the B-B direction of B of FIG. 33 (cross-section as viewed in the Y-axis direction).

In this embodiment, a second communication unit 316 is configured to be capable of communication with the first apparatus and configured to be capable of wireless communication with the second apparatus different from the first apparatus.

For example, the second apparatus may be the transmission apparatus 1 described in the first and second embodiments or may be the other communication apparatus 300, the terminal apparatus 4, or the server apparatus 3.

The second communication unit 317 transmits, for example, an individual identification signal including an individual identifier of the transmission apparatus 1 (first apparatus) that has received the first communication unit 316, to the second apparatus. Further, the second communication unit 317 is capable of transmitting an individual identification signal to the second apparatus if this individual identification signal satisfies the predetermined condition. For example, if the reception strength of the individual identification signal is equal to or larger than the predetermined threshold, the second communication unit 317 is capable of transmitting this individual identification signal to the second apparatus.

In this embodiment, the second communication unit 317 is configured to be capable of communication according to the second communication method different from the first communication method.

The second communication method is capable of more appropriately selecting the configuration of the first apparatus and/or the second apparatus. Examples of the second communication method can include communication methods such as “Wi-Fi (registered trademark)”, “Zigbee (registered trademark)”, “Bluetooth (registered trademark)”, “Bluetooth Low Energy”, “ANT (registered trademark)”, “ANT+(registered trademark)”, and “EnOcean (registered trademark)”, and a communication method utilizing radio waves or infrared rays other than those communication methods, a communication method utilizing an electric field, a communication method utilizing acoustic waves, and a 3G or 4G communication method. The second communication method may be a communication method utilizing a wireless communication or wired communication other than the above-mentioned communications.

For example, the second communication unit 317 is capable of communication according to a communication method utilizing Bluetooth Low Energy. Such a second communication unit 317 is capable of wireless communication with the first apparatus and/or the second apparatus spaced from, approximately several centimeters to several tens of centimeters, for example.

The second communication unit 317 includes, for example, a communication circuit 317*a*, an antenna 317*b*, and an MCU 317*c*, which are mounted on a circuit board 314*c*.

(Third Communication Unit)

In this embodiment, the third communication unit 318 is configured to be capable of communication between the first apparatus and the different second apparatus. For example, the third communication unit 318 is configured to be capable of communication using the first communication method as in the first communication unit 316.

The third communication unit 318 includes, for example, a communication circuit 318*a*, an antenna 318*b*, and an MCU 318*c*, which are mounted on the circuit board 314*d* (see FIG. 39).

A detailed configuration of the third communication unit 318 is similar to the first communication unit 316.

Therefore, descriptions thereof will be omitted.

Configuration Example of Communication System Using Communication Apparatus

FIG. 39 is a block diagram showing a configuration example of the communication system using the communication apparatus 300.

A communication system 400 shown in FIG. 39 includes a transmission apparatus 1, a first communication apparatus 300A, a second communication apparatus 300B, and a terminal apparatus 4.

In this example, the transmission apparatus 1 and the first communication apparatus 300A are communicated in accordance with the first communication method and the second communication method. The first communication apparatus 300A and the second communication apparatus 300B are communicated with each other in accordance with the first communication method. The second communication apparatus 300B and the terminal apparatus 4 are communicated with each other in accordance with the second communication method.

For example, it is assumed that the first communication method is a communication method utilizing radio waves in a frequency band of 920 MHz and the second communication method is a communication method utilizing Bluetooth Low Energy.

Note that, in the figure, the communication with the apparatus according to the first communication method is shown by the solid line and the communication with the apparatus according to the second communication method is shown by the long dashed double-short dashed line.

The transmission apparatus 1 is the transmission apparatus 1 attached to a living body such as a livestock animal and a person described in the first and second embodiments. The transmission apparatus 1 includes a power supplying unit 11, a control unit 12, a communication unit 13, and a sensor 14.

In this configuration example, the power supplying unit 11 includes a power generation unit 111, a power storage unit 112, and a power control unit 113.

The communication unit 13 includes a plurality of communication circuits and an antenna. That is, the communication unit 13 includes a first communication circuit 131*a*, an antenna 131*b* corresponding to the first communication circuit 131*a*, a second communication circuit 132*a*, and an antenna 132*b* corresponding to the second communication circuit 132*a*.

In this configuration example, it is assumed that the first communication circuit 131*a* is capable of communication according to the first communication method via the antenna 131*b*.

In this configuration example, it is assumed that the second communication circuit 132*a* is capable of communication according to the second communication method via the antenna 132*b*.

The first communication apparatus 300A is a configuration example of the communication apparatus 300.

That is, the first communication apparatus 300A includes a power control unit 315, MCUs 316*c*, 317*c*, and 318*c*, a first communication circuit 316*a*, a second communication circuit 317*a*, a third communication circuit 317*c*, and antennas 316*b*, 317*b*, and 318*b* corresponding to the respective communication circuits.

The first communication circuit 316*a* constitute the antenna 316*b*, the MCU 316*c*, and the first communication unit 316. In this configuration example, it is assumed that the first communication module 316*a* is capable of communication according to the first communication method via the antenna 316*b*.

The second communication module 317*a* constitute the antenna 317*b*, the MCU 317*c*, and the second communication unit 316. In this configuration example, it is assumed that the second communication module 317*a* is capable of communication according to the second communication method via the antenna 317*b*.

The third communication module 318*a* constitute the antenna 318*b*, the MCU 318*c*, and the third communication unit 318. In this configuration example, it is assumed that the third communication circuit 318*a* is capable of communication according to the first communication method via the antenna 318*b*.

The "first apparatus" in this first communication apparatus 300A is the transmission apparatus 1 and the "second apparatus" is the second communication apparatus 300B.

The second communication apparatus 300B is a configuration example of the communication apparatus 300.

That is, the second communication apparatus 300B includes the power control unit 315, the MCUs 316*c*, 317*c*, and 318*c*, the first communication circuit 316*a*, the second communication circuit 317*a*, the third communication circuit 317*c*, and the antennas 316*b*, 317*b*, and 318*b* corresponding to the respective communication circuits.

The first communication circuit 316*a*, the antenna 316*b*, and the MCU 316*c* constitute the first communication unit 316. In this configuration example, it is assumed that the first communication circuit 316*a* is capable of communication according to the first communication method via the antenna 316*b*.

The second communication circuit 317*a* constitute the antenna 317*b*, the MCU 317*c*, and the second communication unit 317. It is assumed that the second communication circuit 317*a* is capable of communication according to the second communication method via the antenna 317*b*.

The "first apparatus" in this second communication apparatus 300B is the first communication apparatus 300A and the "second apparatus" is the terminal apparatus 4.

A flow of communication in this configuration example will be described.

The first communication circuit 316 of the first communication apparatus 300A receives an individual identification signal transmitted from the first communication circuit 131*a* of the transmission apparatus 1.

Similarly, the second communication circuit 317*a* of the first communication apparatus 300A receives an individual identification signal transmitted from the second communication circuit 132*a* of the transmission apparatus 1.

On the other hand, the third communication circuit 318*a* of the first communication apparatus 300A transmits an individual identification signal received from the transmission apparatus 1 to the second communication apparatus 300B.

The first communication circuit 316*a* of the second communication apparatus 300B receives an individual identification signal transmitted from the first communication apparatus 300A.

Then, the second communication circuit 317*a* of the second communication apparatus 300B transmits the received individual identification signal to the terminal apparatus 4.

In accordance with this configuration example, the first communication apparatus 300A includes the plurality of communication circuits capable of communication in accordance with a different communication method. Therefore, it is possible to further receive the individual identification signal from the transmission apparatus 1 in accordance with two kinds of communication methods. With this, for example, a suitable communication method can be selected in a manner that depends on the position relationship and the environment of the transmission apparatus 1 and the first communication apparatus 300A.

Further, the first communication apparatus 300A includes two communication circuits 316*a*, 318*a* according to an identical communication method (communication method utilizing radio waves in frequency band of 920 MHz). With this, reception and transmission of the individual identification signal can use the different communication circuits 316*a*, 318*a*. Therefore, even if a considerable number of individual identification signals is transmitted and received, it is possible to prevent a failure of communication.

MODIFIED EXAMPLE OF THIS EMBODIMENT

Modified Example 3-1: Modified Example Regarding Hardware Configuration

The hardware configuration of the communication apparatus 300 is not limited to the above-mentioned example.

For example, the main body 310 of the communication apparatus 300 may include at least the first communication unit 316 and the power supply supplying unit 315. Depending on needs, other hardware configurations can be added thereto.

In accordance with this embodiment, the unit casings are scandalized to be stackable. Therefore, it is possible to easily change the hardware configuration of the communication apparatus 300.

For example, the main body 310 may include a sensor section that is housed in the unit casing 311 and acquires the information relating to a surrounding environment. With this, information regarding an environment surrounding the communication apparatus 300 is capable of transmitting to the other apparatus, to analyze it, and to use it for managing the livestock animal.

As an example, the sensor section may be capable of measuring data relating to weather, such as temperature, humidity, rainfall, wind velocity, and atmospheric pressure. With this, it becomes possible to acquire and analyze information about weather surrounding the communication apparatus 300. The sensor section may include an image sensor and an image processing circuit, and pick up and generate image data and obtain the image data with them.

The information regarding the environment generated by the sensor section is transmitted to the other apparatus such as the terminal apparatus 4 and the server apparatus 3 through at least any communication unit of the first to third communication units 316, 317, and 318.

For example, the main body 310 may include the first communication unit 316 and a notification unit that is mounted on the unit casing 311 besides the power supply supplying unit 315. The notification unit is capable of notifying the user about the environment surrounding the communication apparatus 300, the information about the communication apparatus 300 itself, information from other apparatuses with which communication is to be performed, and the like. The notification unit may include, specifically, an LED (Light Emitting Diode) module capable of lighting up, a speaker module, a display module, and the like and may be configured to be capable of notification using methods of light-up, sounds, display, and the like.

The main body 310 includes the notification unit. Thus, for example, it is possible to transmit a result of the stay monitoring processing of the first embodiment to the communication apparatus 300 and to notify it. Specifically, if it is found that there is a livestock animal mixed in an unsuitable group in the stay monitoring processing, it is possible to transmit that information to the communication apparatus 300 at the position corresponding to a region in which this livestock animal is located, and to notify the user about it.

Modified Example 3-2: Modified Example Regarding Unit Casing

The shape of each unit casing 311 may differ.

For example, although the plurality of unit casings 311 includes the first connection end portion 311*e* and the second connection end portion 311*f* that are identical, it may include the tube portion 311*g* having a different shape. Also with this, it is possible to easily stack the plurality of unit casings 311.

In this case, the tube portion 311*g* in the plurality of unit casings 311 may have different lengths in the Z-axis direction. With this, it is possible to freely adjust the length or the like of the antenna. Alternatively, the tube portion 311*g* in the plurality of unit casings 311 may have different cross-section shapes.

Further, the cross-section shape of the unit casing 311, which is orthogonal to the Z-axis direction, is not limited to a circular shape and may be an oval shape, a polygonal shape, and other symmetrical or asymmetrical shapes.

In addition, although the adjacent unit casings 311 is not limited to the connection embodiment in which it comes into direct contact, it may be indirectly connected via a compartment for connection.

In addition, the shapes of the connectors 312 between the unit casings 311 may also be all identical or may differ at least partially.

Modified Example 3-3: Modified Example Regarding Main Body

The main body 310 does not need to include the plurality of unit casings. In this case, the first communication unit 316 and the power supplying unit 315 or the like may be housed within the casing extending in the one axis direction, for example. Further, at least a part of this casing may be realized by the cover 313.

Alternatively, the main body 310 may include five or more unit casings 311.

In this case, the size of the cover 313 can be adjusted such that it is capable of housing five or more unit casings 311.

The combination of the unit casing 311 is not limited to the above-mentioned example.

For example, the main body 310 may include a plurality of power supplying units and may further include a plurality of unit casings 311 that contains the respective power supplying units. Due to the provision of the plurality of power supplying units each including the photovoltaic electric generator, the communication apparatus 300 can obtain greater electric power. Further, due to the provision of the power supplying unit including the photovoltaic electric generator and the power supplying unit including a radio-wave reception electric generator, the redundancy can be enhanced.

Further, the main body 310 includes the above-mentioned module structure. Therefore, the configuration of the power generation unit can be further optimized in a manner that depends on installation places of the power supplying unit. Alternatively, it is also possible to adjust the installation places of the power supplying unit due to the configuration of the power generation unit.

Further, the main body 310 does not need to include the cover 313.

Alternatively, a buffer material and the like may be sandwiched between the main body 310 and the unit casing 311.

Further, the main body 310 may include a dummy unit casing such that the size of the assembly of the unit casings 311 housed within the cover 313 is adapted for the cover 313. A dummy unit casing may be configured to be capable of performing only electrical connection between the adjacent unit casings, for example.

In addition, also regarding the entire main body 310, the cross-section shape orthogonal to the Z-axis direction may differ in a manner that depends on places.

Modified Example 3-4: Modified Example Regarding Cap Portion

The cap portion 330 may be a dome-shape as a whole or may have another configuration.

Further, the material of the cap portion 330 is also not particularly limited. For example, the cap portion 330 is formed of an elastic material such as a rubber and a highly flexible resin, and hence, a highly safe configuration can be kept also if the livestock animal comes into contact therewith.

Modified Example 3-5: Modified Example Regarding Mounting Portion

As long as the mounting portion 320 is configured to be mountable onto the structure G extending in the Z-axis direction, the configuration thereof is not limited.

For example, the mounting portion 320 may be configured as a clip type capable of sandwiching the tip end of the structure G.

Alternatively, the mounting portion 320 may be configured as a band or the like that can be wound around the tip end of the structure G.

Further, the mounting portion 320 may be configured to be capable of strongly adhering to the structure G.

In addition, a mounting tool (mount) that can be mounted onto a structure other than the structure G may be fixed to the mounting portion 320 in a manner that depends on needs. For example, a mounting tool may be fixed to the mounting portion 320 capable of being mounted onto a wall surface or a grid fence or the like.

Alternatively, a hook-shaped mounting tool may be fixed to the mounting portion 320.

By using such a mounting tool, the communication apparatus 300 can also be mounted to the structure other than the structure G, and hence the communication apparatus 300 can be installed in various places. In addition, the Z-axis direction of the communication apparatus 300 is not limited to the vertical direction. For example, the Z-axis direction of the communication apparatus 300 may be a direction (horizontal direction) approximately parallel to the plane direction. Alternatively, the mounting portion 320 can also be oriented upward in the Z-axis direction and used while suspending from ceiling or the like of a barn with a hook-shaped mounting tool or the like.

Further, a seal member may be arranged in the mounting portion 320 arranged between the seal member and the structure G. With this, it is possible to prevent moisture and organic matter from entering the main body 310 from the aperture 322 of the mounting portion 320. Therefore, the durability of the communication apparatus 300 can be further enhanced.

Although the embodiments of the present technology have been described above, it is needless to say that the present technology is not limited only to the above-mentioned embodiments and various modifications can be made without departing from the gist of the present technology. For example, the embodiment of the present technology can be an embodiment combining the respective embodiments.

It should be noted that the present technology may also take the following configurations.

(1) A livestock management system including a stay determination unit that determines, on the basis of data regarding a plurality of individual identification signals transmitted from a transmission apparatus that is attached to a livestock animal and transmits the individual identification signal made corresponding to the livestock animal, whether or not the livestock animal is staying within a target region corresponding to the individual identification signal.

(2) The livestock management system according to (1), further including a position determination unit that determines whether or not an individual identification signal transmitted from the transmission apparatus satisfies a first condition under which the transmission apparatus is positioned in the target region, in which the stay determination unit determines whether or not data regarding the plurality of individual identification signals determined to satisfy the first condition satisfies a second condition under which the livestock animal stays within the target region.

(3) The livestock management system according to (2), in which the data regarding the individual identification signal the plurality of individual identification signals includes information about signal strength when the plurality of individual identification signals are received by one or more communication apparatuses positioned in the target region, and the first condition includes a condition that the signal strength of the individual identification signal falls within a first strength range.

(4) The livestock management system according to (3), in which the first condition includes a condition that the signal strength of the individual identification signal is equal to or larger than a predetermined threshold.

(5) The livestock management system according to any one of (2) to (4), in which the data includes information about a reception time of each of the plurality of individual identification signals in one communication apparatus positioned in the target region, and the second condition includes a condition regarding the reception time of each of the plurality of individual identification signals.

(6) The livestock management system according to any one of (2) to (5), in which the data includes information about signal strength of each of the plurality of individual identification signals received by a plurality of communication apparatuses positioned in the target region, and the second condition includes a condition regarding the signal strength of each of the plurality of individual identification signals.

(7) The livestock management system according to (6), in which the second condition includes a condition regarding a position of the transmission apparatus estimated on the basis of the signal strength of the plurality of individual identification signals.

(8) The livestock management system according to any one of (1) to (7), in which the data includes second identification information for identifying a communication apparatus that receives each of the plurality of individual identification signals, the livestock management system further including an attribute information storage unit that stores the second identification information and a first characteristic information regarding an attribute of the communication apparatus, which is identified with the second identification information, in association with each other, in which the first characteristics information includes information regarding a region corresponding to a position of the communication apparatus, and the stay determination unit determines, on the basis of the first characteristics information associated with the second identification information of each of the plurality of individual identification signals, a region corresponding to a position of the communication apparatus as the target region, and determines whether or not the livestock animal stays within the target region determined on the basis of the plurality of individual identification signals.

(9) The livestock management system according to (8), in which the data includes an individual identifier that identifies a transmission apparatus that is a transmission source of the plurality of individual identification signals, the attribute information storage unit further stores the individual identifier and management target information of a region regarding an attribute of the transmission apparatus identified with the individual identifier in association with each other, the management target information of the region includes information regarding a region corresponding to a livestock animal wearing the transmission apparatus, the livestock management system further including a region determination unit that determines, if it is determined that the livestock animal stays within the target region, whether or not the determined target region and a region corresponding to the livestock animal wearing the transmission apparatus that is the transmission source of the plurality of individual identification signals are identical to each other on the basis of the management target information of the region stored in the attribute information storage unit.

(10) The livestock management system according to (8) or (9), in which the attribute information storage unit further stores a plurality of pieces of first characteristics information including the first characteristics information of the communication apparatus, the livestock management system further including:

an identification information acquisition unit that acquires the second identification information transmitted from the communication apparatus; and a registration unit that registers the acquired second identification information and first characteristics information selected from the plurality of pieces of first characteristics information in association with each other as registration information, in which the attribute information storage unit stores, on the basis of the registration information, the second identification information and the selected first characteristics information in association with each other.

(11) The livestock management system according to (10), in which the identification information acquisition unit acquires the second identification information transmitted from the communication apparatus by proximity wireless communication.

(12) The livestock management system according to any one of (2) to (11), further including:

a transmission apparatus that transmits the individual identification signal;

a communication apparatus that is an apparatus different from the transmission apparatus and receives the individual identification signal transmitted from the transmission apparatus; and an information processing apparatus that is an apparatus different from the transmission apparatus and the communication apparatus and receives the individual identification signal transmitted from the communication apparatus, in which the communication apparatus includes the position determination unit, and the information processing apparatus includes the stay determination unit.

(13) A management method for livestock, including:

receiving data regarding a plurality of individual identification signals transmitted from a transmission apparatus that is attached to a livestock animal and transmits the individual identification signal made corresponding to the livestock animal; and determining, on the basis of the data, whether or not the livestock animal is staying within a target region corresponding to the individual identification signal.

(14) A communication apparatus, including:

a cover having a hollow shape extending in one axis direction from a first end portion and a second end portion;

a first communication unit that is housed in a first unit casing installed inside the cover in the one axis direction and communicates with a first apparatus attached to a living body; and a power supplying unit that is housed in a second unit casing installed inside the cover in the one axis direction and supplies the first communication unit with electric power, the first unit casing and the second unit casing being connected via a connector that is attachable/detachable in the one axis direction, the first communication unit and the power supplying unit being electrically connected via the connector.

(15) The communication apparatus according to (14), in which the power supplying unit includes a power generation unit that generates electric power in a manner that depends on a surrounding environment.

(16) The communication apparatus according to (15), in which the power generation unit includes a photovoltaic electric generator.

(17) The communication apparatus according to (16), in which the power generation unit includes a solar photovoltaic film wound around the one axis.

(18) The communication apparatus according to (16) or (17), in which the cover includes a light-transmissive region around at least the power generation unit.

(19) The communication apparatus according to any one of (14) to (18), further including a mounting portion for installing the communication apparatus, the mounting portion being connected to the first end portion.

(20) The communication apparatus according to (19), in which the mounting portion is configured to be capable of being mounted on a tip end of a bar-like structure extending in the one axis direction.

(21) The communication apparatus according to (19) or (20), in which the mounting portion includes an aperture opened in the one axis direction.

(22) The communication apparatus according to any one of (14) to (21), in which the second unit casing has a cross-section shape orthogonal to the one axis direction, which is configured to be identical to a cross-section shape of the first unit casing, which is orthogonal to the one axis direction.

(23) The communication apparatus according to (22), in which the cross-section shape is configured to be a circular shape.

(24) The communication apparatus according to (22) or (23), in which the first unit casing and the second unit casing each including a first connection end portion and a second connection end portion that are arranged to be opposed to each other in the one axis direction, and a tube portion formed between the first connection end portion and the second connection end portion, and the first connection end portion of the second unit casing is configured to be adaptable for the second connection end portion of the first unit casing.

(25) The communication apparatus according to any one of (14) to (24), further including a cap portion including an apex portion protruding in the one axis direction, and a taper surface formed from the apex portion to the second end portion, the cap portion being connected to the second end portion.

(26) The communication apparatus according to any one of (14) to (25), in which the first communication unit includes an antenna extending in the one axis direction.

(27) The communication apparatus according to any one of (14) to (26), further including a second communication unit capable of wireless communication with a second apparatus different from the first apparatus.

(28) The communication apparatus according to any one of (14) to (27), in which the first communication unit is capable of communication according to a first communication method, and the second communication unit is capable of communication according to a second communication method different from the first communication method.

(29) The communication apparatus according to (27) or (28), in which the main body the first communication unit receives an individual identification signal including identification information of the first apparatus, and the second communication unit transmits the individual identification signal to the second apparatus.

(30) The communication apparatus according to (29), in which the second communication unit transmits the individual identification signal to the second apparatus if reception strength of the individual identification signal is equal to or larger than a predetermined threshold.

(31) The communication apparatus according to any one of (14) to (30), in which the living body is a livestock animal.

(32) The communication apparatus according to any one of (14) to (31), in which the living body is a person.

(33) A communication system, including:

a transmission apparatus attached to a living body; and a communication apparatus including a cover having a hollow shape extending in one axis direction from a first end portion and a second end portion, a first communication unit that is housed in a first unit casing installed inside the cover in the one axis direction and communicates with the transmission apparatus, and a power supplying unit that is housed in a second unit casing installed inside the cover in the one axis direction and supplies the first communication unit with electric power, the first unit casing and the second unit casing being connected via a connector attachable/detachable in the one axis direction, the first communication unit and the power supplying unit being electrically connected via the connector.

REFERENCE SIGNS LIST

1 . . . transmission apparatus

2, 300 . . . communication apparatus

3 . . . server apparatus

4 . . . terminal apparatus
100, 200 . . . livestock management system
103 . . . position determination unit
104 . . . data acquisition unit
105 . . . stay determination unit
106 . . . region determination unit
108 . . . characteristics information storage unit
113 . . . identification information acquisition unit
114 . . . registration unit

The invention claimed is:

1. A livestock management system comprising a stay determination unit that determines, on the basis of data regarding a plurality of individual identification signals transmitted from a transmission apparatus that is attached to a livestock animal and transmits the individual identification signal made corresponding to the livestock animal, whether or not the livestock animal is staying within a target region corresponding to the individual identification signal, wherein the data includes second identification information for identifying a communication apparatus that receives each of the plurality of individual identification signals;

an attribute information storage unit that stores the second identification information and a region attribute information regarding an attribute of the communication apparatus, which is identified with the second identification information, in association with each other, wherein the region attribute information includes information regarding a region corresponding to a position of the communication apparatus, the stay determination unit determines, on the basis of the region attribute information associated with the second identification information of each of the plurality of individual identification signals, a region corresponding to a position of the communication apparatus as the target region, and determines whether or not the livestock animal stays within the target region determined on the basis of the plurality of individual identification signals, the data includes an individual identifier that identifies a transmission apparatus that is a transmission source of the plurality of individual identification signals, the attribute information storage unit further stores the individual identifier and management target information of a region regarding an attribute of the transmission apparatus identified with the individual identifier in association with each other, and the management target information of the region includes information regarding a region corresponding to a livestock animal wearing the transmission apparatus; and a region determination unit that determines, if it is determined that the livestock animal stays within the target region, whether or not the determined target region and a region corresponding to the livestock animal wearing the transmission apparatus that is the transmission source of the plurality of individual identification signals are identical to each other on the basis of the management target information of the region stored in the attribute information storage unit.

2. The livestock management system according to claim 1, further comprising a position determination unit that determines whether or not an individual identification signal transmitted from the transmission apparatus satisfies a first condition under which the transmission apparatus is positioned in the target region, wherein the stay determination unit determines whether or not data regarding the plurality of individual identification signals determined to satisfy the first condition satisfies a second condition under which the livestock animal stays within the target region.

3. The livestock management system according to claim 2, wherein the data regarding the individual identification signal the plurality of individual identification signals includes information about signal strength when the plurality of individual identification signals are received by one or more communication apparatuses positioned in the target region, and the first condition includes a condition that the signal strength of the individual identification signal falls within a first strength range.

4. The livestock management system according to claim 3, wherein the first condition includes a condition that the signal strength of the individual identification signal is equal to or larger than a predetermined threshold.

5. The livestock management system according to claim 2, wherein the data includes information about a reception time of each of the plurality of individual identification signals in one communication apparatus positioned in the target region, and the second condition includes a condition regarding the reception time of each of the plurality of individual identification signals.

6. The livestock management system according to claim 2, wherein the data includes information about signal strength of each of the plurality of individual identification signals received by a plurality of communication apparatuses positioned in the target region, and the second condition includes a condition regarding the signal strength of each of the plurality of individual identification signals.

7. The livestock management system according to claim 6, wherein the second condition includes a condition regarding a position of the transmission apparatus estimated on the basis of the signal strength of the plurality of individual identification signals.

8. The livestock management system according to claim 1, wherein the attribute information storage unit further stores a plurality of pieces of region attribute information including the region attribute information of the communication apparatus, the livestock management system further comprising:

an identification information acquisition unit that acquires the second identification information transmitted from the communication apparatus; and a registration unit that registers the acquired second identification information and region attribute information selected from the plurality of pieces of region attribute information in association with each other as registration information, wherein the attribute information storage unit stores, on the basis of the registration information, the second identification information and the selected region attribute information in association with each other.

9. The livestock management system according to claim 8, wherein the identification information acquisition unit acquires the second identification information transmitted from the communication apparatus by proximity wireless communication.

10. The livestock management system according to claim 2, further comprising:

a transmission apparatus that transmits the individual identification signal;

a communication apparatus that is an apparatus different from the transmission apparatus and receives the individual identification signal transmitted from the transmission apparatus; and an information processing apparatus that is an apparatus different from the transmission apparatus and the communication apparatus and receives the individual identification signal transmitted from the communication apparatus, wherein the communication apparatus includes the position determination unit, and the information processing apparatus includes the stay determination unit.

11. A management method for livestock, comprising:

receiving data regarding a plurality of individual identification signals transmitted from a transmission apparatus that is attached to a livestock animal and transmits the individual identification signal made corresponding to the livestock animal;

determining, on the basis of the data, whether or not the livestock animal is staying within a target region corresponding to the individual identification signal, wherein the data includes second identification information for identifying a communication apparatus that receives each of the plurality of individual identification signals;

storing the second identification information and a region attribute information regarding an attribute of the communication apparatus, which is identified with the second identification information, in association with each other, wherein the region attribute information includes information regarding a region corresponding to a position of the communication apparatus, determining further includes determining, on the basis of the region attribute information associated with the second identification information of each of the plurality of individual identification signals, a region corresponding to a position of the communication apparatus as the target region, and determining whether or not the livestock animal stays within the target region determined on the basis of the plurality of individual identification signals, the data includes an individual identifier that identifies a transmission apparatus that is a transmission source of the plurality of individual identification signals, storing further includes storing the individual identifier and management target information of a region regarding an attribute of the transmission apparatus identified with the individual identifier in association with each other, and the management target information of the region includes information regarding a region corresponding to a livestock animal wearing the transmission apparatus; and determining, if it is determined that the livestock animal stays within the target region, whether or not the determined target region and a region corresponding to the livestock animal wearing the transmission apparatus that is the transmission source of the plurality of individual identification signals are identical to each other on the basis of the management target information of the stored region.

* * * * *